US010044692B2

(12) United States Patent
Kunihiro et al.

(10) Patent No.: US 10,044,692 B2
(45) Date of Patent: Aug. 7, 2018

(54) INFORMATION PROCESSING APPARATUS FOR CONTROLLING DATA TRANSMISSION BETWEEN DEVICES IN A NETWORK

(71) Applicant: SONY CORPORATION, Tokyo (JP)

(72) Inventors: Takushi Kunihiro, Tokyo (JP); Kento Suzuki, Kanagawa (JP); Yoichiro Sako, Tokyo (JP); Mitsuru Takehara, Tokyo (JP); Katsuhito Ishida, Kanagawa (JP); Makoto Akagi, Kanagawa (JP); Kouichirou Ono, Tokyo (JP); Tomoya Onuma, Shizuoka (JP); Akira Tange, Tokyo (JP); Kazuyuki Sakoda, Chiba (JP); Michihiro Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 106 days.

(21) Appl. No.: 14/777,849

(22) PCT Filed: Dec. 6, 2013

(86) PCT No.: PCT/JP2013/082765
§ 371 (c)(1),
(2) Date: Sep. 17, 2015

(87) PCT Pub. No.: WO2014/155844
PCT Pub. Date: Oct. 2, 2014

(65) Prior Publication Data
US 2016/0285839 A1 Sep. 29, 2016

(30) Foreign Application Priority Data

Mar. 26, 2013 (JP) .................................. 2013-064222

(51) Int. Cl.
*H04L 29/06* (2006.01)
*G06F 21/00* (2013.01)
(Continued)

(52) U.S. Cl.
CPC .............. *H04L 63/06* (2013.01); *H04L 9/321* (2013.01); *H04L 63/08* (2013.01); *H04W 12/06* (2013.01); *H04L 2209/80* (2013.01)

(58) Field of Classification Search
CPC ......... H04L 63/06; H04L 63/08; H04L 9/321; H04L 2209/80; H04W 12/06
See application file for complete search history.

(56) References Cited

U.S. PATENT DOCUMENTS

2009/0204804 A1* 8/2009 Okubo .................... G06F 21/31
713/100
2009/0228707 A1 9/2009 Linsky
(Continued)

FOREIGN PATENT DOCUMENTS

EP 2501160 A1 9/2012
GB 2486425 A 6/2012
(Continued)

OTHER PUBLICATIONS

European Extended Search Report Received for European Patent Application No. 13880594.0, dated Jul. 4, 2016, p. 20.
(Continued)

Primary Examiner — Lisa C Lewis
(74) Attorney, Agent, or Firm — Chip Law Group

(57) ABSTRACT

There is provided an information processing apparatus, the information processing apparatus including: a control unit configured to cause a second information processing apparatus to output authentication key information for allowing a first information processing apparatus to make a wireless connection with the second information processing apparatus in order to conduct data transmission from the first information processing apparatus to the second information processing apparatus using wireless communication, and determine to allow the first information processing apparatus to make the wireless connection on the basis of authentica-
(Continued)

tion key information input into the first information processing apparatus and the output authentication key information.

20 Claims, 27 Drawing Sheets

(51) Int. Cl.
    *H04W 12/06*     (2009.01)
    *H04L 9/32*     (2006.01)

(56) References Cited

U.S. PATENT DOCUMENTS

| | | |
|---|---|---|
| 2011/0072263 A1 | 3/2011 | Bishop et al. |
| 2013/0083922 A1 | 4/2013 | Kanda |
| 2015/0084741 A1* | 3/2015 | Bergdale ............ G07C 9/00119 340/5.61 |

FOREIGN PATENT DOCUMENTS

| | | |
|---|---|---|
| JP | 05-132807 A | 5/1993 |
| JP | 2003-347956 A | 12/2003 |
| JP | 2008-512891 A | 4/2008 |
| JP | 2012-080482 A | 4/2012 |
| JP | 2012-105100 A | 5/2012 |
| JP | 2012-141570 A | 7/2012 |
| JP | 4996754 B1 | 8/2012 |
| JP | 2003-347956 A | 12/2012 |
| JP | 5132807 B1 | 1/2013 |
| WO | 2006027725 A1 | 3/2006 |
| WO | 2012135563 | 10/2012 |

OTHER PUBLICATIONS

Office Action for JP Patent Application No. 2015-507957, dated Dec. 20, 2016, 6 pages of Office Action and 4 pages of translation.
Office Action for CN Patent Application No. 201380074851.4, dated Feb. 6, 2018, 8 pages of Office Action and 16 pages of English Translation.

* cited by examiner

EXAMPLE OF KEY INFORMATION-PROVIDING SERVER GENERATING KEY IMAGE

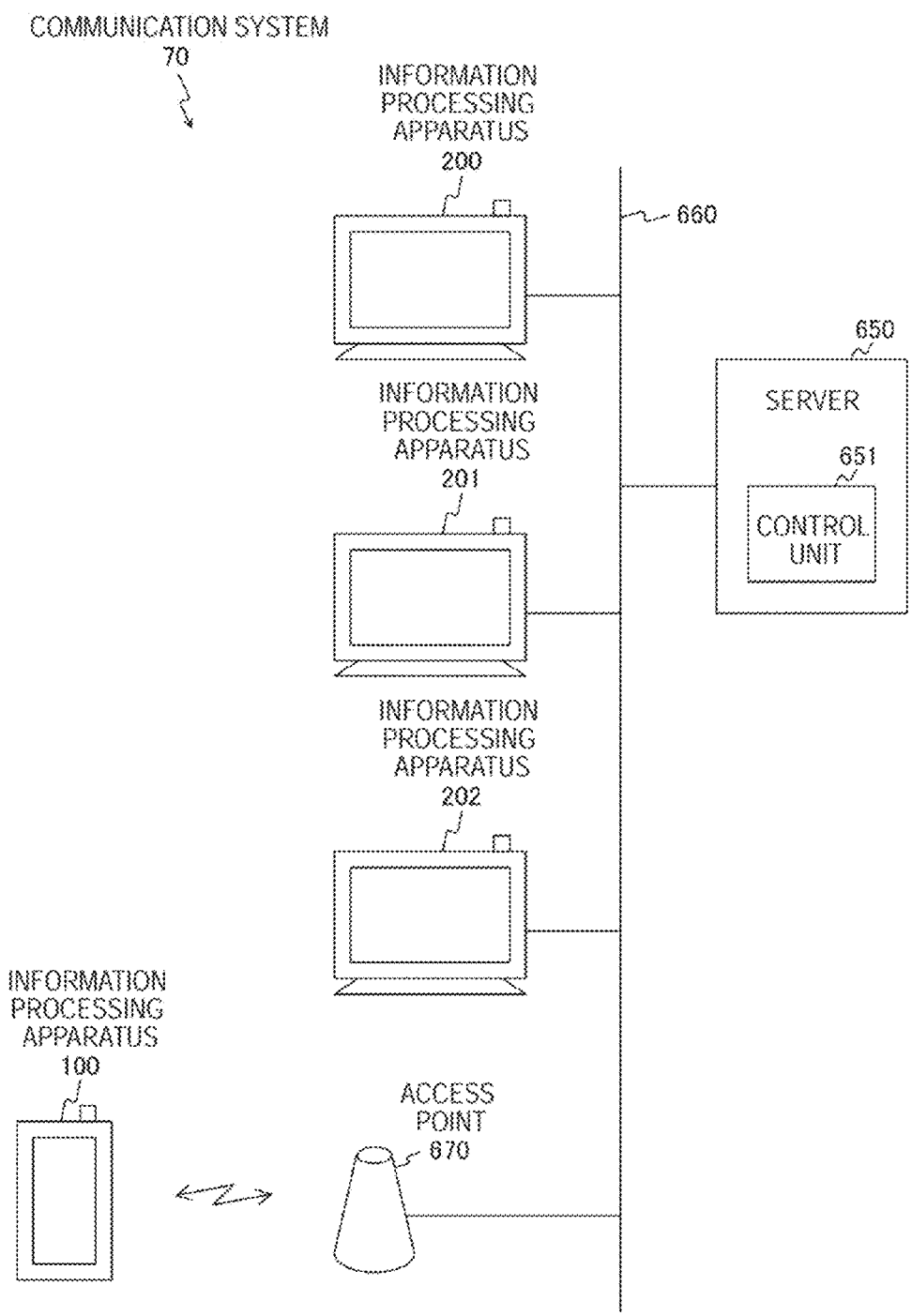

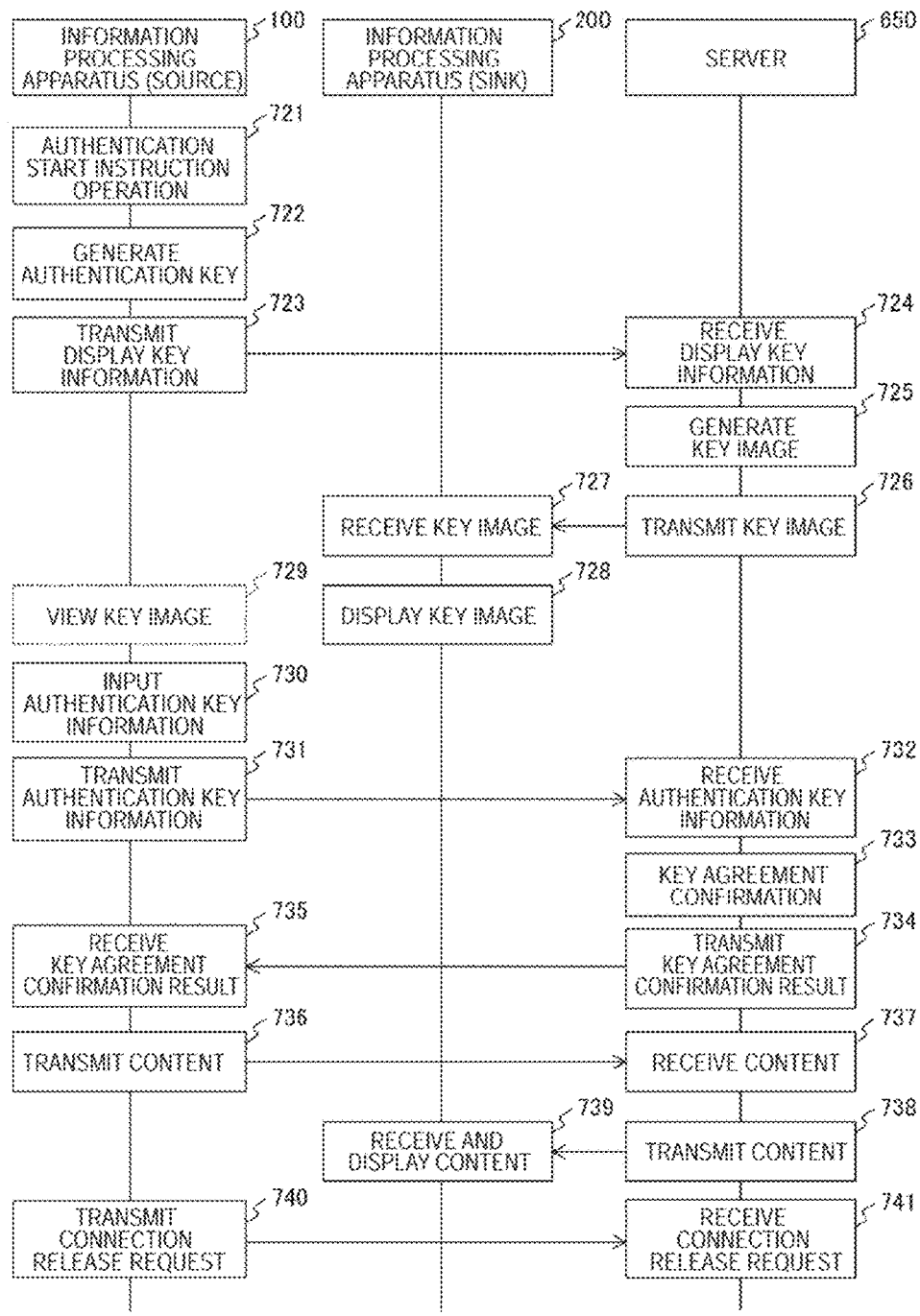

INFORMATION PROCESSING APPARATUS FOR CONTROLLING DATA TRANSMISSION BETWEEN DEVICES IN A NETWORK

TECHNICAL FIELD

The present technology relates to an information processing apparatus, and more particularly relates to an information processing apparatus that transmits and receives data with an information processing apparatus using wireless communication, a communication system, an information processing method, and a program causing a computer to execute the method.

BACKGROUND ART

In the related art, there exists wireless communication technology in which various data is exchanged using wireless communication. For example, an image generating apparatus that uses wireless communication to connect to a nearby information processing apparatus and communicate image data has been proposed (for example, see Patent Literature 1).

CITATION LIST

Patent Literature

Patent Literature 1: JP 2012-141570A

SUMMARY OF INVENTION

Technical Problem

With the above technology of the related art, since wireless communication may be used to connect to a nearby information processing apparatus, image data may be communicated easily with a nearby information processing apparatus.

At this point, suppose a case in which content held in an information processing apparatus (source device) is transmitted to another information processing apparatus (sink device) using wireless communication, and displayed on the sink device, for example. In this case, authentication of whether or not such a display is allowed becomes necessary. However, in cases such as when there are multiple sink devices in the vicinity of the source device, it is also anticipated that the source device may be connected to an unintended sink device. In this case, there is a risk that the content held in the source device may be seen by an unintended peer.

The present technology has been devised in light of such circumstances, and an objective thereof is to appropriately conduct a connection process when wireless communication is conducted between information processing apparatuses.

Solution to Problem

In order to solve the above problems, according to a first mode of the present technology, there is provided an information processing apparatus, its information processing method, and a program causing a computer to execute the method, the information processing apparatus including: a control unit configured to cause a second information processing apparatus to output authentication key information for allowing a first information processing apparatus to make a wireless connection with the second information processing apparatus in order to conduct data transmission from the first information processing apparatus to the second information processing apparatus using wireless communication, and decide whether or not to allow the first information processing apparatus to make the wireless connection on the basis of authentication key information input into the first information processing apparatus and the output authentication key information. Consequently, such a configuration acts to output authentication key information from the second information processing apparatus, and decide whether or not to allow the first information processing apparatus to make a wireless connection on the basis of the authentication key information input into the first information processing apparatus and the authentication key information output from the second information processing apparatus.

In the first mode, the information processing apparatus may be the second information processing apparatus. The information processing apparatus may further include an output unit configured to output data transmitted from the first information processing apparatus. The control unit may cause the authentication key information to be output from the output unit, and after a decision is made to allow the first information processing apparatus to make the wireless connection, cause the data transmitted from the first information processing apparatus to be output from the output unit. Consequently, such a configuration acts to output data transmitted from the first information processing apparatus after a decision is made to allow the first information processing apparatus to make the wireless connection.

In the first mode, the output unit may be a display unit configured to display an image based on image data transmitted from the first information processing apparatus. The control unit may cause the display unit to display the authentication key information, and after a decision is made to allow the first information processing apparatus to make the wireless connection, cause the display unit to display the image based on the image data transmitted from the first information processing apparatus. Consequently, such a configuration acts to display an image based on image data transmitted from the first information processing apparatus after a decision is made to allow the first information processing apparatus to make the wireless connection.

In the first mode, the first information processing apparatus may transmit, to the information processing apparatus, authentication key information input from an input unit for inputting authentication key information output from the second information processing apparatus. The control unit may make the decision on the basis of the authentication key information transmitted from the first information processing apparatus and the output authentication key information. Consequently, such a configuration acts to make a decision on the basis of authentication key information transmitted from the first information processing apparatus and authentication key information output from the second information processing apparatus.

In the first mode, the input unit may be at least one of an image capture unit configured to capture an image of authentication key information output from the second information processing apparatus, and an operation receiving unit configured to receive a user operation for inputting authentication key information output from the second information processing apparatus. Consequently, such a configuration acts to input authentication key information using at least one of an image capture unit and an operation receiving unit.

In the first mode, the control unit may decide to allow the first information processing apparatus to make the wireless connection in a case of determining that the authentication key information input into the first information processing apparatus and the output authentication key information are in agreement. Consequently, such a configuration acts to decide to allow the first information processing apparatus to make the wireless connection when the authentication key information input into the first information processing apparatus and the authentication key information output from the second information processing apparatus are determined to be in agreement.

In the first mode, the control unit may cause authentication key information for allowing the first information processing apparatus to make a wireless connection with a second information processing apparatus selected by a user operation from among a plurality of the second information processing apparatus to be output from the selected second information processing apparatus. Consequently, such a configuration acts to cause authentication key information for allowing the first information processing apparatus to make a wireless connection with a second information processing apparatus selected by a user operation from among a plurality of the second information processing apparatus to be output from the selected second information processing apparatus.

In the first mode, the first information processing apparatus may cause information related to the plurality of the second information processing apparatus to be displayed, and transmit, to the information processing apparatus, information related to a second information processing apparatus selected by a user operation from among the plurality of the second information processing apparatus being displayed. The control unit may cause authentication key information for allowing the first information processing apparatus to make a wireless connection with the second information processing apparatus on the basis of the transmitted information related to the second information processing apparatus to be output from the second information processing apparatus. Consequently, such a configuration acts to cause authentication key information for allowing the first information processing apparatus to make a wireless connection with the relevant second information processing apparatus on the basis of the information related to a second information processing apparatus transmitted from the first information processing apparatus to be output from the relevant second information processing apparatus.

In the first mode, in a case in which a decision is made to allow the first information processing apparatus to make the wireless connection, and the first information processing apparatus and the second information processing apparatus are in a connected state, when a request for causing the authentication key information to be output from the second information processing apparatus is received from another information processing apparatus, the control unit may refuse the request. Consequently, in a case in which a decision is made to allow the first information processing apparatus to make the wireless connection, and the first information processing apparatus and the second information processing apparatus are in a connected state, when a request for causing the authentication key information to be output from the second information processing apparatus is received from another information processing apparatus, such a configuration acts to refuse the request.

In the first mode, when the request is received from the another information processing apparatus after the connected state is released, the control unit may cause the authentication key information to be output from the second information processing apparatus in response to the request. Consequently, when the request is received from the other information processing apparatus after the connected state is released, such a configuration acts to cause the authentication key information to be output from the second information processing apparatus in response to the request.

In the first mode, in a case of receiving the request from the another information processing apparatus while in the connected state, the control unit may release the connected state without refusing the request when a priority level of the another information processing apparatus is higher than a priority level of the first information processing apparatus. Consequently, in a case of receiving the request from the other information processing apparatus while in the connected state, such a configuration acts to release the connected state without refusing the request when a priority level of the other information processing apparatus is higher than a priority level of the first information processing apparatus.

In the first mode, in a case in which the authentication key information is made to be output from the second information processing apparatus in response to a request from the first information processing apparatus, and a user operation for refusing the wireless connection is received, the control unit may decide not to allow the first information processing apparatus to make the wireless connection. Consequently, in a case in which the authentication key information is made to be output from the second information processing apparatus in response to a request from the first information processing apparatus, and a user operation for refusing the wireless connection is received, such a configuration acts to decide not to allow the first information processing apparatus to make the wireless connection.

In the first mode, when there exists a plurality of the first information processing apparatus that conducts data transmission to the second information processing apparatus, the control unit may cause authentication key information for every first information processing apparatus for allowing each of the plurality of the first information processing apparatus to make the wireless connection on the basis of a designated rule to be output successively from the second information processing apparatus. Consequently, when there exists a plurality of the first information processing apparatus that conducts data transmission to the second information processing apparatus, such a configuration acts to cause authentication key information for every first information processing apparatus for allowing each of the plurality of the first information processing apparatus to make the wireless connection on the basis of a designated rule to be output successively from the second information processing apparatus.

In the first mode, the control unit may decide a connection time for conducting data transmission to the second information processing apparatus on the basis of the number of the first information processing apparatus, and cause authentication key information for every first information processing apparatus to be output successively from the second information processing apparatus in a designated order to each of the plurality of the first information processing apparatus on the basis of the connection time. Consequently, such a configuration acts to decide a connection time for conducting data transmission to the second information processing apparatus on the basis of a number of the first information processing apparatus, and cause authentication key information for every first information processing apparatus to be output successively from the second information processing apparatus in a designated order for each of the plurality of the first information processing apparatus on the basis of the connection time.

In the first mode, the information processing apparatus may be the first information processing apparatus. The information processing apparatus may further includes an input unit for inputting authentication key information output from the second information processing apparatus. The control unit may transmit the authentication key information to the second information processing apparatus using wireless communication, cause the authentication key information to be output from the second information processing apparatus, decide whether or not to allow the wireless connection on the basis of the authentication key information input into the input unit and the output authentication key information, and transmit a result of the decision to the second information processing apparatus using wireless communication. Consequently, such a configuration acts to transmit the authentication key information to the second information processing apparatus using wireless communication and cause the authentication key information to be output from the second information processing apparatus, decide whether or not to allow the wireless connection on the basis of the authentication key information input into the input unit and the authentication key information output from the second information processing apparatus, and transmit a result of the decision to the second information processing apparatus using wireless communication.

In the first mode, the information processing apparatus may be a server connected to the second information processing apparatus via a network. The control unit may transmit the authentication key information to the second information processing apparatus via the network, cause the authentication key information to be output from the second information processing apparatus, and after a decision is made to allow the first information processing apparatus to make the wireless connection, transmit data transmitted from the first information processing apparatus to the second information processing apparatus via the network, and cause the data to be output from the second information processing apparatus. Consequently, such a configuration acts to transmit the authentication key information to the second information processing apparatus via the network and cause the authentication key information to be output from the second information processing apparatus, and after a decision is made to allow the first information processing apparatus to make the wireless connection, transmit data transmitted from the first information processing apparatus to the second information processing apparatus via the network and cause the data to be output from the second information processing apparatus.

According to a second mode of the present technology, there is provided a communication system, its information processing method, and a program causing a computer to execute the method, the communication system including: a first information processing apparatus configured to conduct data transmission to a second information processing apparatus using wireless communication; and a second information processing apparatus configured to receive and output data from the first information processing apparatus. Authentication key information for allowing the first information processing apparatus to make a wireless connection with the second information processing apparatus in order to conduct the data transmission is output from the second information processing apparatus, and whether or not to allow the first information processing apparatus to make the wireless connection is decided on the basis of authentication key information input into the first information processing apparatus and the output authentication key information. Consequently, such a configuration acts to cause authentication key information to be output from the second information processing apparatus, and cause a decision of whether or not to allow the first information processing apparatus to make a wireless connection to be made on the basis of the authentication key information input into the first information processing apparatus and the authentication key information output from the second information processing apparatus.

Advantageous Effects of Invention

According to the present technology, an advantageous effect of appropriately conducting a connection process when wireless communication is conducted between information processing apparatuses may be achieved.

BRIEF DESCRIPTION OF DRAWINGS

FIG. 26 is a diagram that illustrates an exemplary configuration of a communication system 70 according to a fourth embodiment of the present technology.

FIG. 27 is a sequence flowchart illustrating an exemplary communication process among apparatuses constituting a communication system 70 according to a fourth embodiment of the present technology.

DESCRIPTION OF EMBODIMENTS

Hereinafter, embodiments for carrying out the present technology (hereinafter designated embodiments) will be described. The description will proceed in the following order.

1. First embodiment (communication control: example of authenticating wireless connection using authentication key information output from sink device and authentication key information input into source device)

2. Second embodiment (communication control: example of case of receiving other source device connection request while wireless communication is being conducted between source device and sink device)

3. Third embodiment (communication control: example of switching connected state of source device at appropriate timings)

4. Fourth embodiment (communication control: example of authenticating using authentication key information generated by other apparatus other than source device and sink device)

1. First Embodiment

[Exemplary Configuration of Communication System]

Figure 1:
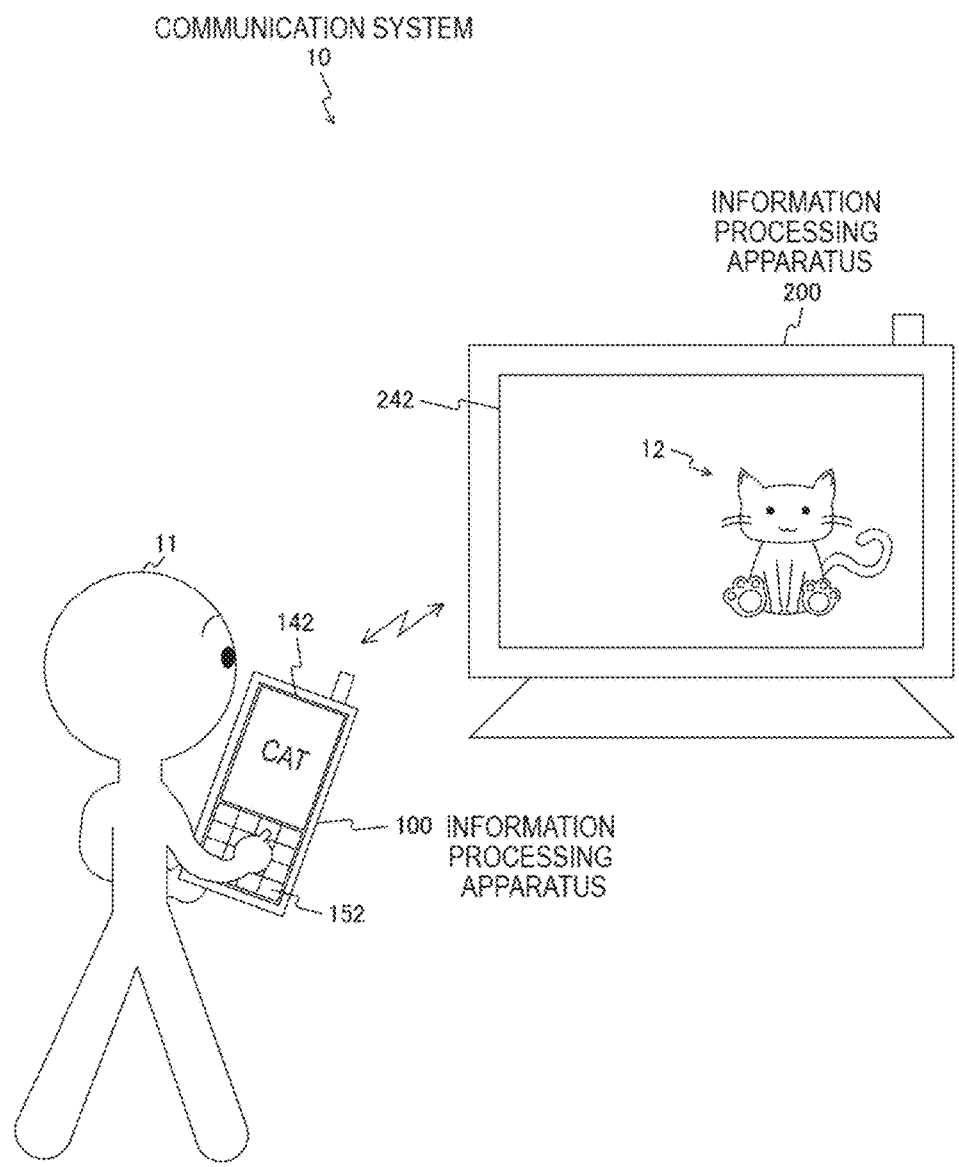
FIG. 1 is a diagram that illustrates an exemplary configuration of a communication system 10 according to a first embodiment of the present technology.

FIG. 1 is a diagram illustrating an exemplary configuration of a communication system 10 according to a first embodiment of the present technology. FIG. 1 illustrates an example of a system configuration when two information processing apparatuses (information processing apparatuses 100 and 200) make a direct wireless connection.

The communication system 10 is equipped with information processing apparatuses 100 and 200. The information processing apparatus 100 is, for example, electronic equipment equipped with a wireless communication function (for example, a wireless communication apparatus such as a mobile phone, a smartphone, or a tablet (small portable equipment, for example)). Also, the information processing apparatus 200 is, for example, electronic equipment equipped with a wireless communication function (for example, an audiovisual apparatus that output images and audio (a large television, for example).

For example, the information processing apparatuses 100 and 200 are wireless communication apparatuses conforming to the Institute of Electrical and Electronics Engineers 802.11 (IEEE 802.11) specification. Additionally, the information processing apparatuses 100 and 200 may exchange various information using the wireless communication function.

Herein, a wireless local area network (LAN) may be used as the wireless communication used in the communication system 10, for example. For the wireless LAN, Wireless Fidelity (Wi-Fi; registered trademark) Direct, Tunneled Direct Link Setup (TDLS), or an ad hoc network may be used, for example. In addition, Wi-Fi CERTIFIED Miracast may be used as the short-range wireless audiovisual (AV) transmission communication used in the communication system 10, for example. Note that Wi-Fi CERTIFIED Miracast is a mirroring technology that uses Wi-Fi Direct and TDLS technology to transmit the audio and display picture played back on one terminal to another terminal, and causes the audio and picture to be output similarly even on the other terminal.

In addition, for the wireless communication used in the communication system 10, Bluetooth (registered trademark) (IEEE 802.15.1), ZigBee (IEEE 802.15.4), infrared communication, or the like may be used, for example. Also, for the wireless communication used in the communication system 10, a public network (for example, 3rd Generation (3G) or Long Term Evolution (LTE)) may also be used, for example.

Note that in the embodiments of the present technology, an example treating the information processing apparatus 100 as the source device and the information processing apparatus 200 as the sink device will be described. Herein, take the source device to mean the information processing apparatus on the transmitting side that transmits content, and take the sink device to mean the information processing apparatus on the receiving side that receives and outputs the content. For example, the source device is an information processing apparatus (for example, a small device) storing content (user content) such as still images or videos. Meanwhile, for example, the sink device is an information processing apparatus (for example, a large device) that outputs content received using wireless communication (for example, image display and audio output).

The information processing apparatus 100 is able to use wireless communication to transmit content (for example, image data and audio data) stored in memory 130 (illustrated in FIG. 2) to the information processing apparatus 200. For example, the information processing apparatus 100 is able to use Wi-Fi CERTIFIED Miracast to transmit content to the information processing apparatus 200. Note that the information processing apparatus 100 is an example of the first information processing apparatus described in the claims.

Meanwhile, the information processing apparatus 200 displays an image based on content transmitted from the information processing apparatus 100 on a display unit 242. In addition, the information processing apparatus 200 outputs audio based on content transmitted from the information processing apparatus 100 from an audio output unit 272 (illustrated in FIG. 3). Note that the information processing apparatus 200 is an example of the second information processing apparatus described in the claims.

Herein, recently, apparatuses possessed by individuals (for example, small devices such as smartphones and tablets) may be used to capture and view photographs and videos. In addition, the enjoyment conceivably may be broadened further by viewing these photographs and videos with multiple people. However, the display units (displays) of these apparatuses (small devices) are small, and thus are often inappropriate for viewing by multiple people.

For this reason, displaying photographs and videos on an apparatus equipped with a display unit of large size (for example, a large-screen display apparatus such as a large television (large device)) is anticipated. For example, the use of wireless communication (for example, wireless LAN) to transmit photograph or video information (content) from a small device in hand to a large apparatus for display is anticipated.

At this point, when communicating information by using wireless communication, it is generally necessary to pair the source device and the sink device, and conduct authentication to allow a specific sink device to display information from the source device.

For example, when the owner of the source device and the sink device is the same person, by supplying the same key information to both just once at first, pairing and authentication may be realized. This method is realized with Bluetooth pairing, for example. Note that the same key information is a personal identification number code (PIN code), for example.

At this point, imagine the case in which the owner of the sink device is not an individual (for example, the case in which a television installed in a hotel room is the sink device). In this case, the method of inputting key information into the sink device (for example, the television) often differs for each apparatus, and the input of key information is anticipated to be difficult for the user.

Accordingly, instead of inputting the same key information (for example, a PIN code), there has been proposed a method that performs authentication by using a proximity wireless communication function other than the wireless communication function used to communicate content (for example, wireless LAN). However, since this case requires the source device and the sink device to be equipped with multiple wireless communication functions (for example, wireless LAN and a proximity wireless communication function), there is a risk of higher apparatus costs.

Accordingly, it is also conceivable to exchange key information using a single wireless communication function (for example, wireless LAN). At this point, in a facility such as a hotel, multiple sink devices are often installed inside the same facility (for example, a television installed in each room of the hotel). For this reason, it is also anticipated that a sink device installed in a room adjacent to the room where a user is staying will also be within the radio range of the source device possessed by that user. In this case, there is a risk of key exchange accidently occurring with a sink device other than the sink device installed in the room where the user is staying (for example, a television installed in an adjacent room). When key exchange is accidently conducted in this way, there is a risk that information may be transmitted to an unintended sink device, and the information may be seen by another user.

Accordingly, the embodiments of the present technology illustrate an example of causing authentication key information to be displayed on the sink device desired for use by the user who possesses the source device, and using the authentication key information to conduct pairing and authentication between the source device and the sink device. For example, as illustrated in FIG. 1, authentication key information (for example, a cat image 12 obtained by converting a key into a representational image) is displayed on the display unit 242 of the information processing apparatus 200 desired for use by the user 11 who possesses the information processing apparatus 100. In this case, the authentication key information (cat image 12) displayed on the display unit 242 is used to conduct pairing and authentication between the information processing apparatus 100 (source device) and the information processing apparatus 200 (sink device). For example, the user who sees the authentication key information (cat image 12) displayed on the display unit 242 is made to input that authentication key information (for example, "CAT") using an operation receiving unit 152. Consequently, pairing and authentication is conducted appropriately between the information processing apparatus 100 and the information processing apparatus 200.

In this way, authentication key information (a cat image 12) is displayed on the information processing apparatus 200 (sink device) desired for use by the user 11, and the user 11 (or alternatively, the information processing apparatus 100 (source device)) is made to recognize the authentication key information (cat image 12). Consequently, the user 11 is able to reliably recognize that the information processing apparatus 200 (sink device) is the output destination of information (content). In addition, authentication key information is transmitted from the information processing apparatus 100 (source device) possessed by the user 11 to the information processing apparatus 200 (sink device) desired for use, and pairing and authentication may be conducted with the sink device intended by the user 11.

Herein, for the authentication key information, information enabling unique confirmation within a given range (within a designated range with reference to the position where the information processing apparatus 100 (source device) exists) may be used. For example, a device address of the source device or the sink device may be used.

Also, the authentication key information is preferably changed every time pairing and authentication is conducted.

For example, other animals (for example, a dog, horse, sheep, and goat), signs, letters, and the like may be successively changed.

[Exemplary Configuration of Information Processing Apparatus (Source Device)]

Figure 2:
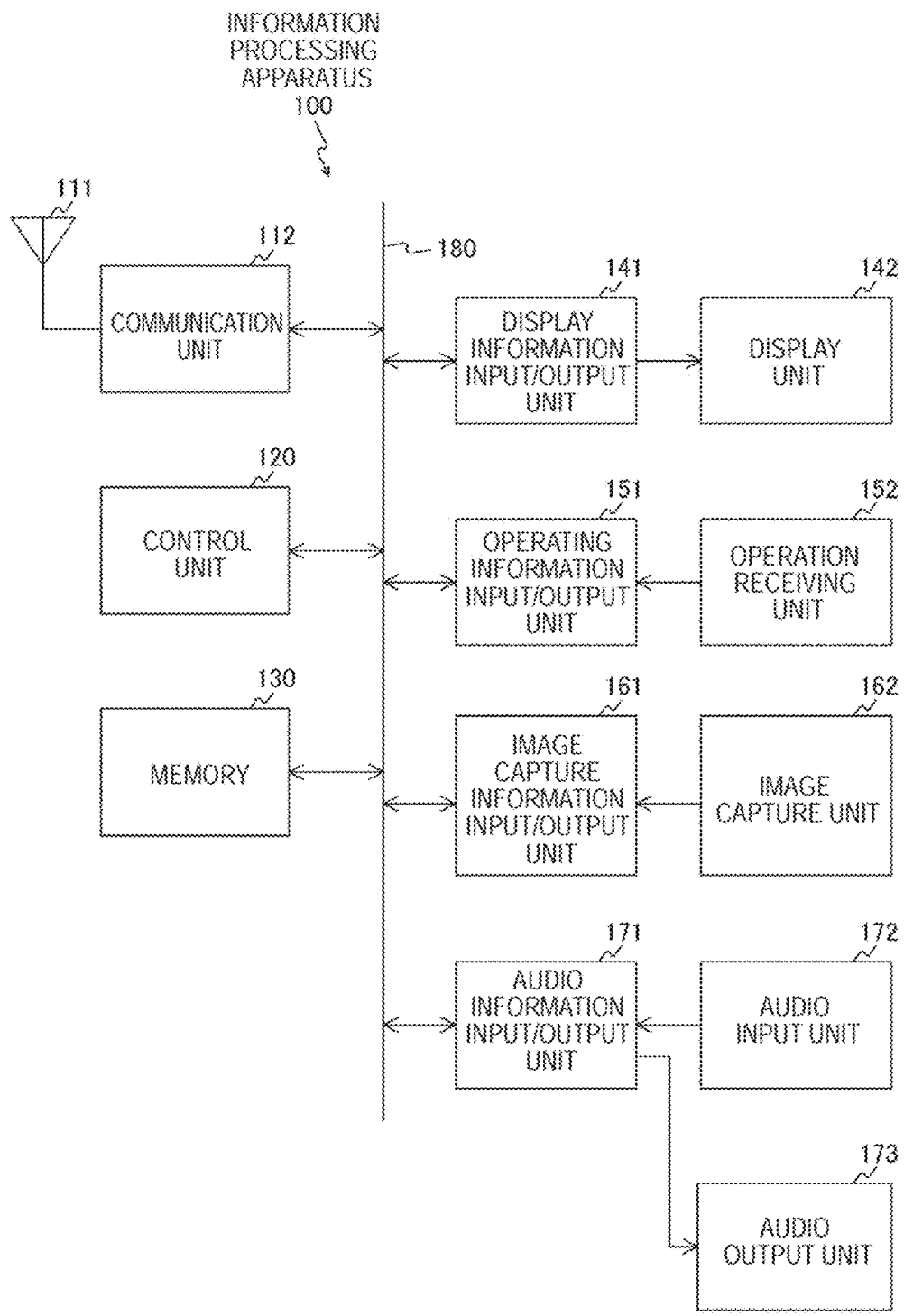
FIG. 2 is a block diagram illustrating an exemplary internal configuration of an information processing apparatus 100 according to a first embodiment of the present technology.

FIG. 2 is a block diagram illustrating an exemplary internal configuration of an information processing apparatus 100 according to a first embodiment of the present technology.

The information processing apparatus 100 is equipped with an antenna 111, a communication unit 112, a control unit 120, memory 130, a display information input/output unit 141, and a display unit 142. In addition, the information processing apparatus 100 is equipped with an operating information input/output unit 151, an operation receiving unit 152, an image capture information input/output unit 161, an image capture unit 162, an audio information input/output unit 171, an audio input unit 172, and an audio output unit 173. In addition, these components are connected via a bus 180.

The communication unit 112 is a module for transmitting and receiving radio waves via the antenna 111 (a modem, for example). For example, the communication unit 112 may conduct wireless communication over a wireless local area network (LAN).

For example, the communication unit 112, on the basis of control by the control unit 120, uses wireless communication to transmit and receive various information (authentication key information, a key image, content) with another wireless communication apparatus present within a designated range. Herein, suppose that the predetermined range is a range based on the position of the information processing apparatus 100, for example, and means a range in which the communication unit 112 is able to transmit and receive data using wireless communication. In addition, suppose that another wireless communication apparatus present within the predetermined range is a wireless communication apparatus present near the information processing apparatus 100, for example, and is a wireless communication apparatus that is able to transmit and receive data with the information processing apparatus 100 using wireless communication. Note that another wireless communication function other than the above wireless LAN may be used to conduct wireless communication.

The control unit 120 controls the operation of each component of the information processing apparatus 100 on the basis of a control program stored in the memory 130. For example, the control unit 120 conducts signal processing on transmitted and received information. Also, the control unit 120 is realized by a central processing unit (CPU), for example.

The memory 130 is memory that stores various information. For example, various information (for example, a control program) required for the information processing apparatus 100 to conduct desired operation is stored in the memory 130. In addition, the memory 130 stores various content to be played back (for example, video content and still image content).

For example, when transmitting data using wireless communication, the control unit 120 processes information read out from the memory 130, a signal input from the operation receiving unit 152, or the like, and generates a chunk of data (transmission packet) to actually transmit. Subsequently, the control unit 120 outputs the generated transmission packet to the communication unit 112. Also, the communication unit 112, after converting the transmission packet into the format of a communication scheme for actual transmission and the like, externally transmits the converted transmission packet from the antenna 111.

As another example, when receiving data using wireless communication, the communication unit 112 extracts a received packet by having a receiver inside the communication unit 112 perform signal processing on a radio signal received via an antenna 111. Subsequently, the control unit 120 interprets the extracted received packet. If, as a result of the interpretation, the extracted received packet is judged to be data that should be stored, the control unit 120 writes the data to the memory 130.

For example, the control unit 120 may provide various content stored in the memory 130 to another wireless communication apparatus using wireless communication.

The display unit 142 is a display unit that displays various information (for example, the display screen illustrated in FIG. 9) via the display information input/output unit 141, on the basis of control by the control unit 120. Note that for the display unit 142, a display panel such as an organic electroluminescence (EL) panel or a liquid crystal display (LCD) panel may be used, for example.

At this point, when the information processing apparatus 100 is a smartphone, the size of the display unit 142 (display size) is often a size of approximately 4 inches to 5 inches, for example. Also, when the information processing apparatus 100 is a tablet, the size of the display unit 142 (display size) is often a size of approximately 7 inches to 10 inches, for example.

The operation receiving unit 152 is an operation receiving unit that receives operating input performed by a user, and outputs operating information corresponding to received operating input to the control unit 120 via the operating information input/output unit 151. The operation receiving unit 152 is realized with a touch panel, keyboard (or virtual keyboard on a touch panel), or mouse, for example. Note that the operation receiving unit 152 and the display unit 142 may also be integrated by using a touch panel that enables a user to perform operating input by bringing a finger in contact with or in proximity to a display screen.

The image capture unit 162, on the basis of control by the control unit 120, captures an image of a subject to generate image data (still image data, video data), and outputs the generated image data to the control unit 120 via the image capture information input/output unit 161. Also, the control unit 120 causes the memory 130 to record image data generated in this way as image content (still image content, video content). Also, the image capture unit 162 captures an image of a key image to generate a key image. The image capture unit 162 is made up of optics (multiple lenses), an image sensor, and a signal processing unit, for example. Note that a charge-coupled device (CCD) or complementary metal-oxide-semiconductor (CMOS) may be used as the image sensor, for example. Note that at least one of the operation receiving unit 152 and the image capture unit 162 functions as an input unit for inputting authentication key information. In other words, the operation receiving unit 152 and the image capture unit 162 are examples of the input unit described in the claims.

The audio input unit 172 is an audio input unit (for example, a microphone) that acquires ambient sound around the information processing apparatus 100, and outputs information related to acquired sound (audio information) to the control unit 120 via the audio information input/output unit 171.

The audio output unit 173 is an audio output unit (for example, a speaker) that outputs various audio supplied via the audio information input/output unit 171, on the basis of control by the control unit 120.

[Exemplary Configuration of Information Processing Apparatus (Sink Device)]

Figure 3:
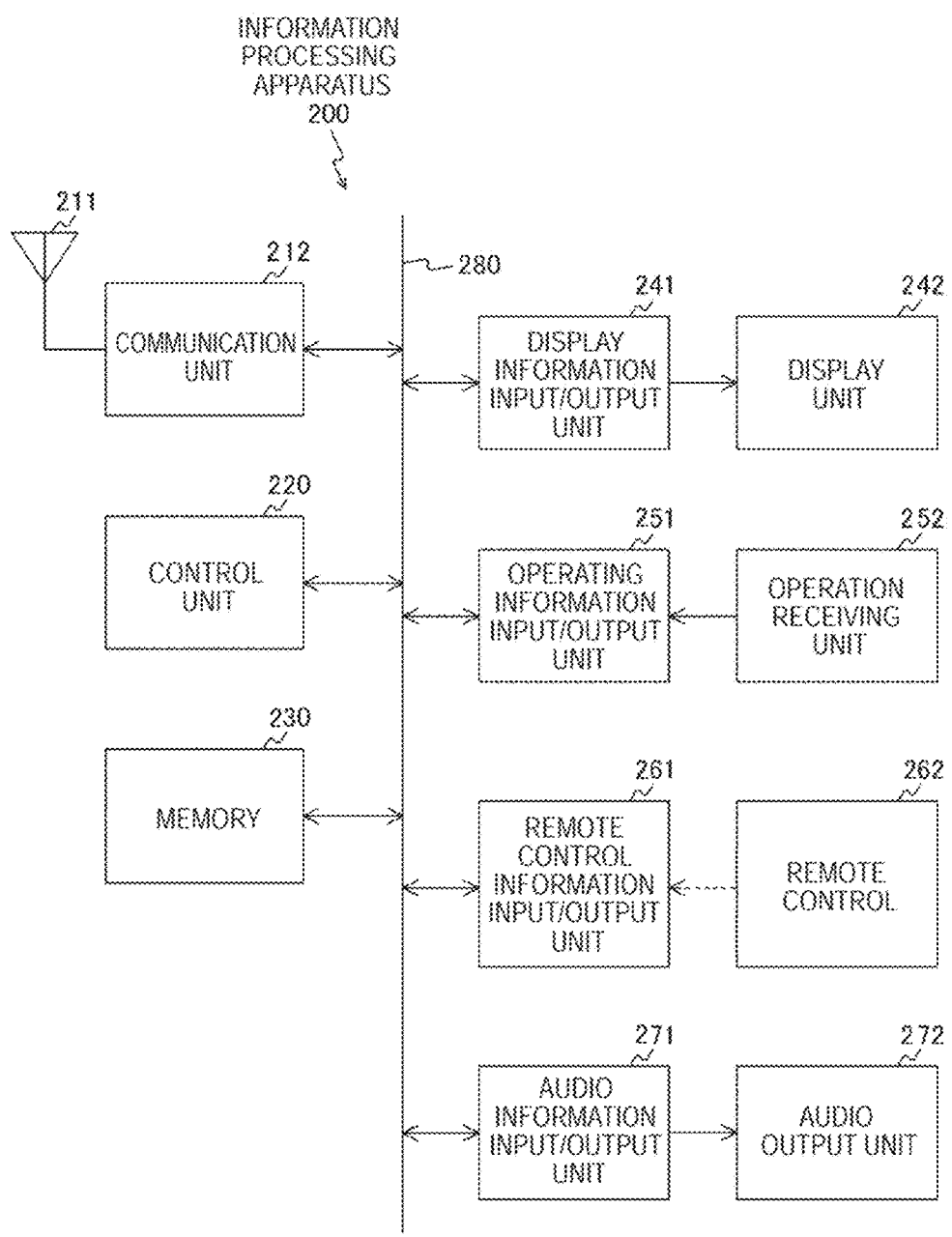
FIG. 3 is a block diagram illustrating an exemplary internal configuration of an information processing apparatus 200 according to a first embodiment of the present technology.

FIG. 3 is a block diagram illustrating an exemplary internal configuration of an information processing apparatus 200 according to a first embodiment of the present technology.

The information processing apparatus 200 is equipped with an antenna 211, a communication unit 212, a control unit 220, memory 230, a display information input/output unit 241, and a display unit 242. In addition, the information processing apparatus 200 is equipped with an operating information input/output unit 251, an operation receiving unit 252, a remote control information input/output unit 261, an audio information input/output unit 271, and an audio output unit 272. In addition, these components are connected via a bus 280.

The information processing apparatus 200 is an information processing device for which the size of the display unit 242 (display size) is larger than the display size of the information processing apparatus 100, for example.

Meanwhile, the antenna 211, the communication unit 212, the display information input/output unit 241, the display unit 242, the audio information input/output unit 271, and the audio output unit 272 correspond to the respective components of the same name illustrated in FIG. 2. For this reason, a detailed description of these components will be reduced or omitted herein. For example, the display unit 242 displays an image based on image data transmitted from the information processing apparatus 100. As another example, the audio output unit 272 outputs audio based on audio data transmitted from the information processing apparatus 100. Note that the display unit 242 and the audio output unit 272 are examples of the output unit described in the claims.

The control unit 220 controls the operation of each component of the information processing apparatus 100 on the basis of a control program stored in the memory 230. For example, the control unit 220 conducts signal processing on transmitted and received information. In addition, the control unit 220 is realized by a CPU, for example.

The memory 230 is memory that stores various information. For example, various information (for example, a control program) required for the information processing apparatus 200 to conduct desired operation is stored in the memory 230. In addition, the memory 230 stores various content to be played back (for example, video content and still image content).

For example, the control unit 220 is able to output (image display, audio output) various content provided from another wireless communication apparatus using wireless communication.

As another example, the control unit 220 causes the display unit 242 to display authentication key information for allowing the information processing apparatus 100 to make a wireless connection with the information processing apparatus 200 in order to transmit data from the information processing apparatus 100 to the information processing apparatus 200 using wireless communication. For example, as illustrated in FIG. 1, a cat image 12 is displayed on the display unit 242 as authentication key information. As another example, the control unit 220 decides whether or not to allow the information processing apparatus 100 to make the wireless connection on the basis of authentication key information input into the information processing apparatus 100 and authentication key information displayed on the display unit 242. For example, in the case of determining that the authentication key information input into the information processing apparatus 100 is in agreement with the authentication key information output to the display unit 242, the control unit 220 decides to allow the information processing apparatus 100 to make the wireless connection. As another example, after deciding to allow the information processing apparatus 100 to make a wireless connection, the control unit 220 causes the display unit 242 to display an image based on content transmitted from the information processing apparatus 100, and causes audio based on the content to be output from the audio output unit 272.

The operation receiving unit 252 is an operation receiving unit that receives operating input performed by a user, and outputs operating information corresponding to received operating input to the control unit 220 via the operating information input/output unit 251. The operation receiving unit 252 is realized by operating members such as buttons (for example, a power button and a settings button), for example. Note that the operation receiving unit 252 and the display unit 242 may also be integrated by using a touch panel that enables a user to perform operating input by bringing a finger in contact with or in proximity to a display screen.

The remote control 262 is a remote control for remotely operating the information processing apparatus 200 from a distant location, and transmits an operating signal corresponding to operating input performed by the user (remote control information) to the remote control information input/output unit 261. For example, an infrared signal may be used as the output signal of the remote control 262.

The remote control information input/output unit 261 conducts the input/output of an operating signal from the remote control 262 (remote control information). For example, upon receiving an operating signal from the remote control 262, the remote control information input/output unit 261 supplies the received operating signal to the control unit 220.

[Example Information Format]

Figure 4:
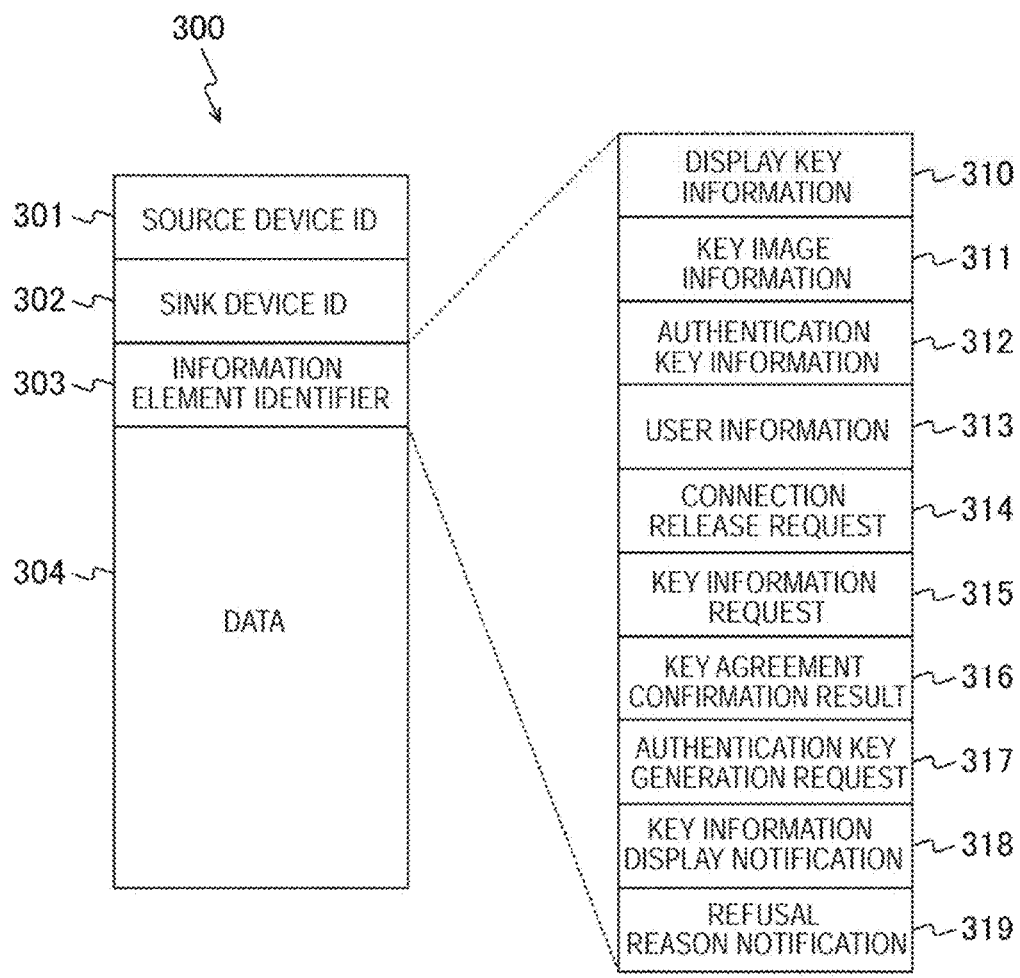
FIG. 4 is a diagram schematically illustrating an example format of information 300 communicated among apparatuses constituting a communication system 10 according to the first embodiment of the present technology.

FIG. 4 is a diagram schematically illustrating an example format of information 300 communicated among devices constituting a communication system 10 according to the first embodiment of the present technology. In other words, FIG. 4 illustrates an example format of information 300 communicated between the source device and the sink device.

The information 300 communicated between the source device and the sink device includes a source device ID 301, a sink device ID 302, an information element identifier 303, and data 304.

The source device ID 301 is identification information (an identification number) for identifying the source device. Also, the sink device ID 302 is identification information for identifying the sink device. For this identification information, a device-specific ID (for example, a media access control (MAC) address) may be used.

The information element identifier 303 is information for identifying what is the information to be transmitted. For example, the information element identifier 303 stores information for identifying any of the display key information 310 to the refusal reason notification 319.

The display key information 310 is information indicating that the content of the data 304 is a key code for displaying a key image on the sink device. The key code is identification information for specifying a key image that should be displayed on the sink device, for example. In other words, the key code is information by which the sink device converts a key into image information. For example, suppose that "001" is a key code for specifying an image of a cat, while "002" is a key code for specifying an image of a dog. In this case, when the key image that should be displayed on the sink device is an image of a cate (for example, the cat image 12 illustrated in FIG. 1), the key code "001" for specifying an image of a cate is stored in the data 304.

The key image information 311 is information indicating that the content of the data 304 is a key image to be displayed on the sink device. In other words, when the key image information 311 is stored in the information element identifier 303, the key image (key image data) is stored in the data 304.

The authentication key information 312 is information indicating that the content of the data 304 is a key code transmitted from the source device to the sink device (a key code transmitted from the source device after a key image displayed on the sink device is read on the source device side). In other words, when the authentication key information 312 is stored in the information element identifier 303, a key code (for example, the key code "001" for specifying an image of a cat) is stored in the data 304.

The user information 313 is information indicating that the content of the data 304 is data transmitted from the source device to the sink device after authentication (for example, user content (still image content, video content)). For example, when the user information 313 is stored in the information element identifier 303, user content (still image content, video content) is stored in the data 304.

Herein, the key image information 311 and the user information 313 are the same in that both are information indicating that the content of the data 304 is image information. However, the user information 313 is information that is exchanged only between the source device and the sink device after authentication is completed. Conversely, the key image information 311 differs by being information that is exchanged between the source device and the sink device before authentication is completed. In other words, the sink device needs to display only an image corresponding to the key image information 311 on the display unit, even in the state before authentication.

The connection release request 314 is information indicating that the content of the data 304 is a request for releasing a connected state between the source device and the sink device (connection release request). In other words, when the connection release request 314 is stored in the information element identifier 303, information related to a connection release request is stored in the data 304.

The key information request 315 is information indicating that the content of the data 304 is a key information transmission request that requests the source device to transmit authentication key information to a key information-providing server. In other words, when the key information request 315 is stored in the information element identifier 303, information related to a key information transmission request is stored in the data 304. Note that the key information-providing server will be illustrated in the fourth embodiment of the present technology.

The key agreement confirmation result 316 is information indicating that the content of the data 304 is the result (key agreement confirmation result) of a key authentication (key agreement confirmation). In other words, when the key agreement confirmation result 316 is stored in the information element identifier 303, a key agreement confirmation result (agreement or disagreement) is stored in the data 304.

The authentication key generation request 317 is information indicating that the content of the data 304 is an authentication key generation request that requests the sink device to generate an authentication key. In other words, when the authentication key generation request 317 is stored in the information element identifier 303, information related to an authentication key generation request is stored in the data 304.

The key information display notification 318 is information indicating that the content of the data 304 is a notification to the source device that authentication key information is displayed on the sink device (key information display notification). In other words, when the key information display notification 318 is stored in the information element identifier 303, information related to a key information display notification is stored in the data 304.

The refusal reason notification 319 is information indicating that the content of the data 304 is a reason for refusal in the case in which a connection request from the source device is refused (a refusal reason notification transmitted from the sink device to the source device). In other words, when the refusal reason notification 319 is stored in the information element identifier 303, information related to a refusal reason notification is stored in the data 304. Note that a connection request is a request for a wireless connection to the sink device in order to conduct data transmission from the source device to the sink device using wireless communication. In other words, a connection request may be understood as a request for causing the sink device to output authentication key information for the purpose of allowing the sink device to make the wireless connection.

The data 304 is data corresponding to the information stored in the information element identifier 303.

[Communication Example]

Figure 5:
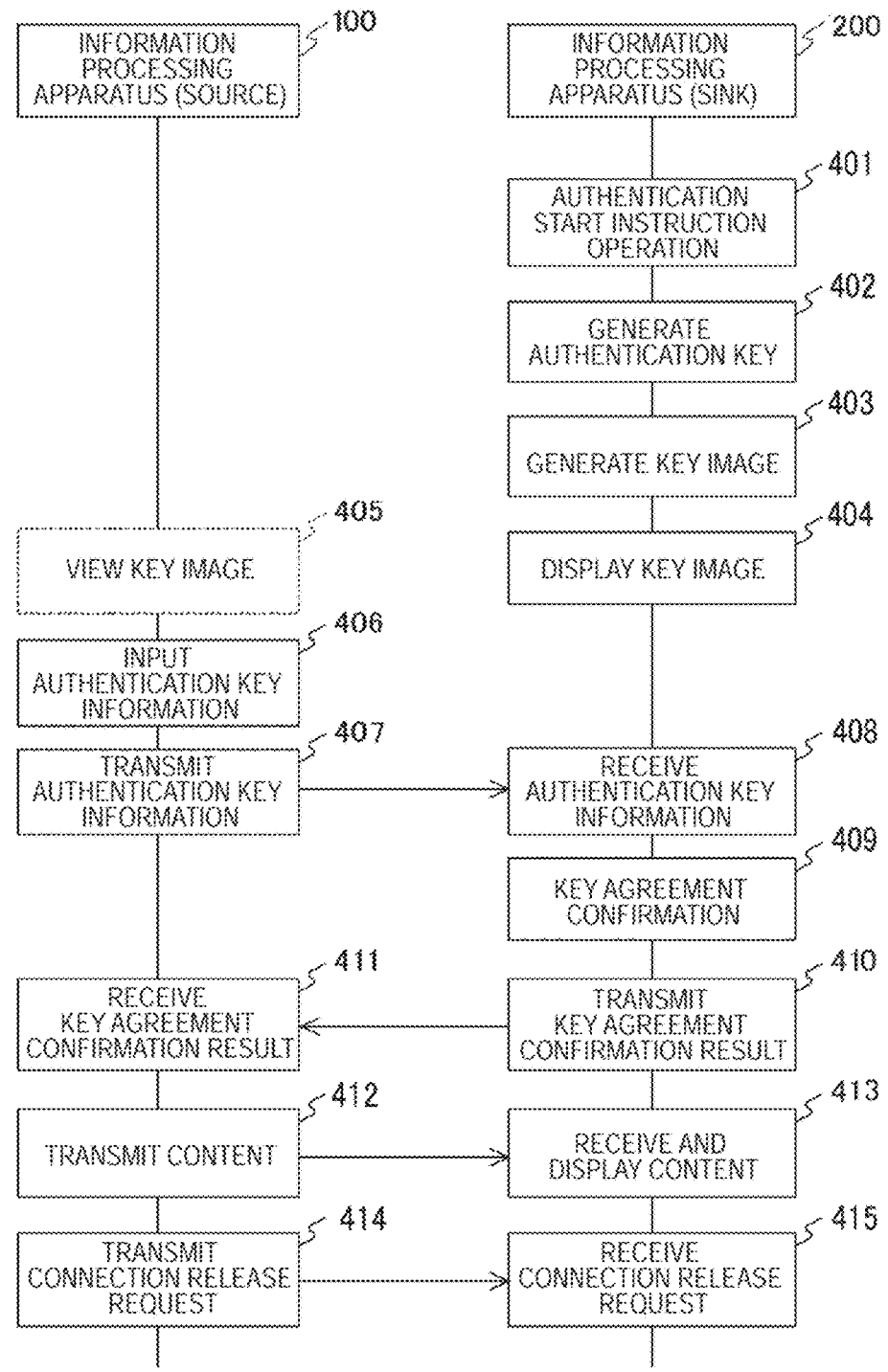
FIG. 5 is a sequence flowchart illustrating an exemplary communication process among apparatuses constituting a communication system 10 according to a first embodiment of the present technology.

FIG. 5 is a sequence flowchart illustrating an exemplary communication process among apparatuses constituting a communication system 10 according to a first embodiment of the present technology. Note that FIG. 5 illustrates an exemplary communication process in the case of a user 11 performing an authentication start instruction operation in the state illustrated in FIG. 1. In addition, FIG. 5 illustrates an exemplary communication process in the case in which the user 11 performs the authentication start instruction operation on the sink device (information processing apparatus 200), and an authentication key is generated on the side of the sink device (information processing apparatus 200).

First, the user 11 performs an authentication start instruction operation by using the operation receiving unit 252 or the remote control 262 of the information processing apparatus 200 on the sink side (401). For example, an operable member for performing the authentication start instruction operation (for example, a settings button) is pressed (401).

In this way, when an authentication start instruction operation is performed on the information processing apparatus 200 on the sink side (401), the control unit 220 of the information processing apparatus 200 on the sink side is triggered by the authentication start instruction operation to generate an authentication key to use when conducting the authentication process (402). For example, in the example illustrated in FIG. 1, "CAT (cat)" is generated as the key.

Next, the control unit 220 of the information processing apparatus 200 on the sink side converts the generated authentication key into image information to generate a key image (403). The key image is an image corresponding to the generated authentication key, and is an image enabling the user to perceive the generated authentication key. For example, in the example illustrated in FIG. 1, an image of a cat (cat image 12) corresponding to the key "CAT (cat)" is generated as the key image.

Next, the control unit 220 of the information processing apparatus 200 on the sink side causes the display unit 242 to display the generated key image (404). For example, in the example illustrated in FIG. 1, the cat image 12 is displayed on the display unit 242 as the key image. In this way, by having the key image be displayed on the display unit 242, the user 11 is able to perceive the key image (405). For example, as illustrated in FIG. 1, when the cat image 12 is displayed on the display unit 242 as the key image, the user 11 is able to grasp that the key is "CAT (cat)".

In this way, after perceiving the key image (for example, "CAT (cat)") displayed on the display unit 242 (405), the user 11 inputs authentication key information corresponding to the key image into the operation receiving unit 152 of the information processing apparatus 100 on the source side (406). For example, as illustrated in FIG. 1, when the cat image 12 is displayed on the display unit 242 as the key image, the user 11 inputs "CAT" as the authentication key information. At this point, if an input method is specified (for example, if katakana input is specified), characters corresponding to the specification (for example, katakana) are input.

As another example, the authentication key information corresponding to the key image may also be input by speech, for example. For example, the audio input unit 172 of the information processing apparatus 100 on the source side may be used to input the speech "CAT" of the authentication key information, and the authentication key information "CAT" may be acquired on the basis of the speech.

Next, the control unit 120 of the information processing apparatus 100 on the source side uses wireless communication to transmit the input authentication key information to the information processing apparatus 200 on the sink side (407, 408). Identification information of the information processing apparatus 100 is stored in the source device ID 301 (illustrated in FIG. 4) and identification information of the information processing apparatus 200 is stored in the sink device ID 302 (illustrated in FIG. 4) included in the information to be transmitted in this case. In addition, the authentication key information 312 is stored in the information element identifier 303 (illustrated in FIG. 4), and the input authentication key information is stored in the data 304 (illustrated in FIG. 4). Note for the various information illustrated hereinafter, suppose that identification information of the information processing apparatus 100 is likewise stored in the source device ID 301 (illustrated in FIG. 4) and identification information of the information processing apparatus 200 is likewise stored in the sink device ID 302 (illustrated in FIG. 4).

After receiving the authentication key information (408), the control unit 220 of the information processing apparatus 200 on the sink side confirms whether or not the generated authentication key information is in agreement with the received authentication key information (the authentication key information stored in the data 304 (illustrated in FIG. 4)) (409). In other words, it is confirmed whether or not the authentication key information that is generated when triggered by the authentication start instruction operation is in agreement with the authentication key information received after a key image corresponding to the authentication key information is displayed on the display unit 242 (409).

Next, the control unit 220 of the information processing apparatus 200 on the sink side transmits the result of the agreement confirmation of the authentication key information (key agreement confirmation result) to the information processing apparatus 100 on the source side (410, 411). In this case, the key agreement confirmation result 316 is stored in the information element identifier 303 (illustrated in FIG. 4) and a key agreement confirmation result (agreement or disagreement) is stored in the data 304 (illustrated in FIG. 4) included in the information to be transmitted.

For example, when the cat image 12 (key image) is displayed on the display unit 242 (404) and "CAT" is input as the key agreement confirmation result (406), the two sets of authentication key information are judged to be in agreement (409). In this case, a key agreement confirmation result (agreement) indicating that the keys are in agreement is transmitted from the information processing apparatus 200 on the sink side to the information processing apparatus 100 on the source side (410, 411). In other words, information (a key agreement confirmation result) indicating that authentication was successful is transmitted from the information processing apparatus 200 on the sink side to the information processing apparatus 100 on the source side (410, 411).

In this way, when authentication is successful, the information processing apparatus 100 on the source side and the information processing apparatus 200 on the sink side enter a connected state. Consequently, content transmitted from the information processing apparatus 100 on the source side to the information processing apparatus 200 on the sink side may be output from the information processing apparatus 200 on the sink side (412, 413). In other words, after the key agreement confirmation result indicating that authentication was successful is transmitted to the information processing apparatus 100 on the source side, content transmitted by the information processing apparatus 100 on the source side may be output from the information processing apparatus 200 on the sink side (412, 413).

For example, content stored in the memory 130 of the information processing apparatus 100 on the source side may be transmitted from the information processing apparatus 100 on the source side to the information processing apparatus 200 on the sink side using wireless communication (412, 413). Subsequently, when the content (still image content or video content) is received (413), the information processing apparatus 200 on the sink side is able to display the received content on the display unit 242 (413).

In addition, when the transmission of content to be output from the information processing apparatus 200 on the sink side ends, the control unit 120 of the information processing apparatus 100 on the source side transmits a connection release request to the information processing apparatus 200 on the sink side (414, 415). In this case, the connection open request 314 is stored in the information element identifier 303 (illustrated in FIG. 4) and information related to a connection release request is stored in the data 304 (illustrated in FIG. 4) included in the information to be transmitted.

In this way, by transmitting a connection release request, the connected state between the information processing apparatus 100 on the source side and the information processing apparatus 200 on the sink side may be ended.

As another example, when the cat image 12 (key image) is displayed on the display unit 242 (404), and information other than "CAT" (such as letters, signs, or numbers) is input as the key agreement confirmation result (406), the two sets of authentication key information are judged not to be in agreement (409). For example, if "PENGUIN" is input as the authentication key information (406), the two sets of authentication key information are judged not to be in agreement (409). In this case, a key agreement confirmation result (disagreement) indicating that the keys are not in agreement is transmitted to the information processing apparatus 100 on the source side (410, 411). In other words, information (a key agreement confirmation result) indicating that authentication failed is transmitted from the information processing apparatus 200 on the sink side to the information processing apparatus 100 on the source side (410, 411). In this case, the key agreement confirmation result 316 is stored in the information element identifier 303 (illustrated in FIG. 4) and a key agreement confirmation result (disagreement) is stored in the data 304 (illustrated in FIG. 4) included in the information to be transmitted.

In this way, when authentication fails, the transmission of content from the information processing apparatus 100 on the source side to the information processing apparatus 200 on the sink side cannot be conducted. For this reason, when authentication fails, the user may also be notified of the failure. For example, notification information indicating that authentication failed may be output (image display, audio output) from at least one of the information processing apparatus 100 on the source side and the information processing apparatus 200 on the sink side.

FIG. 5 illustrates an example in which the user 11 perceives a key image displayed on the display unit 242 of the information processing apparatus 200 on the sink side, and inputs authentication key information corresponding to the key image. However, the information processing apparatus 100 may also be made to input authentication key information.

For example, the image capture unit 162 of the information processing apparatus 100 on the source side captures an image of the key image displayed on the display unit 242 of the information processing apparatus 200 on the sink side, and acquires the key image. Subsequently, the control unit 120 of the information processing apparatus 100 on the source side may acquire authentication key information on the basis of the acquired key image, and transmit the acquired authentication key information to the information processing apparatus 200 on the sink side.

For example, the control unit 120 of the information processing apparatus 100 on the source side may treat the key image acquired by the image capture unit 162 as the authentication key information, and transmit the authentication key information to the information processing apparatus 200 on the sink side. In this case, the information processing apparatus 200 on the sink side confirms agreement between the generated key image and the received key image. In this case, agreement may be confirmed with a matching process between the images, for example.

Also, although FIG. 5 illustrates an example of displaying a key image (cat image 12) with a user-intelligible representation, a key image with an unintelligible representation may also be displayed. In this case, the user is able to use the key image to acquire authentication key information.

Figure 6:
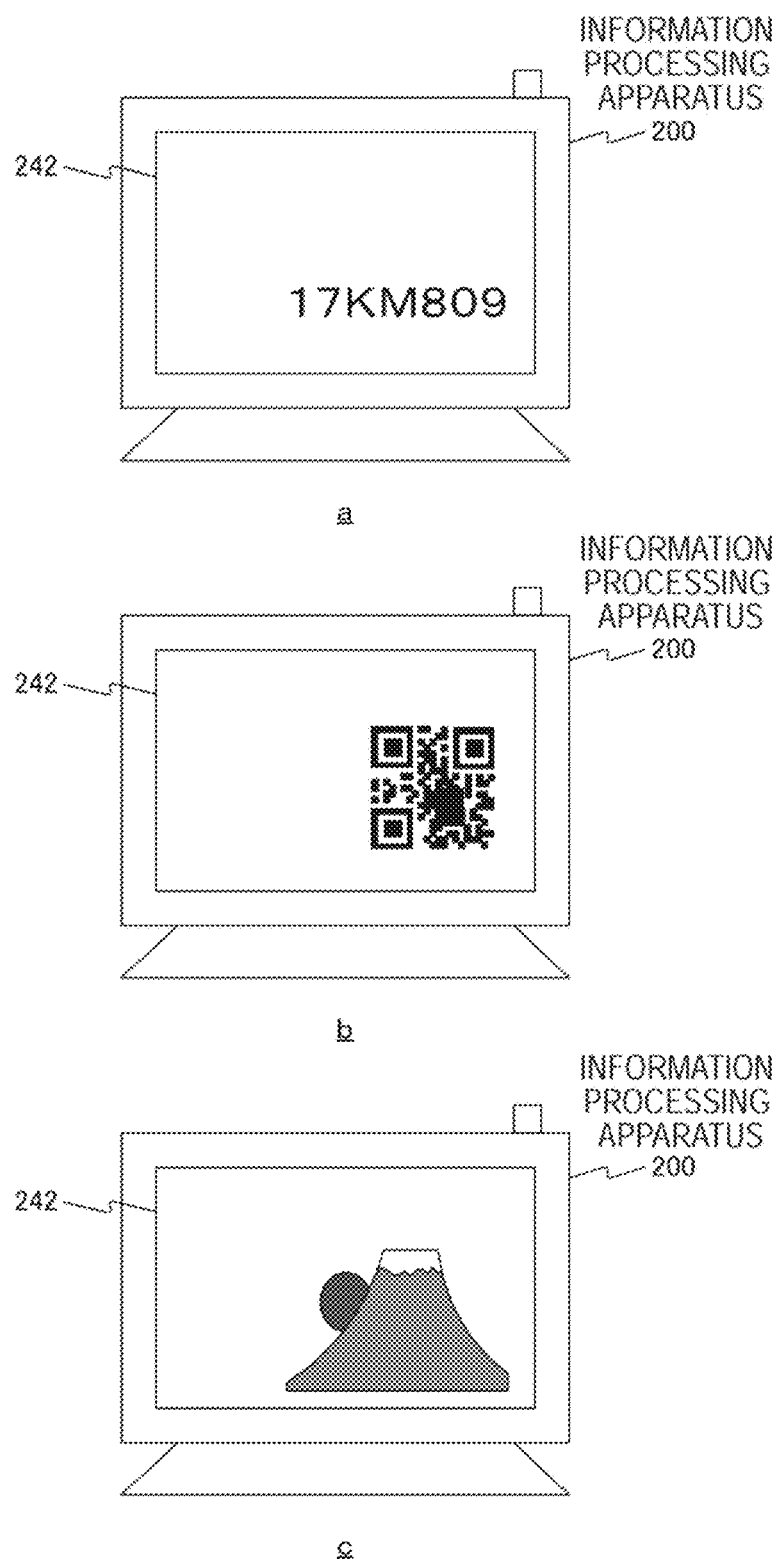
FIG. 6 is a diagram illustrating an example display of a key image displayed on a display unit 242 of an information processing apparatus 200 according to a first embodiment of the present technology.

For example, information such as letters, signs, and numbers may be displayed and recognized using recognition technology, and authentication key information may be acquired on the basis of the recognition result. FIG. 6(*a*) illustrates an example display.

In addition, a multi-dimensional code (for example, a one-dimensional code, a two-dimensional code, or a three-dimensional code) may be displayed and recognized using recognition technology, and authentication key information may be acquired on the basis of the recognition result. FIG. 6(*b*) illustrates an example display.

In addition, a watermark (digital watermark) may be displayed, and authentication key information may be acquired using the watermark. FIG. 6(*c*) illustrates an example display.

[Example Display of Key Image]

FIG. 6 is a diagram illustrating an example display of a key image displayed on a display unit 242 of an information processing device 200 according to a first embodiment of the present technology.

FIG. 6(*a*) illustrates an example of displaying letters, signs, numbers, or symbols (emoji) as a key image. In this case, for example, the user perceives the key image (17KM809) displayed on the display unit 242, and by inputting the key image (17KM809) into the operation receiving unit 152 of the information processing apparatus 100, the information processing apparatus 100 is able to acquire authentication key information. Also, as discussed above, the authentication key information (17KM809) may be recognized using recognition technology, and authentication key information may be acquired on the basis of the recognition result.

FIG. 6(*b*) illustrates an example of displaying a two-dimensional code (such as a Quick Response code (QR code; registered trademark), for example) as a key image.

Herein, a QR code is a matrix-type two-dimensional code in which small squares (including the concentric squares placed at three corners) are placed horizontally and vertically according to a designated rule. Also, by capturing and scanning the QR code, various information (accompanying information) corresponding to the squares placed in the QR code may be acquired.

In this case, for example, the image capture unit 162 captures an image of the key image (QR code) displayed on the display unit 242, and the control unit 120 analyzes the key image (QR code) generated by the image capture to acquire valid information (authentication key information).

Also, instead of a QR code, a barcode may also be displayed and used. Also, another multi-dimensional code may be displayed and used.

FIG. 6(*c*) illustrates an example of displaying an image (Mt. Fuji at sunrise) in which a watermark (digital watermark) is embedded as a key image.

A watermark is a digital watermark embedded into an image to be displayed. Also, an embodiment of the present technology illustrates an example of embedding authentication key information into an image to be displayed. Herein, there are primarily two types of watermarks: perceptible watermarks (visible watermarks), and imperceptible watermarks (invisible watermarks).

Figure 15:
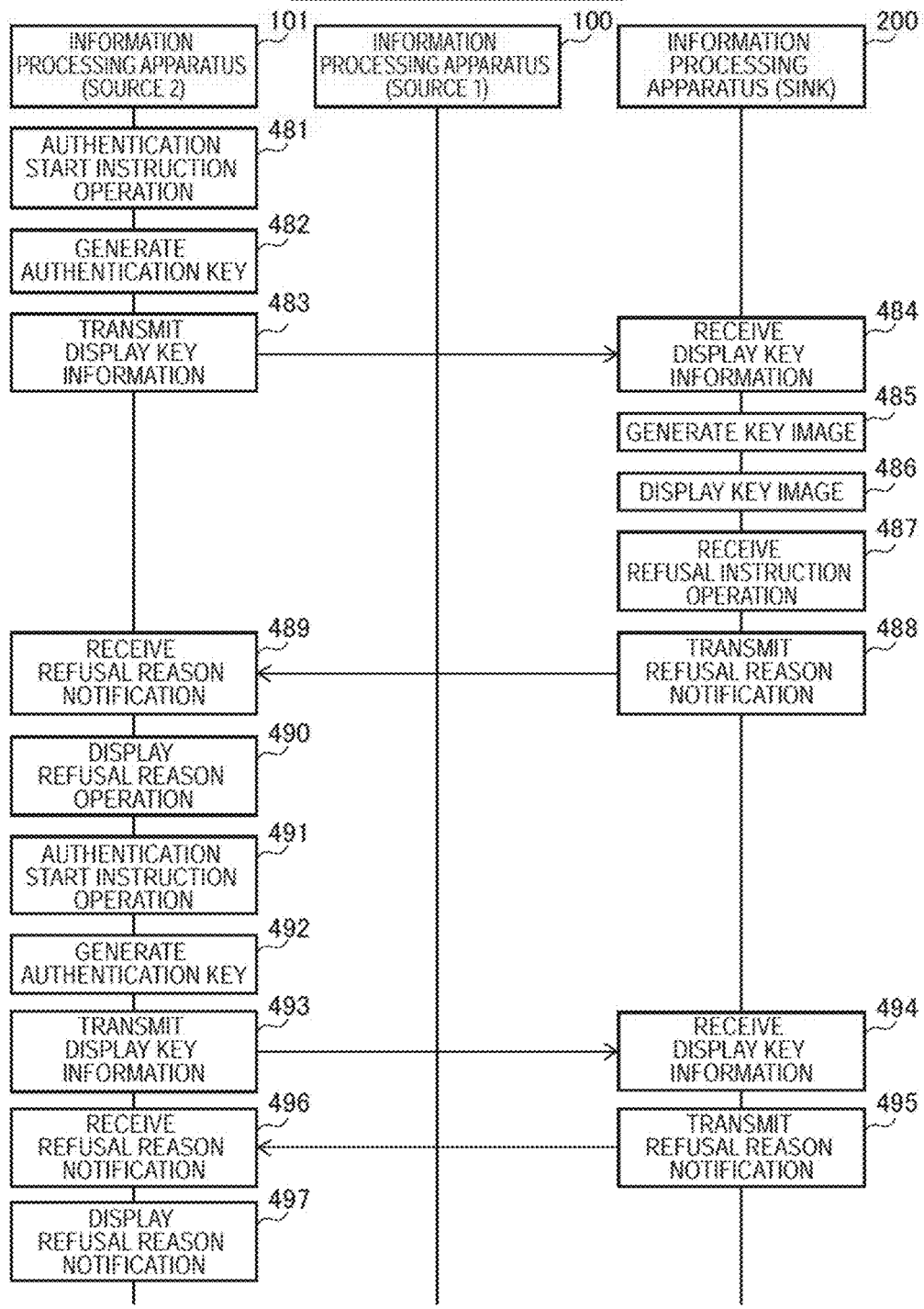
FIG. 15 is a sequence flowchart illustrating an exemplary communication process among apparatuses constituting a communication system 30 according to a second embodiment of the present technology.

In the case of an imperceptible watermark, the user is unaware even after looking at an image displayed on the display unit 242 of the information processing apparatus 200 on the sink side. For this reason, it is preferable to display the watermark while also notifying the user that a watermark is being displayed. For example, an image display or audio output indicating that a watermark is being displayed may be conducted. FIG. 15 illustrates an example notification.

Note that the case of an imperceptible watermark requires significant computation to be carried out when generating the image of the watermark. However, a notification of authentication key information may be issued even while the user is viewing an image displayed on the display unit 242 of the information processing apparatus 200 on the sink side, without impeding the viewing.

As another example, the orientation of the information processing apparatus 100 on the source side (for example, vibration or tilt) may be used to input authentication key information. For example, a sensor that detects the orientation (for example, a gyro sensor or an acceleration sensor) is provided in the information processing apparatus 100 on the source side. Subsequently, "Shake the information processing apparatus 100 three times" is displayed on the display unit 242 of the information processing apparatus 200 as authentication key information, for example. In this case, for example, if the user 11 shakes the information processing apparatus 100 three times, a sensor detects the three vibrations. On the basis of the detection result, the control unit 120 of the information processing apparatus 100 on the source side is able to acquire authentication key information (three vibrations).

Note that although FIG. 6 illustrates an example of displaying comparatively large authentication key information for the sake of simplicity, the authentication key information is preferably displayed in a corner (for example, the lower left or the lower right) on the display screen of the display unit 242.

Also, the authentication key information preferably changes every time authentication key information is displayed. For example, the key image illustrated in FIG. 1 (the image obtained by converting authentication key information into a representational image), the characters illustrated in FIG. 6(a), the QR code illustrated in FIG. 6(b), and the watermark illustrated in FIG. 6(c) may be displayed successively. In addition, the content of authentication key information of the same type may also be successively changed and displayed. For example, when displaying a key image obtained by converting authentication key information into a representational image, animals (for example, a cat, dog, horse, and rabbit), vehicles (for example, a car, train, and motorcycle), and the like may be successively changed and displayed. In addition, the authentication key information may also be changed and displayed according to user preferences. For example, for a user who loves cars, various types of cars may be displayed as the authentication key information, and the name of the type of car being displayed may be input as the authentication key information. Note that user information related to user preferences may be stored in an information processing apparatus possessed by the user, and user preferences may be acquired on the basis of the user information, for example. Also, an embodiment of the present technology illustrates an example of generating authentication key information (or a key image) every time the authentication start instruction operation is performed. However, authentication key information (or key images) may be stored in an apparatus in advance, and every time the authentication start instruction operation is performed, one from among the stored authentication key information (or key images) may be successively selected and used. In this case, one from among the stored authentication key information (or key images) may be selected according to a designated order, or selected randomly.

Note that the authentication key information illustrated in FIG. 1 and FIG. 6 is an example, and the authentication key information is not limited thereto. In other words, authentication key information other than the authentication key information illustrated in FIG. 1 and FIG. 6 may be displayed and used as authentication key information.

[Example of Information Processing Apparatus on the Source Side Generating Authentication Key]

Figure 7:
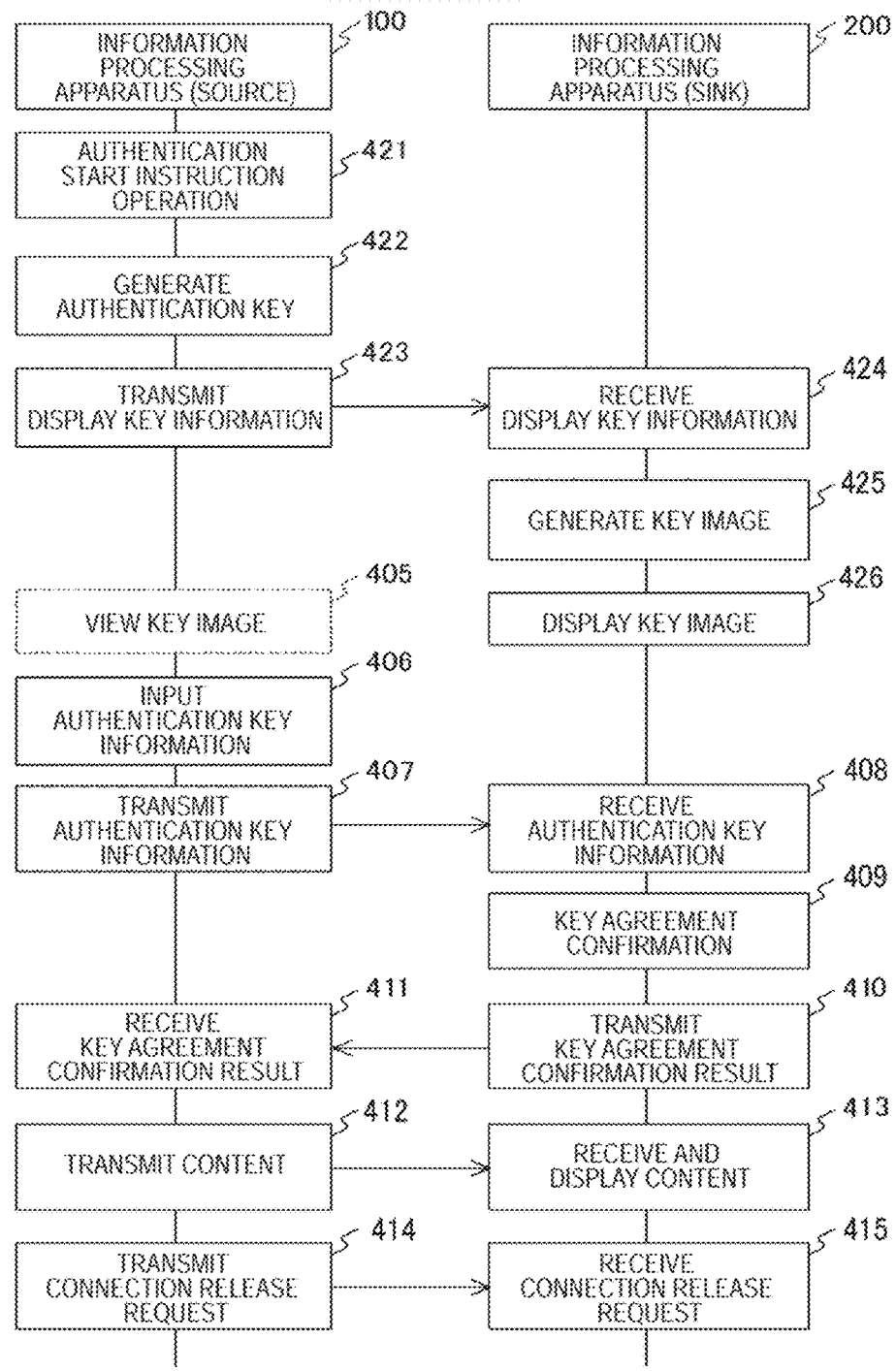
FIG. 7 is a sequence flowchart illustrating an exemplary communication process among apparatuses constituting a communication system 10 according to a first embodiment of the present technology.
Figure 8:
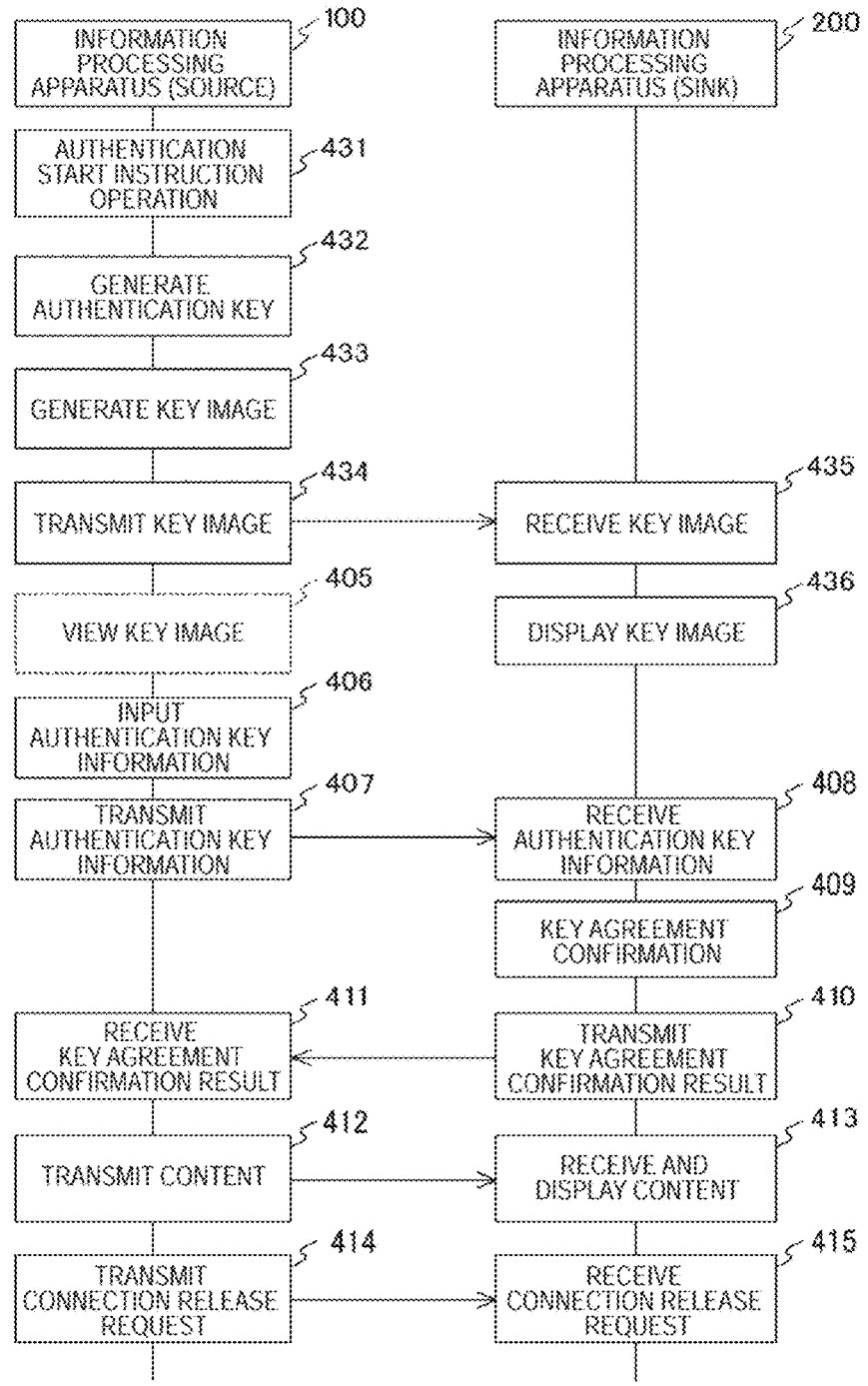
FIG. 8 is a sequence flowchart illustrating an exemplary communication process among apparatuses constituting a communication system 10 according to a first embodiment of the present technology.

Although FIG. 5 illustrates an example of performing the authentication start instruction operation on the information processing apparatus 200 on the sink side, the authentication start instruction operation may also be performed on the information processing apparatus 100 on the source side. Accordingly, FIG. 7 and FIG. 8 illustrate such a communication example. Note that FIG. 7 illustrates an example of the information processing apparatus on the source side generating an authentication key. Meanwhile, FIG. 8 illustrates an example of the information processing apparatus on the source side generating a key image.

FIG. 7 is a sequence flowchart illustrating an exemplary communication process among apparatuses constituting a communication system 10 according to a first embodiment of the present technology. Note that since the exemplary communication process illustrated in FIG. 7 is a partial modification of the communication process illustrated in FIG. 5, the parts shared in common with the communication process illustrated in FIG. 5 are denoted with the same signs, and some of the description thereof will be reduced or omitted.

First, the user 11 performs an authentication start instruction operation on the operation receiving unit 152 of the information processing apparatus 100 on the source side (421). For example, the user 11 performs an operation of pressing an operable member (for example, a touch panel or a keyboard) for performing the authentication start instruction operation (421).

In this way, when an authentication start instruction operation is performed on the information processing apparatus 100 on the source side (421), the control unit 120 of the information processing apparatus 100 on the source side is triggered by the authentication start instruction operation to generate an authentication key to use when conducting the authentication process (422). For example, in the example illustrated in FIG. 1, "CAT (cat)" is generated as the authentication key.

Next, the control unit 120 of the information processing apparatus 100 on the source side transmits display key information for converting the generated authentication key into image information to the information processing apparatus 200 on the sink side (423, 424). In this case, the display key information 310 is stored in the information element identifier 303 (illustrated in FIG. 4) and display key information (a key code) corresponding to the generated authentication key is stored in the data 304 (illustrated in FIG. 4) included in the information to be transmitted.

After receiving the display key information (424), the control unit 220 of the information processing apparatus 200 on the sink side converts the received display key information into image information to generate a key image (425). For example, in the example illustrated in FIG. 1, the cat image 12 corresponding to the key "CAT (cat)" is generated.

Next, the control unit 220 of the information processing apparatus 200 on the sink side causes the display unit 242 to display the generated key image (426). For example, in the example illustrated in FIG. 1, the cat image 12 is displayed on the display unit 242 as the key image.

Note that since the processes after this point are the same as the communication process illustrated in FIG. 5, a description herein will be omitted.

In this way, by generating an authentication key on the source device side, the processing on the sink device side may be simplified, and the processing on the sink device side may be reduced.

[Example of Information Processing Apparatus on the Source Side Generating Key Image]

FIG. 8 is a sequence flowchart illustrating an exemplary communication process among apparatuses constituting a communication system 10 according to a first embodiment of the present technology. Note that since the exemplary communication process illustrated in FIG. 8 is a partial modification of the communication process illustrated in FIG. 5, the parts shared in common with the communication process illustrated in FIG. 5 are denoted with the same signs, and some of the description thereof will be reduced or omitted.

First, the user 11 performs an authentication start instruction operation on the operation receiving unit 152 of the information processing apparatus 100 on the source side (431). In this way, when an authentication start instruction operation is performed on the information processing apparatus 100 on the source side (431), the control unit 120 of the information processing apparatus 100 on the source side is triggered by the authentication start instruction operation to generate an authentication key to use when conducting the authentication process (432).

Next, the control unit 120 of the information processing apparatus 100 on the source side converts the generated authentication key into image information to generate a key image (433). For example, in the example illustrated in FIG. 1, the cat image 12 corresponding to the key "CAT (cat)" is generated as the key image.

Next, the control unit 120 of the information processing apparatus 100 on the source side transmits the generated key image to the information processing apparatus 200 on the sink side (434, 435). In this case, the key image information 311 is stored in the information element identifier 303 (illustrated in FIG. 4) and the generated key image (image data of a key image) is stored in the data 304 (illustrated in FIG. 4) included in the information to be transmitted.

After receiving the key image, the control unit 220 of the information processing apparatus 200 on the sink side causes the display unit 242 to display the received key image (436). For example, in the example illustrated in FIG. 1, the cat image 12 is displayed on the display unit 242.

Note that since the processes after this point are the same as the communication process illustrated in FIG. 5, a description herein will be omitted.

In this way, by generating even the key image on the source device side, the processing on the sink device side may be simplified further, and the processing on the sink device side may be reduced further.

Note that in the examples illustrated in FIG. 7 and FIG. 8, since the information processing apparatus 100 on the source side generates an authentication key, the information processing apparatus 100 on the source side will know the authentication key displayed on the information processing apparatus 200 on the sink side. Accordingly, in such cases, when inputting the authentication key information, multiple key images (for example, an image of a dog, an image of a cow, and an image of a pig) may be displayed on the display unit 142 of the information processing apparatus 100 on the source side, for example. Subsequently, the key image being displayed on the display unit 242 of the information processing apparatus 200 on the sink side (for example, the cat image 12) may be selected from the multiple key images being displayed on the display unit 142 with a user operation. As a result, the authentication key information input operation may be performed with only a selection operation by the user.

[Example of Selecting Multiple Sink Devices]

Figure 9:
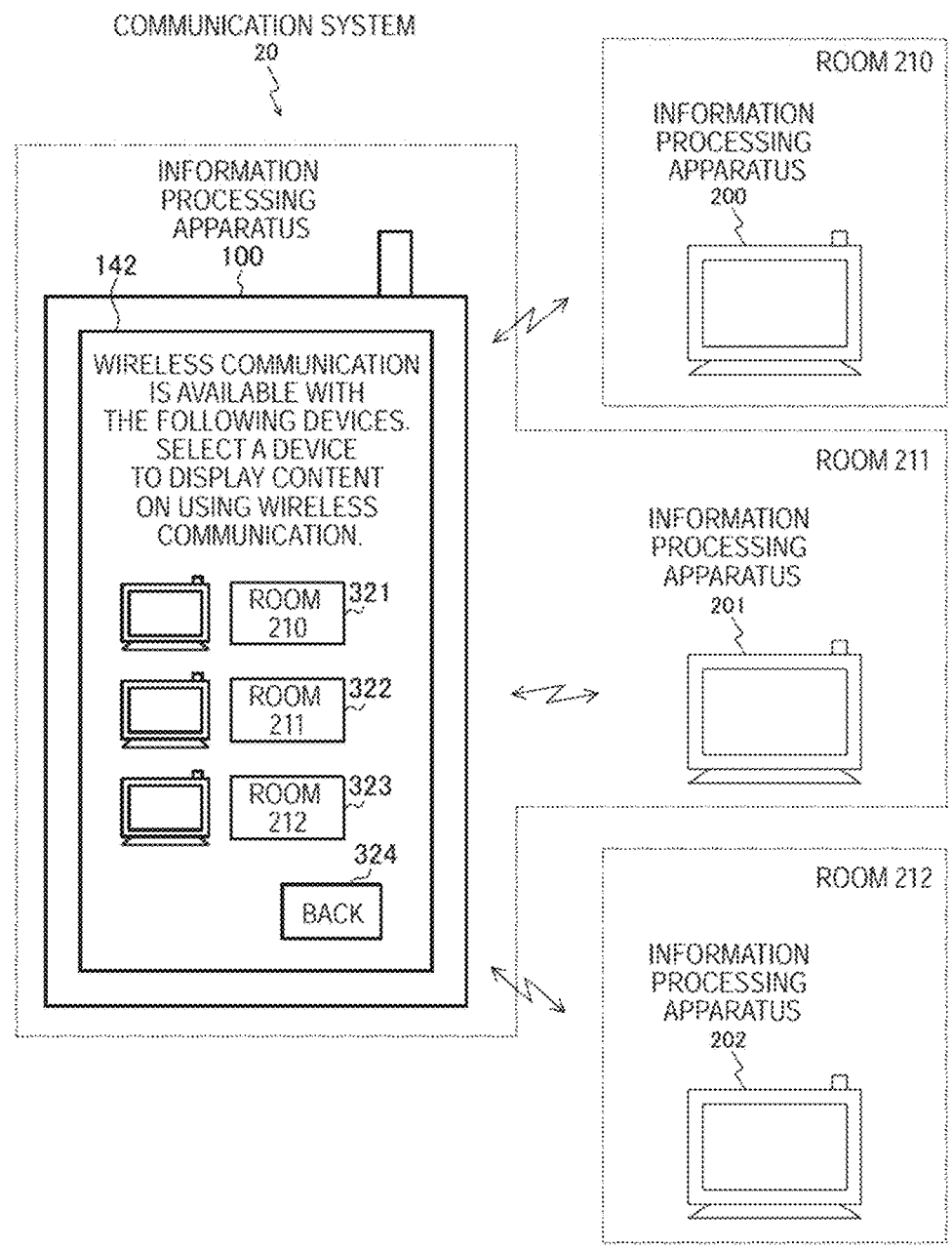
FIG. 9 is a diagram that illustrates an exemplary configuration of a communication system 20 according to a first embodiment of the present technology.

FIG. 9 is a diagram illustrating an exemplary configuration of a communication system 20 according to a first embodiment of the present technology.

FIG. 9 illustrates an example of a hotel in which information processing apparatuses 200 to 202 (corresponding to the information processing apparatus 200 on the sink side illustrated in FIG. 1) are installed in respective rooms (room 210 to room 212). In addition, FIG. 9 illustrates an example of a case in which a user owning an information processing apparatus 100 is staying in room 211 of the hotel.

In FIG. 1, FIG. 5, FIG. 7, FIG. 8, and the like illustrate an example of exchanging information between one source device and the one sink device. Herein, for example, as illustrated in FIG. 9, suppose a case in which a user owning an information processing apparatus 100 is staying at a hotel in which information processing apparatuses 200 to 202 are installed in respective rooms (room 210 to room 212). In this case, it is possible to make a wireless connection between the information processing apparatus 100 owned by the user and the information processing apparatus 201 installed in the room 211 where the user is staying, and cause content stored in the information processing apparatus 100 to be displayed on the information processing apparatus 201.

However, it is also anticipated that a wireless connection is likewise possible between the information processing apparatus 100 and the information processing apparatuses 200 and 202 installed in rooms (room 210 and room 212) other than the room 211 where the user is staying. For example, as illustrated in FIG. 7 and FIG. 8, if information generated by the information processing apparatus 100 on the source side (display key information or a key image) is transmitted, it is anticipated that the information will be transmitted to the information processing apparatuses 201 and 202 other than the information processing apparatus 201. In this case, there is a risk of being unable to appropriately display content stored in the information processing apparatus 100 on the information processing apparatus 201.

Accordingly, FIG. 9 illustrates an example of selecting an information processing apparatus with which to make a wireless connection with a selection operation by the user.

For example, in the example illustrated in FIG. 9, it is decided which sink device from among the multiple sink devices to which to transmit the first display key information (or key image information). For example, multiple sink devices (the information processing apparatuses 200 to 202 on the sink side) detected by the information processing apparatus 100 on the source side are displayed on the display unit 142 of the information processing apparatus 100 on the source side. For example, as illustrated in FIG. 9, selection buttons 321 to 323 corresponding to the information processing apparatuses 200 to 202 installed in the respective rooms (room 210 to room 212) are displayed. Subsequently, the user performs a pressing operation on the selection button 322 corresponding to the desired information processing apparatus 201 from among the selection buttons 321 to 323, and thereby is able to perform the authentication start instruction operation (421 illustrated in FIG. 7, 431 illustrated in FIG. 8). As a result of the authentication start instruction operation, an authentication key is generated, and display key information (or key image information) is transmitted to the information processing apparatus 201 corresponding to the selected selection button (423 illustrated in FIG. 7 (or 434 illustrated in FIG. 8)).

Note that in the example illustrated in FIG. 5 (the example of generating an authentication key on the sink device side), the authentication process is initiated by an authentication start instruction operation on the sink device. For this reason, by performing the authentication start instruction operation on the sink device desired for display, a key image may be displayed appropriately on that sink device. For example, in the example illustrated in FIG. 9, when generating an authentication key on the sink device, by performing the authentication start instruction operation on the information processing apparatus 201 desired for display, a key image may be displayed appropriately on the information processing apparatus 201.

In this way, the control unit 120 of the information processing apparatus 100 on the source side causes the display unit 142 to display information related to multiple sink devices. Subsequently, the control unit 120 transmits information related to a sink device selected by a user operation from among the multiple displayed sink devices to the selected sink device.

In addition, the control unit 220 of the information processing apparatus 200 on the sink side, on the basis of the information related to the selected sink device (the information processing apparatus 201 on the sink side) causes the display unit 242 to display authentication key information for allowing the information processing apparatus 100 on the source side to make a wireless connection. In other words, the control unit 220 causes the information processing apparatus 201 on the sink side to display authentication key information for allowing the information processing apparatus 100 on the source side to make a wireless connection with the sink device selected by a user operation (the information processing apparatus 201 on the sink side) from among the multiple sink devices.

[Example of Information Processing Apparatus on the Source Side Conducting Authentication (Key Agreement Confirmation)]

Although FIG. 5, FIG. 7, and FIG. 8 illustrate an example of conducting authentication (key agreement confirmation) on the information processing apparatus 200 on the sink side, authentication (key agreement confirmation) may also be conducted on the information processing apparatus 100 on the source side. Accordingly, FIG. 10 illustrates such a communication example.

Figure 10:
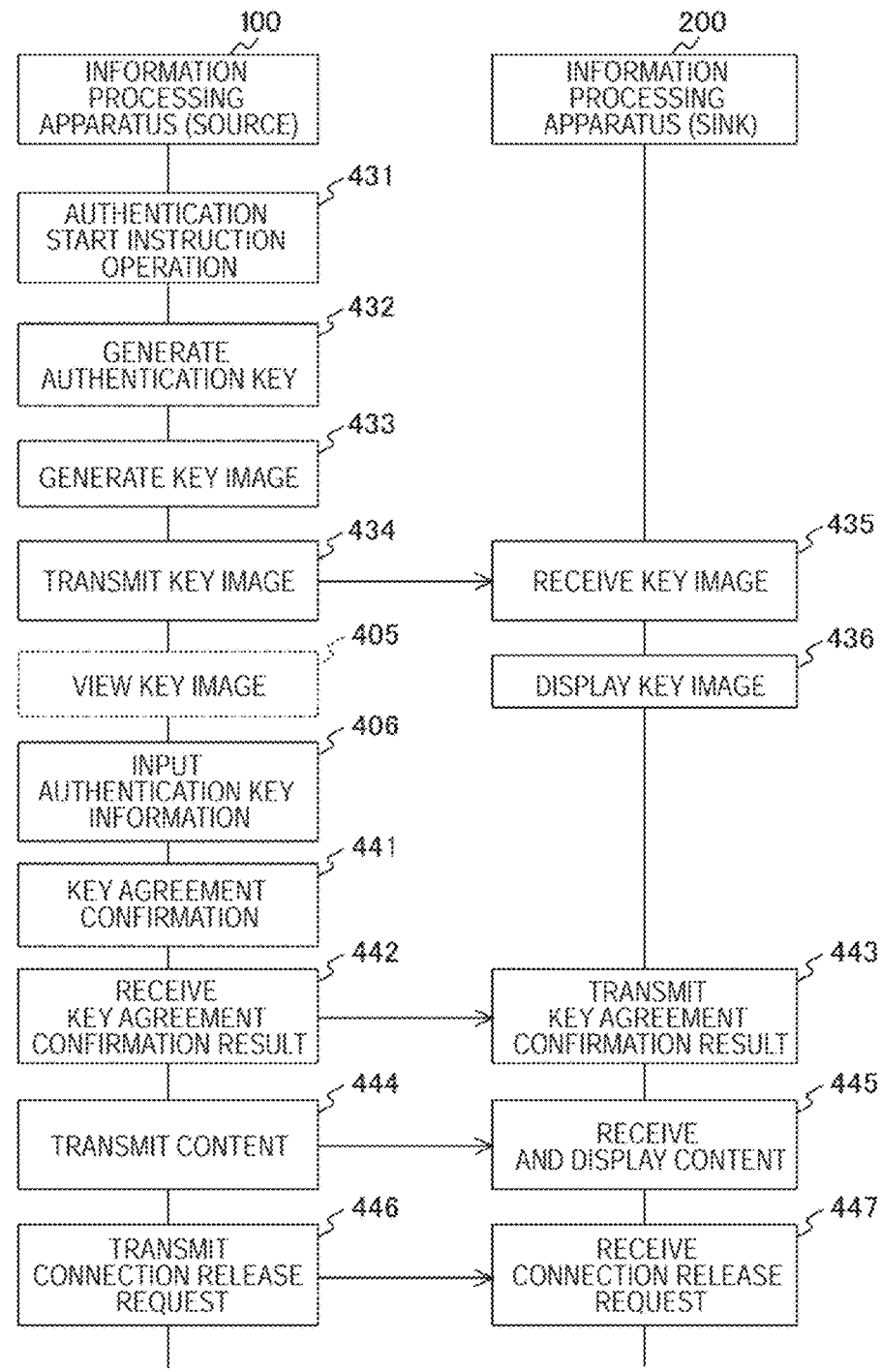
FIG. 10 is a sequence flowchart illustrating an exemplary communication process among apparatuses constituting a communication system 10 according to a first embodiment of the present technology.

FIG. 10 is a sequence flowchart illustrating an exemplary communication process among apparatuses constituting a communication system 10 according to a first embodiment of the present technology. Note that since the exemplary communication process illustrated in FIG. 10 is a partial modification of the communication process illustrated in FIG. 8, the parts shared in common with the communication process illustrated in FIG. 8 are denoted with the same signs, and some of the description thereof will be reduced or omitted.

After perceiving the key image (for example, the cat image 12) displayed on the display unit 242 of the information processing apparatus 200 on the sink side (405), the user 11 inputs authentication key information corresponding to the key image into the operation receiving unit 152 of the information processing apparatus 100 on the source side (406).

Next, the control unit 120 of the information processing apparatus 100 on the source side confirms whether or not the generated authentication key information and the input authentication key information are in agreement (441). In other words, it is confirmed whether or not the authentication key information that is generated when triggered by the authentication start instruction operation is in agreement with the authentication key information that is input after a key image corresponding to the authentication key information is transmitted to the information processing apparatus 200 on the sink side (441).

Next, the control unit 120 of the information processing apparatus 100 on the source side transmits the result of the agreement confirmation of the authentication key information (key agreement confirmation result) to the information processing apparatus 200 on the sink side (442, 443). In this case, the key agreement confirmation result 316 is stored in the information element identifier 303 (illustrated in FIG. 4) and a key agreement confirmation result (agreement or disagreement) is stored in the data 304 (illustrated in FIG. 4) included in the information to be transmitted.

In this way, when authentication is successful, the information processing apparatus 200 on the sink side receives and outputs content transmitted after receiving the key agreement confirmation result (444, 445). In other words, content transmitted from the information processing apparatus 100 on the source side to the information processing apparatus 200 on the sink side may be output from the information processing apparatus 200 on the sink side (444, 445).

In addition, when the transmission of content to be output from the information processing apparatus 200 on the sink side ends, the control unit 120 of the information processing apparatus 100 on the source side transmits a connection release request to the information processing apparatus 200 on the sink side (446, 447).

Note that when authentication fails, the information processing apparatus 200 on the sink side returns to the state before authentication.

In this way, the control unit 120 of the information processing apparatus 100 on the source side conducts control for causing the display unit 242 of the information processing apparatus 200 on the sink side to output authentication key information for allowing the information processing apparatus 100 on the source side to make a wireless connection with the information processing apparatus 200 on the sink side. As another example, the control unit 120 decides whether or not to allow the information processing apparatus 100 on the source side to make the wireless connection on the basis of authentication key information input into the information processing apparatus 100 on the source side and authentication key information output from the information processing apparatus 200 on the sink side. Subsequently, the control unit 120 transmits the result of the decision (key agreement confirmation result) to the information processing apparatus 200 on the sink side using wireless communication.

In this way, by conducting the generation of an authentication key and the authentication (key agreement confirmation) on the source device side, the processing on the sink device side may be simplified further, and the processing on the sink device side may be reduced further.

[Example of Performing Authentication Start Instruction Operation on the Source Side and Generating Authentication Key on the Sink Side]

The foregoing illustrates an example of an authentication key being generated by an information processing apparatus on which an authentication start instruction operation is conducted, but an authentication key may also be generated by an information processing apparatus other than the information processing apparatus on which the authentication start instruction operation is conducted. Accordingly, FIG. 11 illustrates such a communication example.

Figure 11:
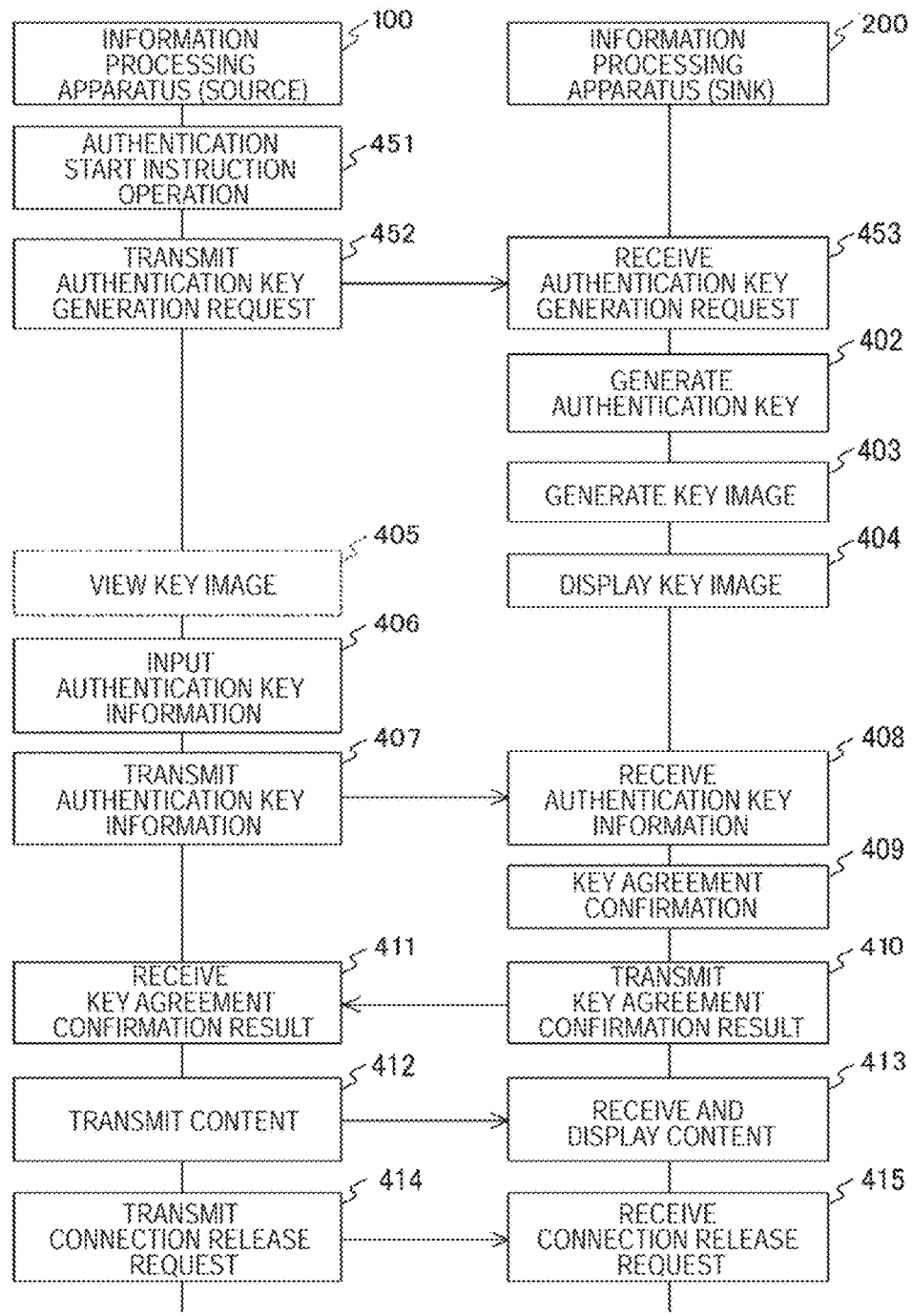
FIG. 11 is a sequence flowchart illustrating an exemplary communication process among apparatuses constituting a communication system 10 according to a first embodiment of the present technology.

FIG. 11 is a sequence flowchart illustrating an exemplary communication process among apparatuses constituting a communication system 10 according to a first embodiment of the present technology. Note that since the exemplary communication process illustrated in FIG. 11 is a partial modification of the communication process illustrated in FIG. 5, the parts shared in common with the communication process illustrated in FIG. 5 are denoted with the same signs, and some of the description thereof will be reduced or omitted.

First, the user 11 performs an authentication start instruction operation on the operation receiving unit 152 of the information processing apparatus 100 on the source side (451). In this way, when an authentication start instruction operation is performed (451), the control unit 120 of the information processing apparatus 100 on the source side is triggered by the authentication start instruction operation to transmit an authentication key generation request to the information processing apparatus 200 on the sink side (452, 453). In this case, the authentication key generation request 317 is stored in the information element identifier 303 (illustrated in FIG. 4) and information related to an authentication key generation request is stored in the data 304 (illustrated in FIG. 4) included in the information to be transmitted.

After receiving the authentication key generation request (453), the control unit 220 of the information processing apparatus 200 on the sink side is triggered by the reception of the authentication key generation request to generate an authentication key to use when conducting the authentication process (402).

[Example of Notifying that Authentication Key Information is being Displayed]

Herein, it is anticipated that even in a state in which authentication key information is being displayed on the sink device, the user may be unable to grasp the display of the authentication key information. For example, when using an imperceptible watermark as a key image, it is anticipated that the user may have difficulty judging whether the key image is in the state of being displayed, or not in such a state. Accordingly, an example of notifying the user that authentication key information is being displayed will be illustrated herein.

Figure 12:
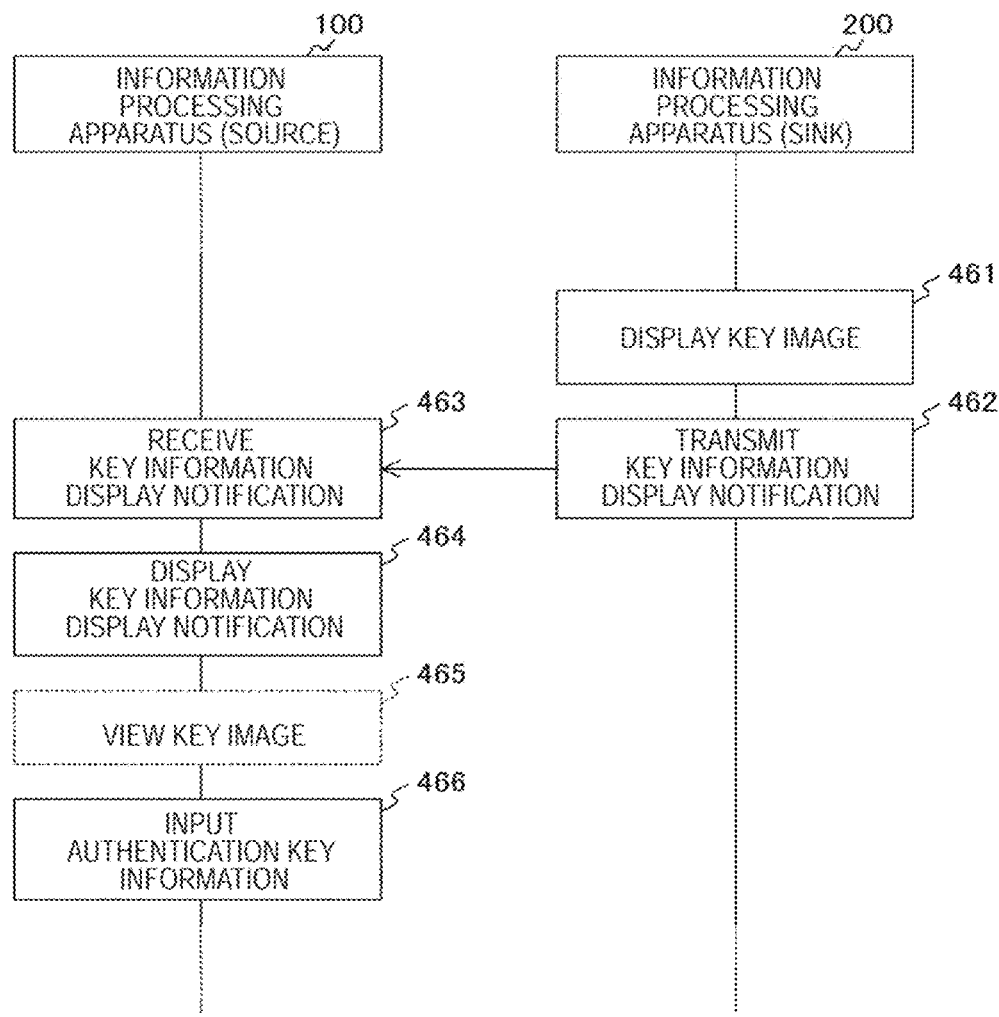
FIG. 12 is a sequence flowchart illustrating an exemplary communication process among apparatuses constituting a communication system 10 according to a first embodiment of the present technology.

FIG. 12 is a sequence flowchart illustrating an exemplary communication process among apparatuses constituting a communication system 10 according to a first embodiment of the present technology. Note that since the exemplary communication process illustrated in FIG. 12 is a partial modification of the communication process illustrated in FIGS. 5, 7, 8, 10, and 11, the illustration and description of the parts shared in common with these communication processes will be reduced or omitted.

After a key image is displayed on the display unit 242 of the information processing apparatus 200 on the sink side (461), the control unit 220 of the information processing apparatus 200 on the sink side transmits a key information display notification to the information processing apparatus 100 on the source side (462, 463). In this case, the key information display notification 318 is stored in the information element identifier 303 (illustrated in FIG. 4) and information related to a key information display notification is stored in the data 304 (illustrated in FIG. 4) included in the information to be transmitted.

After receiving the key information display notification (463), the control unit 120 of the information processing apparatus 100 on the source side outputs the key information display notification to encourage the user to start perceiving (464). For example, the key information display notification is output by being displayed on the display unit 142 or output as audio from the audio output unit 173 (464). For example, when using a number as the authentication key information, the message "Input the number displayed on the TV" may be displayed on the display unit 142. Alternatively, the message "Input the number displayed on the TV" may be output as audio from the audio output unit 173. As another example, in the case of using the image capture unit 162 to acquire authentication key information (for example, an imperceptible watermark), the message "Point the camera at the TV" is displayed on the display unit 142.

In this way, by outputting a key information display notification (464), the user is able to perceive the authentication key information (465), and input authentication key information (466). Note that when the authentication key information is an imperceptible watermark, the authentication key information is perceived by the image capture unit 162 of the information processing apparatus 100 on the source side (465).

In this way, by outputting a key information display notification, the user may be notified that a key image is being displayed on the information processing apparatus 200 on the sink side. Consequently, the user may be encouraged to perceive the key image (or capture an image with the image capture unit 162 of the information processing apparatus 100 on the source side).

Herein, as an example, when using wireless communication to transmit content held in the source device to the sink device for display, authentication for whether or not to display content in this way becomes necessary. Accordingly, in the first embodiment of the present technology, authentication key information for the purpose of this authentication is made to be output (for example, displayed, or output as audio) from the sink device. Subsequently, the authentication key information is recognized by the user of the source device or the source device itself, and transmitted from the source device to the sink device using wireless communication. In addition, the sink device, by verifying the authentication key information, is able to judge appropriately whether or not the source device and the sink device may connect. Consequently, pairing and authentication as intended by the user may be conducted easily. In other words, a connection process may be conducted appropriately when wireless communication is conducted between a source device and sink device.

In addition, according to the first embodiment of the present technology, when wireless communication is used to output user information (content) from the sink device, output is limited to being from the sink device that output the authentication key information (display, audio output). Consequently, the user information (content) of the source device held by the user (the terminal in hand) may be output from the appropriate sink device intended by the user.

In addition, it is possible to prevent the accidental output of the user information (content) of the source device held by the user (the terminal in hand) from a sink device that is unintended by the user (that is, a sink device that is not present within a visible range from the user).

2. Second Embodiment

The first embodiment of the present technology illustrates an example of conducting wireless communication between the source device and the sink device during the period starting from when an authentication start instruction operation is performed, until there is a connection release request. At this point, it is also anticipated that during the period between when the authentication start instruction operation is performed and when there is a connection release request, an authentication start instruction operation may be performed by another source device, and a request to connect to the sink device may be received from another source device.

Accordingly, a second embodiment of the present technology illustrates an example of the case of receiving a request to connect to the sink device from another source device while wireless communication is being conducted between the source device and the sink device. Note that the communication system according to the second embodiment of the present technology is approximately similar to the communication system 10 illustrated in FIG. 1. For this reason, the parts shared in common with the communication system 10 are denoted with the same signs, and some of the description thereof will be reduced or omitted.

[Exemplary Configuration of Communication System]

Figure 13:
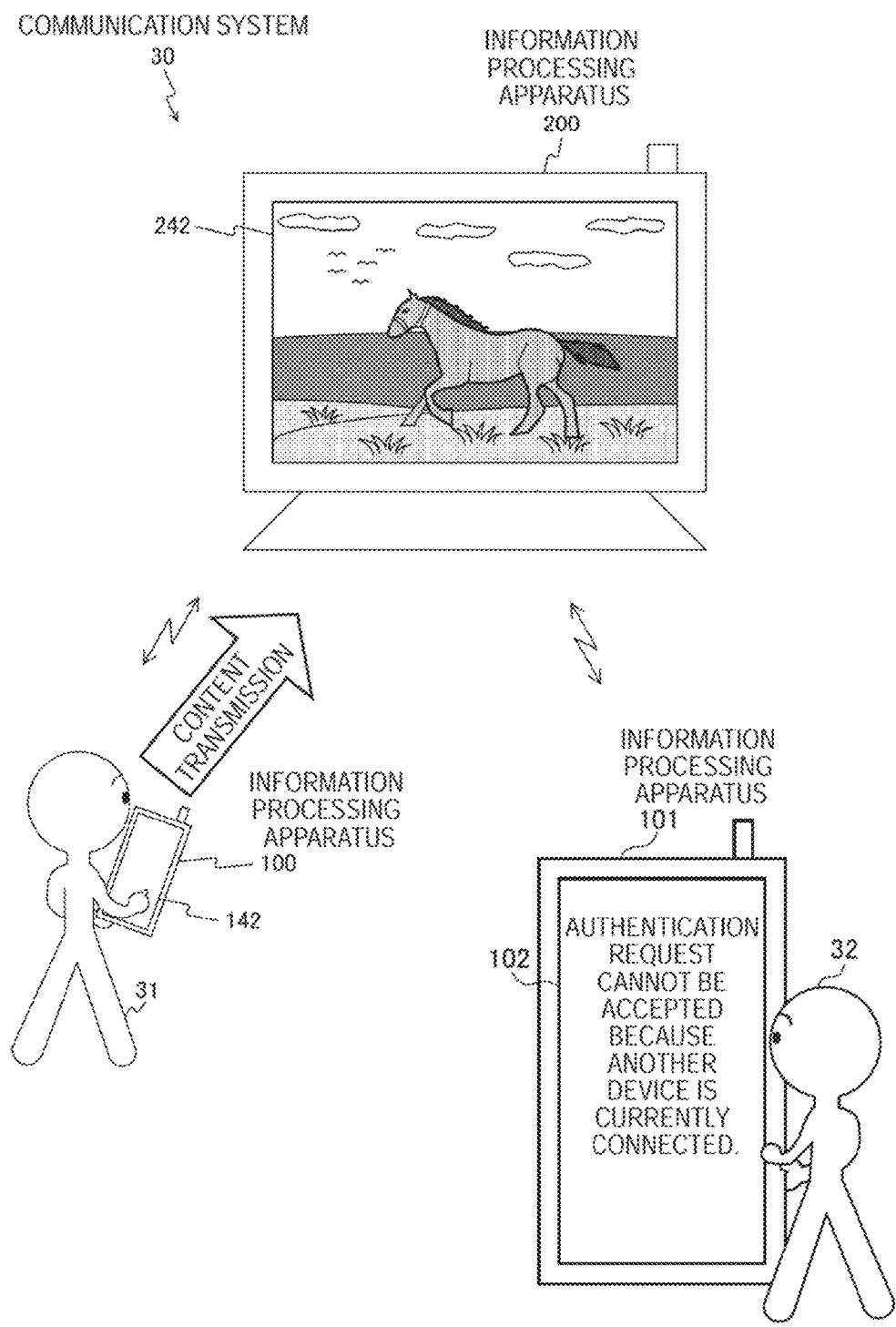
FIG. 13 is a diagram that illustrates an exemplary configuration of a communication system 30 according to a second embodiment of the present technology.

FIG. 13 is a diagram illustrating an exemplary configuration of a communication system 30 according to a second embodiment of the present technology.

The communication system 30 is equipped with information processing apparatuses 100, 101, and 200. Note that the communication system 30 is obtained by adding the information processing apparatus 101 on the source side to the communication system 10 illustrated in FIG. 1. Also, the internal configuration of the information processing apparatus 101 is similar to the information processing apparatus 100 illustrated in FIG. 1. In other words, FIG. 13 illustrates an example of a communication system provided with two source devices and one sink device.

[Example of Refusing Connection Request from Other Source Device]

Figure 14:
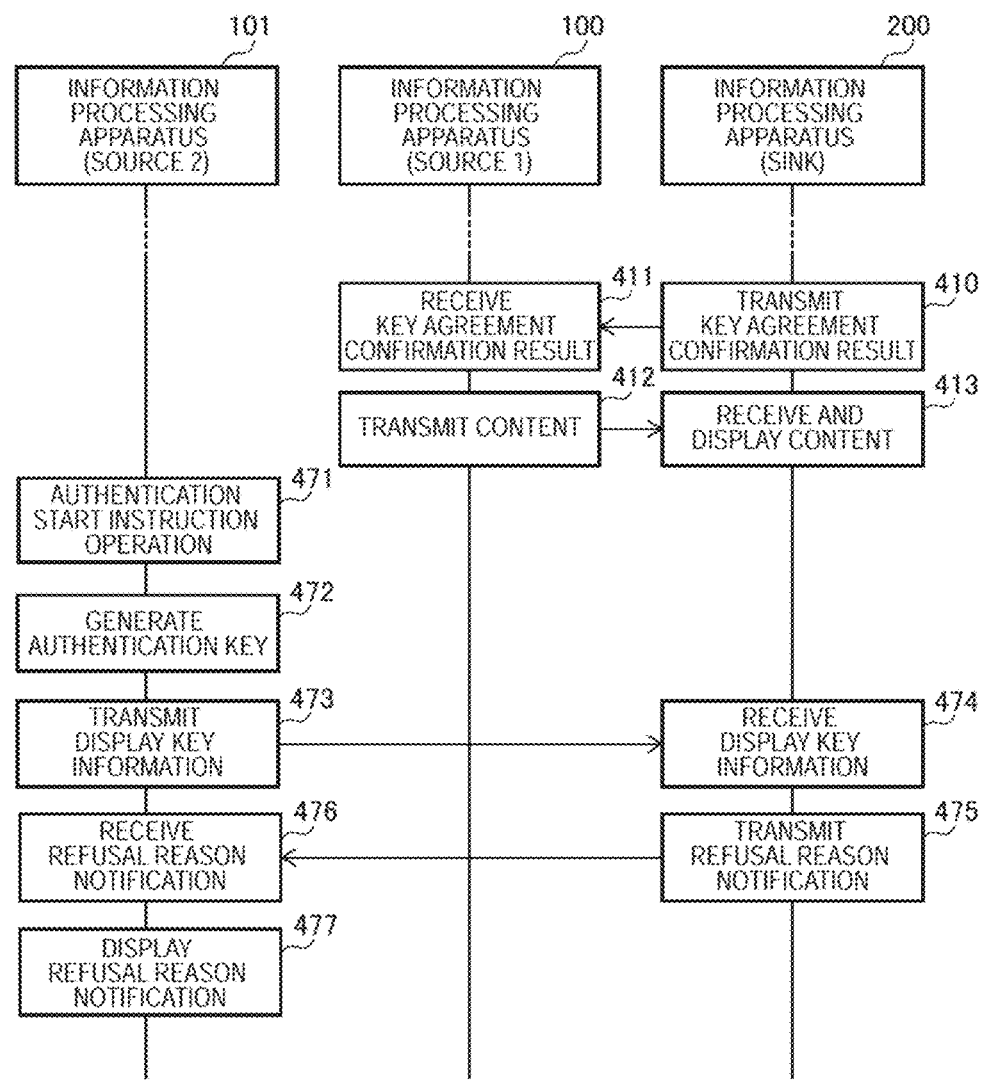
FIG. 14 is a sequence flowchart illustrating an exemplary communication process among apparatuses constituting a communication system 30 according to a second embodiment of the present technology.

FIG. 14 is a sequence flowchart illustrating an exemplary communication process among apparatuses constituting a communication system 30 according to a second embodiment of the present technology. Note that FIG. 14 illustrates an exemplary communication process in the case of a user performing an authentication start instruction operation in the state illustrated in FIG. 13. In addition, FIG. 14 illustrates an exemplary communication process in the case in which a user performs the authentication start instruction operation on a source device (information processing apparatus 100, 101), and an authentication key is generated on the side of the source device (information processing apparatus 200).

Also, in FIG. 14, suppose a case in which, after successful authentication between the information processing apparatus 100 on the source side and the information processing apparatus 200 on the sink side, content is transmitted from the information processing apparatus 100 on the source side to the information processing apparatus 200 on the sink side. Note that since the processes (410 to 413) are the same as the processes illustrated in FIG. 7, the same signs will be given, and description thereof will be reduced or omitted. In addition, the processes before the processes (410 to 413) are omitted from illustration.

In this way, suppose a case in which, while content transmission from the information processing apparatus 100 on the source side to the information processing apparatus 200 on the sink side is being conducted (412, 413), an authentication start instruction operation is performed on an operation receiving unit of the information processing apparatus 101 on the source side (471). In this case, similarly to the processes (421 to 424) illustrated in FIG. 7, an authentication key is generated by the information processing apparatus 101 on the source side (472), and display key information is transmitted from the information processing apparatus 101 on the source side to the information processing apparatus 200 on the sink side (473, 474).

However, it is also anticipated that the information processing apparatus 200 on the sink side may not be the sink device intended by the user 32 of the information processing apparatus 101 on the source side. In other words, it is also anticipated that the user 32 of the information processing apparatus 101 on the source side is performing the authentication start instruction operation to cause content to be displayed on a sink device other than the information processing apparatus 200 on the sink side.

Also, while content is being displayed on the information processing apparatus 200 on the sink side (413), if a key image based on an instruction from the information processing apparatus 101 on the source side is displayed on the information processing apparatus 200 on the sink side, the viewing of the content being displayed may be impeded. In other words, there is a risk of potential attack to impair the viewing of the other user 31.

Accordingly, in order to avoid such attacks, the second embodiment of the present technology illustrates an example of refusing a connection request when a connection request is received from another source device while the wireless communication of content is being conducted.

For example, when a display key is received (474), the information processing apparatus 200 on the sink side transmits a refusal reason notification to the information processing apparatus 101 on the source side (475, 476). In this case, the refusal reason notification 319 is stored in the information element identifier 303 (illustrated in FIG. 4) and information related to a refusal reason notification (for example, a message or a connection availability time) is stored in the data 304 (illustrated in FIG. 4) included in the information to be transmitted.

After receiving the refusal reason notification (476), the information processing apparatus 101 displays the refusal reason notification (477). For example, as illustrated in FIG. 13, a refusal reason notification (a notification for informing the user of the situation) is displayed on the display unit 102 of the information processing apparatus 101 on the source side.

Note that when a connection release request is transmitted from the information processing apparatus 100 on the source side to the information processing apparatus 200 on the sink side and the connected state between these apparatuses is cancelled, the information processing apparatus 200 on the sink side will accept a connection request from any source device. At this point, suppose a case in which the information processing apparatus 200 on the sink side is installed in a hotel. In this case, for example, the connected state between the information processing apparatus 100 on the source side and the information processing apparatus 200 on the sink side may be cancelled at the time of checkout by the user staying in the room where the information processing apparatus 200 on the sink side is installed.

In this way, the control unit 220 of the information processing apparatus 200 on the sink side refuses a connection request when a connection request is received from another source device while data transmitted from the information processing apparatus 100 on the source side is being displayed on the display unit 242. Note that in the case of receiving a connection request from another source device after data transmission from the information processing apparatus 100 on the source side to the information processing apparatus 200 on the sink side ends, the control unit 220 causes the display unit 242 to output authentication key information in response to the connection request.

Note that a connection request may also be refused even before entering a connected state. FIG. 15 illustrates an example of such refusal.

[Example of Refusing Connection Request from Other Source Device]

FIG. 15 is a sequence flowchart illustrating an exemplary communication process among apparatuses constituting a communication system 30 according to a second embodiment of the present technology. Note that FIG. 15 illustrates an exemplary communication process of refusing a connection request according to a manual operation by a user before the information processing apparatus 200 on the sink side enters a connected state. In addition, FIG. 15 illustrates an exemplary communication process in the case in which a user performs the authentication start instruction operation on a source device (information processing apparatus 100, 101), and an authentication key is generated on the side of the source device (information processing apparatus 100, 101).

At this point, suppose that the information processing apparatus 200 on the sink side is in a state before entering a connected state (that is, a state that also encompasses the state immediately prior to entering a connected state).

In this state, suppose a case in which an authentication start instruction operation is performed on the operation receiving unit of the information processing apparatus 101 on the source side (481). In this case, similarly to the processes (471 to 474) illustrated in FIG. 14, an authentication key is generated by the information processing apparatus 101 on the source side (482), and display key information is transmitted from the information processing apparatus 101 on the source side to the information processing apparatus 200 on the sink side (483, 484). Subsequently, the information processing apparatus 200 on the sink side generates a key image (485), and displays the key image (486). For example, a key image is displayed as illustrated in FIG. 1.

In this way, when a key image is displayed on the display unit 242 of the information processing apparatus 200 on the sink side (486), suppose a case in which the user 31 who sees the key image refuses the connection request from the information processing apparatus 101 on the source side. In this case, the user 31 performs a refusal instruction operation by using the operation receiving unit 252 or the remote control 262 of the information processing apparatus 200 on the sink side (487). For example, an operable member for performing the refusal instruction operation (for example, a settings button) is pressed (487).

In this way, when a refusal instruction operation is performed on the information processing apparatus 200 on the sink side (487), the information processing apparatus 200 on the sink side transmits a refusal reason notification to the information processing apparatus 101 on the source side (488, 489).

After receiving the refusal reason notification (489), the information processing apparatus 101 displays the refusal reason notification (490). For example, as illustrated in FIG. 13, a refusal reason notification (a notification for informing the user of the situation) is displayed on the display unit 102 of the information processing apparatus 101 on the source side. The refusal reason, besides reporting that the relevant terminal is in use by another user as illustrated in FIG. 13, may also report that usage of the relevant terminal is unavailable (for example, service is suspended), or report that usage is unavailable for some other reason (for example, the communication function is malfunctioning). Note that in the case of reporting that the relevant terminal is in use by another user, it is also preferable to report the time until usage will become available. For example, "Usage will be available in another X minutes" may be displayed.

In addition, even if a connection request is transmitted thereafter (491 to 494), the information processing apparatus 200 on the sink side refuses without displaying authentication key information (495 to 497). As a result, although authentication key information is displayed once on the information processing apparatus 200 on the sink side, it is possible to prevent the display of unwanted authentication key information thereafter. In addition, the impairment of the user's viewing experience may be minimized. Note that the refusal state is preferably cancelled at a timing when a designated condition is satisfied (for example, a timer count of a fixed amount of time).

Note that although this example illustrates an example of notifying a user by outputting a refusal notification from the source device, a user may also be notified by outputting a refusal notification from the sink device. Also, a notification may also be issued on both the source device and the sink device.

In this way, when a user operation for refusing a wireless connection (refusal instruction operation) is received, the control unit 220 of the information processing apparatus 200 on the sink side decides not to allow the information processing apparatus 100 on the source side to make the wireless connection.

In this way, in the second embodiment of the present technology, after a source device held by a user (the terminal in hand) and the sink device enter a connected state, a connection request (authentication request) from another source device is refused. As a result, unintended connection requests from another source device may be suppressed. In other words, while the user is in a state of viewing content, it is possible to prevent the display of authentication key information that would impair the user experience.

In addition, since a connection request (authentication request) may be refused on the sink device side, it is possible to suppress the display of authentication key information from an unintended user that would impair the viewing experience.

The foregoing thus illustrates an example of refusing a connection request from another source device. However, in some cases it may be preferable to prioritize the connection of a source device that transmitted a connection request later over a source device that was connected earlier. Accordingly, the following illustrates an example of assigning a priority level to each source device, and judging whether or not to switch on the basis of the priority level.

[Example of Switching Right of Connection to Sink Device]

Figure 16:
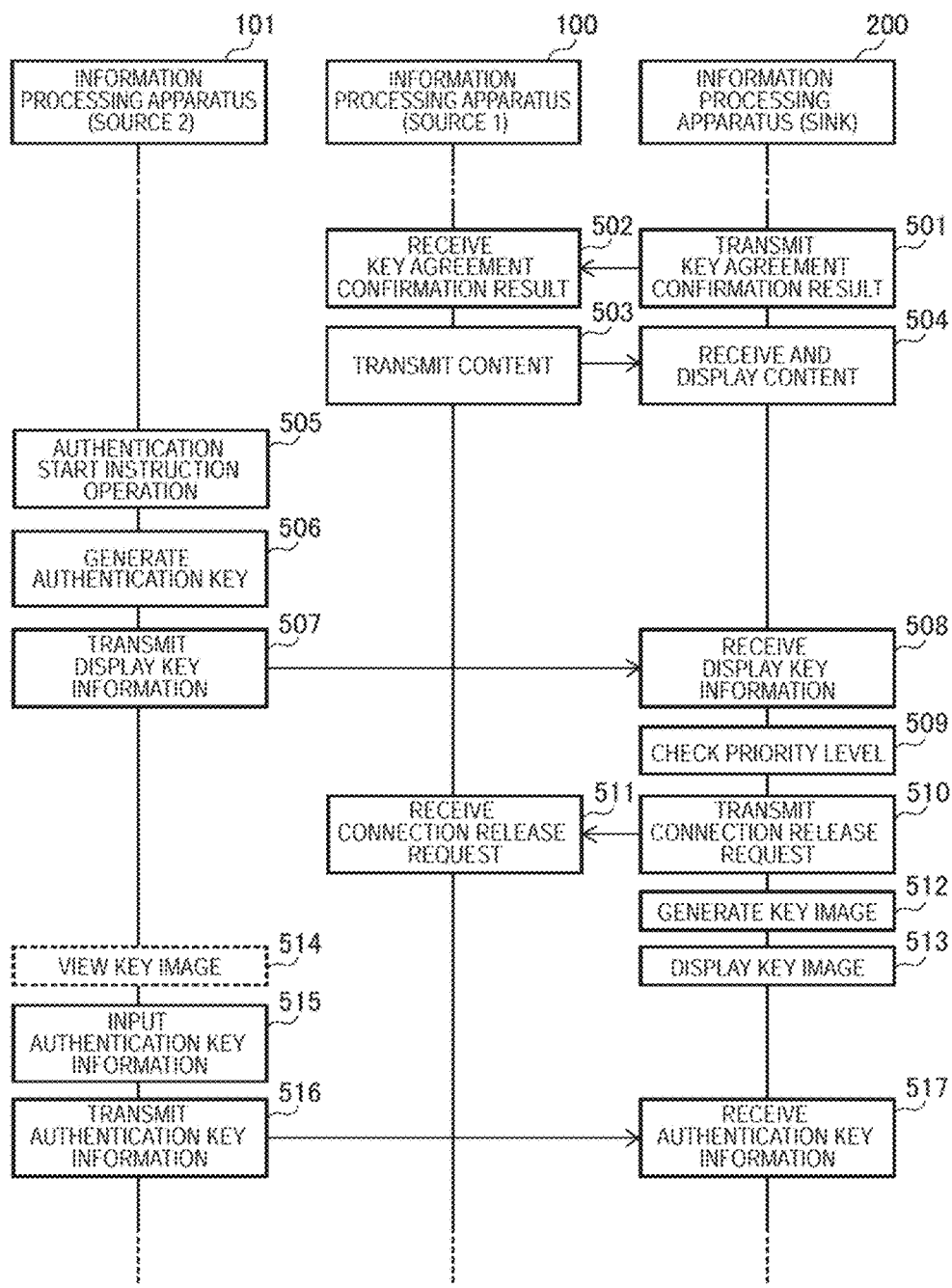
FIG. 16 is a sequence flowchart illustrating an exemplary communication process among apparatuses constituting a communication system 30 according to a second embodiment of the present technology.

FIG. 16 is a sequence flowchart illustrating an exemplary communication process among apparatuses constituting a communication system 30 according to a second embodiment of the present technology. Note that FIG. 16 illustrates an exemplary communication process for a case in which the priority level of the information processing apparatus 101 on the source side is higher than the priority level of the information processing apparatus 100 on the source side. Also, FIG. 16 illustrates an exemplary communication process for a case of generating an authentication key on the source device (information processing apparatus 100, 101) side.

Also, suppose that the information processing apparatus 200 on the sink side manages the source devices (information processing apparatus 100, 101) to connect with. For example, information related to source devices to connect with may be input and registered as management information by user operations on the information processing apparatus 200 on the sink side, or source devices that transmit a connection request may be successively registered.

A method of deciding a priority ranking will now be described. For example, the priority level of a source device may be decided according to the type of authentication requested by the source device. In other words, the authentication level may be variable.

For example, the priority level of a source device that requests authentication using authentication key information based on a key image generated by an image capture unit may be set higher than the priority level of a source device that requests authentication using authentication key information input by a user operation. As another example, in the case of authentication using a watermark, the priority level of a source device that requests authentication using an imperceptible watermark may be set higher than the priority level of a source device that requests authentication using a perceptible watermark.

As another example, the priority level of a source device may be decided according to the model of the source device. For example, the priority level of a high-priced (multi-function) source device may be set higher than the priority level of a low-priced (single-function) source device.

As another example, the priority level of a source device may be decided according to the classification of content. For example, the priority level of a source device that transmits high-quality content may be set higher than the priority level of a source device that transmits low-quality content.

As another example, a priority level may be assigned to a source device in advance according to the history of communication with the sink device, or according to a manual operation by an administrator that manages the sink device.

Additionally, a priority level may also be assigned according to the user who uses the source device. For example, a high priority level is set for the source device of a friend who is close to the user who manages the sink device, whereas a low priority level is set for the source device of a friend who is not as close.

In addition, when the sink device is installed in a hotel, different services may be provided to VIP rooms and regular rooms. For example, when a guest checks in to a VIP room, information for raising the priority level is input into the guest's source device (for example, a smartphone), and when the guest checks out, the information related to the priority level is deleted from the guest's source device.

Note that these methods of deciding the priority level are examples, and another method of deciding may also be used.

At this point, as illustrated in FIG. 13, suppose a case in which, after successful authentication between the information processing apparatus 100 on the source side and the information processing apparatus 200 on the sink side, content is transmitted from the information processing apparatus 100 on the source side to the information processing apparatus 200 on the sink side. Note that since the processes (501 to 504) are the same as the processes (410 to 413) illustrated in FIG. 5, description thereof will be reduced or omitted herein. In addition, the processes before the processes (501 to 504) are omitted from illustration.

In this way, suppose a case in which, while content transmission from the information processing apparatus 100 on the source side to the information processing apparatus 200 on the sink side is being conducted (503, 504), an authentication start instruction operation is performed on another source device (the information processing apparatus 101) (505). In this case, similarly to the processes (471 to 474) illustrated in FIG. 14, an authentication key is generated by the information processing apparatus 101 on the source side (506), and display key information is transmitted from the information processing apparatus 101 on the source side to the information processing apparatus 200 on the sink side (507, 508).

After receiving the display key information (508), the control unit 220 of the information processing apparatus 200 on the sink side checks the priority levels of the source device that transmitted the display key information (information processing apparatus 101) and the current connection host (information processing apparatus 100) (509). As discussed earlier, FIG. 16 supposes that the priority level of the information processing apparatus 101 on the source side is higher than the priority level of the information processing apparatus 100 on the source side. In this way, when a connection request is transmitted from a source device having a higher priority level than the currently connected source device, the control unit 220 of the information processing apparatus 200 on the sink side releases the current connection, and switches the connection to the source device having the higher priority level.

Specifically, the control unit 220 of the information processing apparatus 200 on the sink side transmits a connection release request to the current connection host, that is, the information processing apparatus 100 on the source side (510, 511). Consequently, the connection between the information processing apparatus 200 on the sink side and the information processing apparatus 100 on the source side is released.

Next, the control unit 220 of the information processing apparatus 200 on the sink side converts the received display key information into image information to generate a key image (512). Note that since the processes thereafter (513 to 517) are the same as the processes (426, 405 to 408) illustrated in FIG. 7, description thereof will be reduced or omitted herein. In addition, the processes after the process (408) are omitted from illustration.

Note that as a result of checking the priority levels of the source device that transmitted the display key information and the currently connected source device (509), it is also anticipated that the priority level of the source device that transmitted the display key information and the priority level of the currently connected source device may be the same level. In addition, it is also anticipated that the priority level of the source device that transmitted the display key information may be lower than the priority level of the currently connected source device. In this case, a refusal reason notification is transmitted to the source device that transmitted the display key information, similarly to the example illustrated in FIGS. 14 and 15.

In this way, when a source device and a sink device are in a connected state, a connection request from another source device is refused as a general rule, but the connection request may be honored only for a source device that satisfies a designated condition. In other words, the connection request may be honored when the priority level of the other source device is higher than the priority level of the currently connected source device.

3. Third Embodiment

The second embodiment of the present technology illustrates an example of issuing a refusal reason notification and refusing a connection request when there is a connection request from another source device while wireless communication is being conducted between a source device and a sink device. Herein, as an example, suppose a case in which there is a large number of source devices with respect to one sink device. In such a case, it is anticipated that one source device may continuously output content from the sink device for a long period of time. In this way, if one source device is allowed to output content for a long period of time, other users become unable to use the sink device. For this reason, it is important to appropriately enable each user to output content from the sink device.

Accordingly, a third embodiment of the present technology illustrates an example of switching (releasing) the connected state of a source device at appropriate timings. Note that the communication system according to the third embodiment of the present technology is approximately similar to the communication system 10 illustrated in FIG. 1. For this reason, the parts shared in common with the communication system 10 are denoted with the same signs, and some of the description thereof will be reduced or omitted.

[Example Configuration of Communication System]

Figure 17:
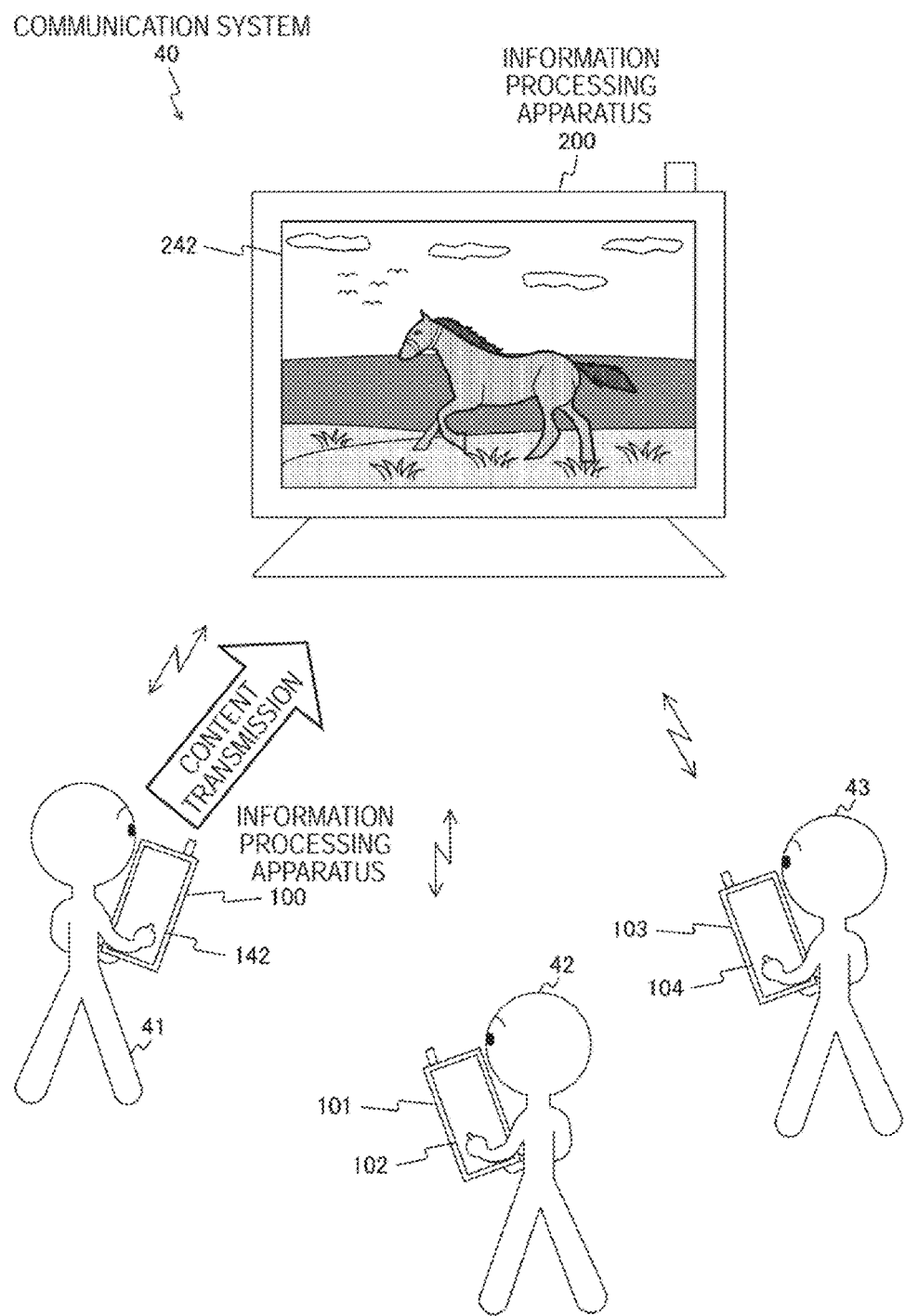
FIG. 17 is a diagram that illustrates an exemplary configuration of a communication system 40 according to a third embodiment of the present technology.

FIG. 17 is a diagram illustrating an exemplary configuration of a communication system 40 according to a third embodiment of the present technology.

The communication system 40 is equipped with information processing apparatuses 100, 101, 103, and 200. Note that the communication system 40 is obtained by adding the information processing apparatus 103 on the source side to the communication system 30 illustrated in FIG. 13. Also, the internal configuration of the information processing apparatus 103 is similar to the information processing apparatus 100 illustrated in FIG. 1. In other words, FIG. 17 illustrates an example of a communication system provided with three source devices and one sink device.

Herein, when there exist multiple source devices and one sink device as illustrated in FIG. 17, it is anticipated that successively granting the right of connection to the sink device to each of the multiple source devices may be desired. Herein, the right of connection means a right enabling a source device to connect to the sink device.

For example, it is anticipated that a group of friends may want to enjoy displaying images from each person's smartphone (or tablet) on a large-screen display. In this case, it is conceivable to grant the right of connection to each smartphone for a designated time, and successively display images from each smartphone on the large-screen display. For example, by cancelling the connected state between a source device and the sink device with a timer count of a fixed amount of time, the right of connection may be granted to each smartphone for a designated time.

The length of the timer may be decided on the basis of the number of source devices issuing connection requests. For example, the length of the timer may be set shorter when there is a large number of source devices issuing connection requests, and the length of the timer may be set longer when there is a small number of source devices issuing connection requests. As a result, the right of connection may be granted fairly to each source device.

Accordingly, the following describes a method of computing a timer used when switching the assignment timing with a timer in the case of successively assigning to multiple source devices the right of connection for connecting to a single sink device.

The timer value (source device switching timer value) t may be computed according to the following Math. 1.

$$t=\min(T,X/n) \quad \text{[Math. 1]}$$

Herein, T is a value indicating a maximum time to assign to one source device (one user). In other words, T is a value indicating the time that one source device (one user) may continuously occupy the connection (connection occupation time). For example, T may be set to 5 minutes. This setting is a setting enabling the connection to be occupied for a maximum of 5 minutes.

Also, X is a value indicating a wait time until the next connection. In other words, X is the time for one cycle of connection requests from the multiple source devices (multiple users) issuing connection requests (that is, the time required for each device to connect one time). In other words, X is a time indicating how long to wait until one's own turn. For example, X may be set to 30 minutes (or approximately 30 minutes).

Also, n is a value indicating the number of source devices issuing connection requests.

Also, min(T, X/n) means the smaller value of the connection occupation time T for one user, and the value obtained by dividing the time X for one cycle of connection requests by the total number of source devices n. In other words, the source device switching timer value t is the smaller value of T and X/n. For example, when there is a small number of connecting source devices, the maximum time T to assign to one source device is selected, whereas when there is a large number of connecting source devices, X/n is selected.

For example, in the example illustrated in FIG. 17 (n equals 3), suppose that T is set to 5 minutes, and X is set to 30 minutes. In this case, since t=min(5, 10(=30/3)), the source device switching timer value t is computed to be 5 minutes.

Note that this timer computation method is an example, and a timer may also be computed according to some other computation method. For example, the timer may also be changed according to whether the sink device is installed in an open space (for example, a non-specific environment (such as a public space or hotel lobby)), or installed in a closed space (for example, a specific environment (such as a hotel room or inside a home)). For example, when the sink device is installed in an open space, the timer may be shortened, whereas when the sink device is installed in a closed space, the timer may be lengthened. In addition, the timer may also be changed according to whether the content to be output from the sink device is a video or a still image. For example, when the content to be output from the sink device is a video, the timer may be lengthened, whereas in the case of a still image, the timer may be shortened.

In addition, the order in which to assign the right of connection may be in order of priority level, or random.

[Example of Switching Right of Connection to Sink Device]

Figure 18:
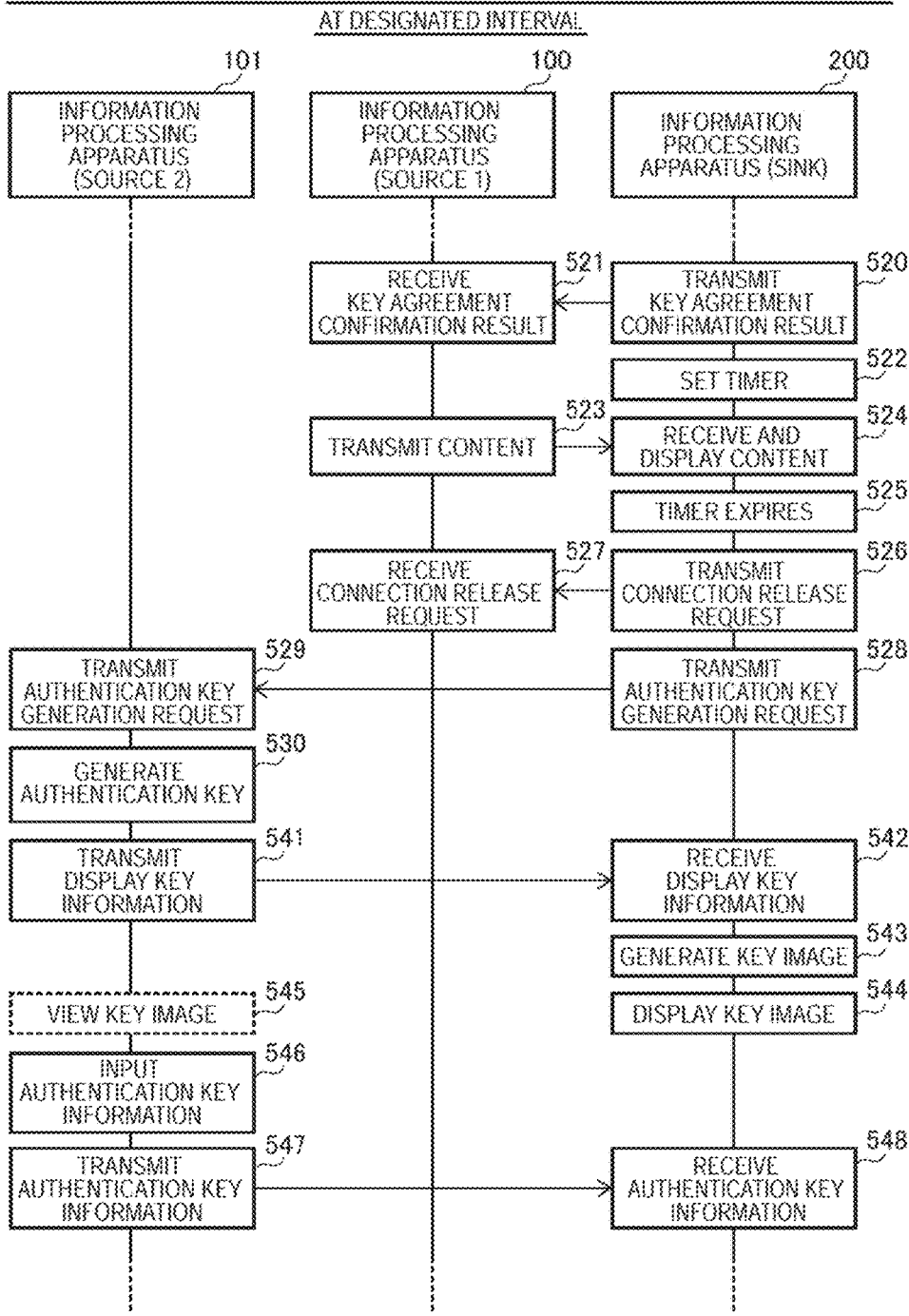
FIG. 18 is a sequence flowchart illustrating an exemplary communication process among apparatuses constituting a communication system 40 according to a third embodiment of the present technology.

FIG. 18 is a sequence flowchart illustrating an exemplary communication process among apparatuses constituting a communication system 40 according to a third embodiment of the present technology. Note that FIG. 18 illustrates an exemplary communication process for the case of the state illustrated in FIG. 17, in which the right of connection is switched from the information processing apparatus 100 on the source side to the information processing apparatus 101 on the source side. Also, FIG. 18 illustrates an exemplary communication process for a case of generating an authentication key on the source device (information processing apparatus 100, 101, 103) side.

Also, suppose that the information processing apparatus 200 on the sink side manages the source devices (information processing apparatus 100, 101, 103) to connect with.

At this point, as illustrated in FIG. 18, after successful authentication between the information processing apparatus 100 on the source side and the information processing apparatus 200 on the sink side, a key agreement confirmation result is transmitted (520, 521). Next, the control unit 220 of the information processing apparatus 200 on the sink side sets a timer (522). The value of the timer is computed using Math. 1 discussed above.

Next, content is transmitted from the information processing apparatus 100 on the source side to the information processing apparatus 200 on the sink side (524, 525). Note that the processes before the process (520) are omitted from illustration.

At this point, suppose a case in which, while content transmission from the information processing apparatus 100 on the source side to the information processing apparatus 200 on the sink side is being conducted (523, 524), the timer expires (525). In this case, the control unit 220 of the information processing apparatus 200 on the sink side transmits a connection release request to the current connection host, that is, the information processing apparatus 100 on the source side (526, 527). In this case, the connection release request 314 is stored in the information element identifier 303 (illustrated in FIG. 4) and information related to a connection release request is stored in the data 304 (illustrated in FIG. 4) included in the information to be transmitted.

Next, the control unit 220 of the information processing apparatus 200 on the sink side transmits an authentication key generation request to the next connection host, that is, the information processing apparatus 101 on the source side (528, 529). In this case, the authentication key generation request 317 is stored in the information element identifier 303 (illustrated in FIG. 4) and information related to an authentication key generation request is stored in the data 304 (illustrated in FIG. 4) included in the information to be transmitted.

After the authentication key generation request is transmitted (528, 529), similarly to the processes (422 to 426) illustrated in FIG. 7, an authentication key is generated by the information processing apparatus 101 on the source side (530). Additionally, display key information is transmitted from the information processing apparatus 101 on the source side to the information processing apparatus 200 on the sink side (541, 542). Note that since the processes (543 to 548) are the same as the processes (425, 426, 405 to 408) illustrated in FIG. 7, description thereof will be reduced or omitted herein. In addition, the processes after the process (408) are omitted from illustration.

In addition, the information processing apparatus 200 on the sink side may also use the source device switching timer value t to provide information for notifying a source device other than the source device in the connected state how many more minutes until usage becomes available.

In this way, when there exist multiple source devices that conduct data transmission to the information processing apparatus 200 on the sink side, the right of connection is successively set to each of the source devices. In other words, the control unit 220 of the information processing apparatus 200 on the sink side grants a wireless connection to each of the multiple source devices on the basis of a designated rule, and thus causes the display unit 242 to successively display authentication key information for each source device. In this case, after the connected state of the previous source device is released, the authentication key information of the next source device is displayed on the display unit 242. Also, the designated rule is a rule of switching the source device in units of the source device switching timer value t, for example.

In addition, the control unit 220 of the information processing apparatus 200 on the sink side, on the basis of the number of source devices, decides a connection time for the source device to conduct data transmission (for example, the source device switching timer value t). Subsequently, the control unit 220, on the basis of the connection time, causes the display unit 242 to successively display authentication key information for every source device in a designated order to each of the multiple source devices.

[Exemplary Operation of Information Processing Apparatus (Sink Device)]

Figure 19:
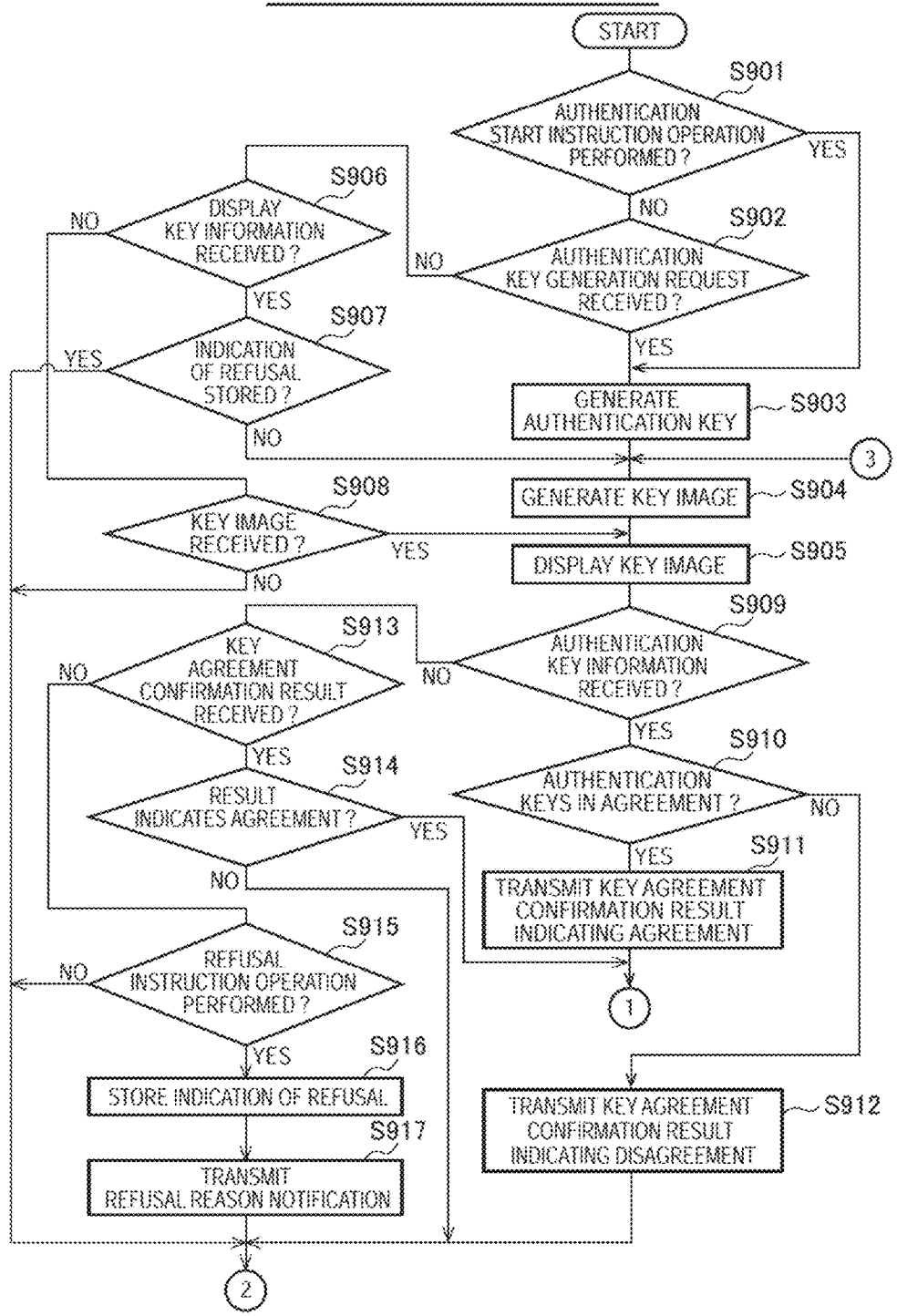
FIG. 19 is a flowchart illustrating an example of a processing sequence for a communication process conducted by an information processing apparatus 200 according to a third embodiment of the present technology.
Figure 20:
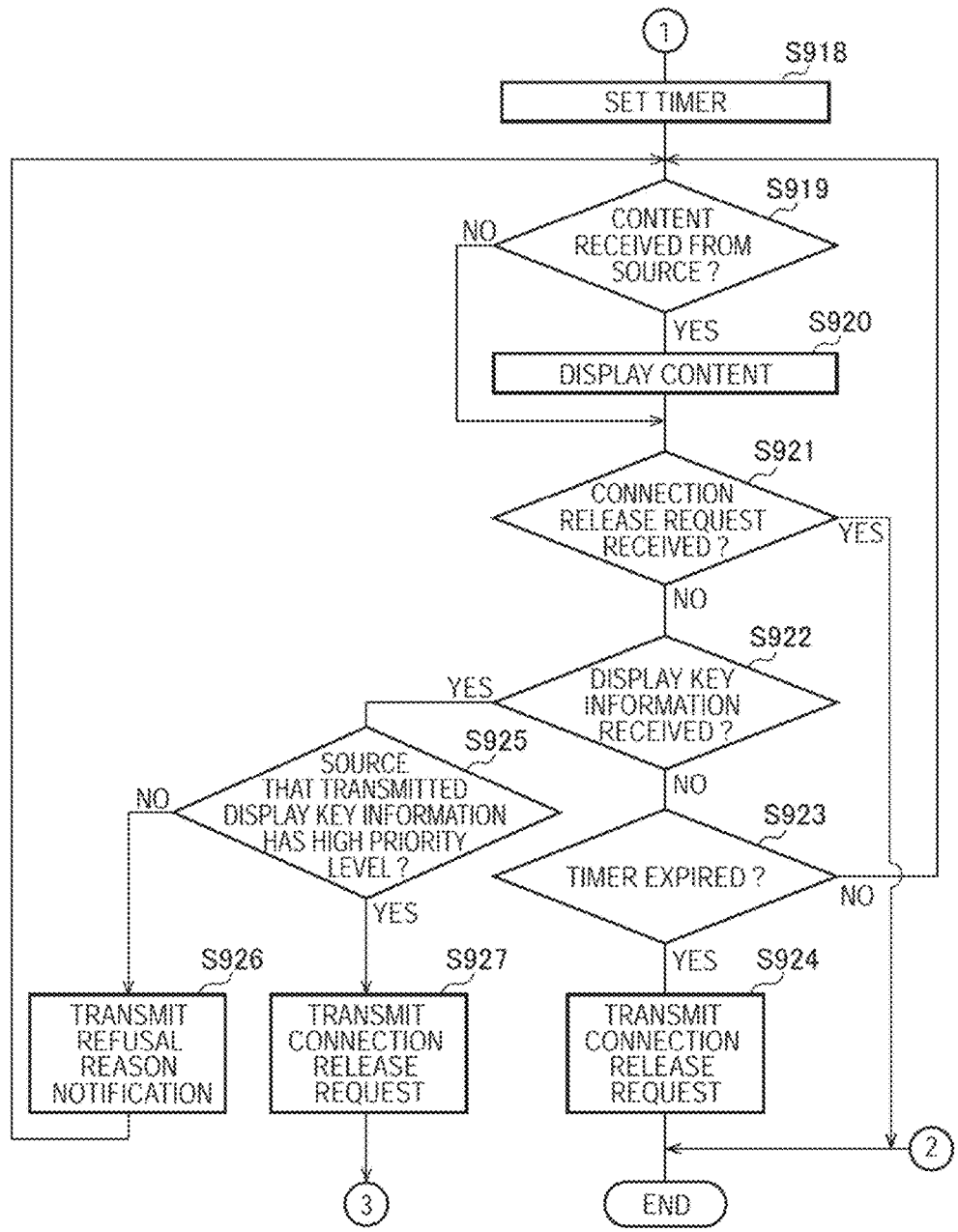
FIG. 20 is a flowchart illustrating an example of a processing sequence for a communication process conducted by an information processing apparatus 200 according to a third embodiment of the present technology.

FIGS. 19 and 20 are flowcharts illustrating an example of a processing sequence for a communication process conducted by an information processing device 200 according to a third embodiment of the present technology.

First, the control unit 220 judges whether or not an authentication start instruction operation was performed (step S901). If an authentication start instruction operation was performed (step S901), the process proceeds to step S903. Meanwhile, if an authentication start instruction operation was not performed (step S901), the control unit 220 judges whether or not an authentication key generation request was received (step S902). Subsequently, if an authentication key generation request was received (step S902), the control unit 220 generates an authentication key (step S903), generates a key image (step S904), and causes the display unit 242 to display the key image (step S905). Note that step S905 is an example of a first step described in the claims.

Next, the control unit 220 judges whether or not authentication key information was received (step S909), and if authentication key information was received, judges whether or not the received authentication key and the generated authentication key are in agreement (step S910). Subsequently, if the received authentication key and the generated authentication key are in agreement (step S910), a key agreement confirmation result (a result indicating agreement) is transmitted to the source device that transmitted the authentication key information (step S911). On the other hand, if the received authentication key and the generated authentication key are not in agreement (step S910), a key agreement confirmation result (a result indicating disagreement) is transmitted to the source device that transmitted the authentication key information (step S912), and the operation of the communication process ends. Note that steps S909 to S912 are one example of a second step in the claims.

Next, the control unit 220 sets a timer (step S918). The value of the timer is computed using Math. 1 discussed above. Next, the control unit 220 judges whether or not content was received from the source device to which the key agreement confirmation result was transmitted (step S919), and if content was received, causes the display unit 242 to display the received content (step S920).

Meanwhile, if content was not received (step S919), the control unit 220 judges whether or not a connection release request was received (step S921). Subsequently, if a connection release request was received (step S921), the operation of the communication process ends. Meanwhile, if a connection release request was not received (step S921), the control unit 220 judges whether or not display key information was received (step S922).

If display key information was not received (step S922), the control unit 220 judges whether or not the timer has expired (step S923). Subsequently, if the timer has not expired (step S923), the process returns to step S919. On the other hand, if the timer has expired (step S923), the control unit 220 transmits a connection release request to the source device (step S924), and ends the operation of the communication process.

Meanwhile, if display key information was received (step S922), the control unit 220 judges whether or not the priority level of the source device that transmitted the display key information is higher than the priority level of the source device in a connected state (step S925). Subsequently, if the priority level of the source device that transmitted the display key information is not higher than the priority level of the source device in a connected state (step S925), the control unit 220 transmits a refusal reason notification to the source device from which display key information was received (step S926). On the other hand, if the priority level of the source device that transmitted the display key information is higher than the priority level of the source device in a connected state (step S925), the control unit 220 transmits a connection release request to the source device in a connected state (step S927), and returns to step S904.

Meanwhile, if an authentication key generation request was not received (step S902), the control unit 220 judges whether or not display key information was received (step S906). If display key information was received (step S906), the control unit 220 judges whether or not an indication of refusal is stored in the memory 230 (step S907). Subsequently, if an indication of refusal is not stored in the memory 230 (step S907), the process proceeds to step S904. On the other hand, if an indication of refusal is stored in the memory 230 (step S907), the operation of the communication process ends.

Meanwhile, if display key information was not received (step S906), the control unit 220 judges whether or not a key image was received (step S908). Subsequently, if a key image was received (step S908), the process proceeds to step S905. On the other hand, if a key image was not received (step S908), the operation of the communication process ends.

Meanwhile, if authentication key information was not received (step S909), the control unit 220 judges whether or not a key agreement confirmation result was received (step S913). Subsequently, if a key agreement confirmation result was received (step S913), the control unit 220 judges whether or not the received key agreement confirmation result indicates agreement (step S914). Subsequently, if the key agreement confirmation result indicates agreement (step S914), the process proceeds to step S918. On the other hand, if the key agreement confirmation result indicates disagreement (step S914), the operation of the communication process ends.

Meanwhile, if a key agreement confirmation result was not received (step S913), the control unit 220 judges whether or not a refusal instruction operation was performed (step S915). Subsequently, if a refusal instruction operation was performed (step S915), the control unit 220 causes the memory 230 to store an indication of refusal to a request from another source device (step S916). Next, the control unit 220 transmits a refusal reason notification to the source device that transmitted an authentication key generation request (step S917), and ends the operation of the communication process.

[Exemplary Operation of Information Processing Apparatus (Source Device)]

Figure 21:
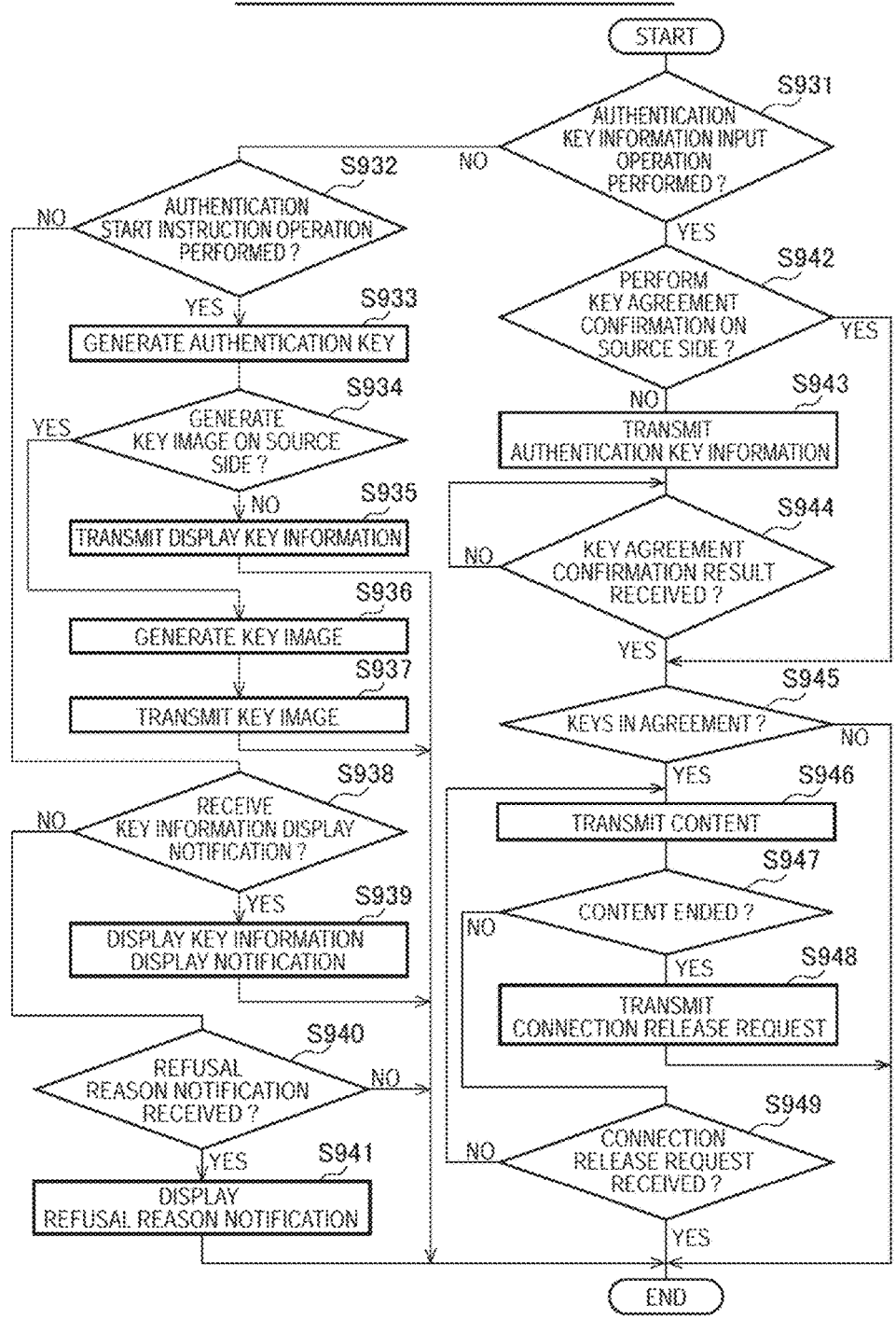
FIG. 21 is a flowchart illustrating an example of a processing sequence for a communication process conducted by an information processing apparatus 100 according to a third embodiment of the present technology.

FIG. 21 is a flowchart illustrating an example of a processing sequence for a communication process conducted by an information processing apparatus 100 according to a third embodiment of the present technology.

First, the control unit 120 judges whether or not an authentication key information input operation was performed (step S931). Subsequently, if an authentication key information input operation was not performed (step S931), the control unit 120 judges whether or not an authentication start instruction operation was performed (step S932).

If an authentication start instruction operation was performed (step S932), the control unit 120 generates an authentication key (step S933). Next, the control unit 120 judges whether or not a setting to generate a key image on the source device side is configured (step S934).

If a setting to generate a key image on the source device side is not configured (step S934), the control unit 120 transmits display key information for converting the generated authentication key into image information to the sink device (step S935). Meanwhile, if a setting to generate a key image on the source device side is configured (step S934), the control unit 120 generates a key image by converting the generated authentication key into image information (step S936), and transmits the key image to the sink device (step S937).

Meanwhile, if an authentication start instruction operation was not performed (step S932), the control unit 220 judges whether or not a key information display notification was received (step S938). Subsequently, if a key information display notification was received (step S938), the control unit 120 causes the display unit 142 to display the received key information display notification (step S939).

Meanwhile, if a key information display notification was not received (step S938), the control unit 120 judges whether or not a refusal reason notification was received (step S940). Subsequently, if a refusal reason notification was received (step S940), the control unit 120 causes the display unit 142 to display the received refusal reason notification (step S941).

Meanwhile, if an authentication key information input operation was performed (step S931), the control unit 120 judges whether or not a setting to perform key agreement confirmation on the source device side is configured (step S942). Subsequently, if a setting to perform key agreement confirmation on the source device side is configured (step S942), the process proceeds to step S945. On the other hand, if a setting to perform key agreement confirmation on the source device side is not configured (step S942), the control unit 120 transmits the input authentication key information to the sink device (step S943).

Next, the control unit 120 judges whether or not a key agreement confirmation result was received (step S944), and if a key agreement confirmation result was not received, continues monitoring. On the other hand, if a key agreement confirmation result was received (step S944), the control unit 120 judges whether or not the received key agreement confirmation result indicates agreement (step S945). Subsequently, if the key agreement confirmation result indicates disagreement (step S945), the operation of the communication process ends.

Meanwhile, if the key agreement confirmation result indicates agreement (step S945), the control unit 120 starts the transmission of content stored in the memory 130 to the sink device (step S946). Next, the control unit 120 judges whether or not the transmission of the content to be transmitted has ended (step S947). Subsequently, if the transmission of the content to be transmitted has ended (step S947), the control unit 120 transmits a connection release request to the sink device (step S948). On the other hand, if the transmission of the content to be transmitted has not ended (step S947), the control unit 120 judges whether or not a connection release request was received (step S949). Subsequently, if a connection release request was not received (step S949), the process returns to step S946. On the other hand, if a connection release request was received (step S949), the operation of the communication process ends.

4. Fourth Embodiment

The first to the third embodiments of the present technology illustrate an example either the source device or the sink device generating authentication key information. Herein, for example, the authentication key information generated by another apparatus other than the source device and the sink device may also be used by the source device and the sink device.

Accordingly, the fourth embodiment of the present technology illustrates an example of conducting an authentication process using authentication key information generated by another apparatus (for example, a server). Note that the communication system according to the fourth embodiment of the present technology is approximately similar to the communication system 10 illustrated in FIG. 1. For this reason, the parts shared in common with the communication system 10 are denoted with the same signs, and some of the description thereof will be reduced or omitted.

[Example of Preparing Key Information-Providing Server on Sink Device Side]

First, an example of preparing a key information-providing server on the sink device side will be described.

[Example Configuration of Communication System]

Figure 22:
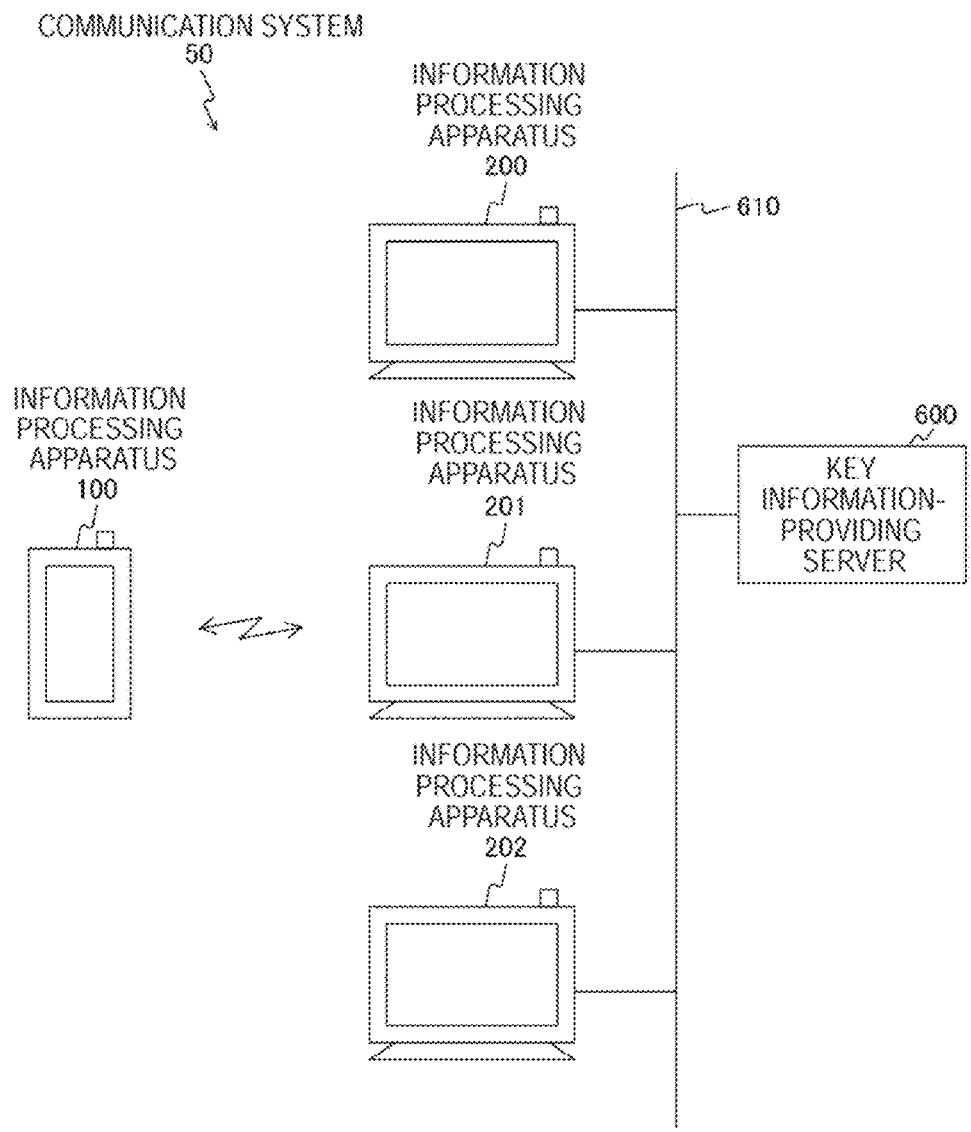
FIG. 22 is a diagram that illustrates an exemplary configuration of a communication system 50 according to a fourth embodiment of the present technology.

FIG. 22 is a diagram illustrating an exemplary configuration of a communication system 50 according to a fourth embodiment of the present technology.

The communication system 50 is equipped with an information processing apparatus 100, information processing apparatuses 200 to 202, a key information-providing server 600, and a network 610.

Note that the information processing apparatuses 200 to 202 correspond to the information processing apparatus 200 illustrated in FIG. 1. However, the information processing apparatuses 200 to 202 differ from the information processing apparatus 200 by being connected to the key information-providing server 600 via the network 610, and exchanging various key-related information with the key information-providing server 600.

The communication system 50 is anticipated to be constructed in a facility (for example, a hotel) in which a sink device is installed in each room, for example. Also, a key management server of the hotel is anticipated as the key information-providing server 600, for example.

The network 610 is a network that connects the information processing apparatuses 200 to 202 with the key information-providing server 600. For example, the network 610 is a wired network (for example, Ethernet (registered trademark)) or coaxial cables.

The key information-providing server 600 is an information processing apparatus that centrally manages key-related information (authentication keys, key images), and provides managed key-related information to the information processing apparatuses 200 to 202. For example, in the communication system 50, the authentication start instruction operation is performed on the key information-providing server 600 instead of a sink device (the information processing apparatuses 200 to 202). When the authentication start instruction operation is performed, the key information-providing server 600 transmits authentication key information to each of the sink devices (information processing apparatuses 200 to 202). In this case, different authentication key information is transmitted to each sink device. Also, when the authentication start instruction operation is performed, authentication key information may be transmitted from the key information-providing server 600 to all sink devices, or authentication key information may be transmitted only to a subset of sink devices. When transmitting authentication key information only to a subset of sink devices in this way, a destination sink device may be specified by the authentication start instruction operation.

In addition, only display key information may be transmitted from the key information-providing server 600 to each sink device (the information processing apparatuses 200 to 202) and a key image may be generated by the sink devices, or the key image itself may be transmitted. In addition, the authentication key information to be transmitted may also be specified by the authentication start instruction operation.

Note that although FIG. 22 illustrates an example in which multiple sink devices (information processing apparatuses 200 to 202) and the key information-providing server 600 are connected, the above is similarly applicable to a case in which one sink device and one key information-providing server are connected. Additionally, the key information-providing server 600 may also be omitted, and a function similar to the key information-providing server 600 may be provided in at least one of the multiple sink devices (information processing apparatuses 200 to 202). In this case, the sink device provided with a function similar to the key information-providing server 600 provides key-related information to the other sink devices.

[Example of Preparing Key Information-Providing Server on Source Device Side]

Next, an example of preparing a key information-providing server on the source device side will be described.

[Example Configuration of Communication System]

Figure 23:
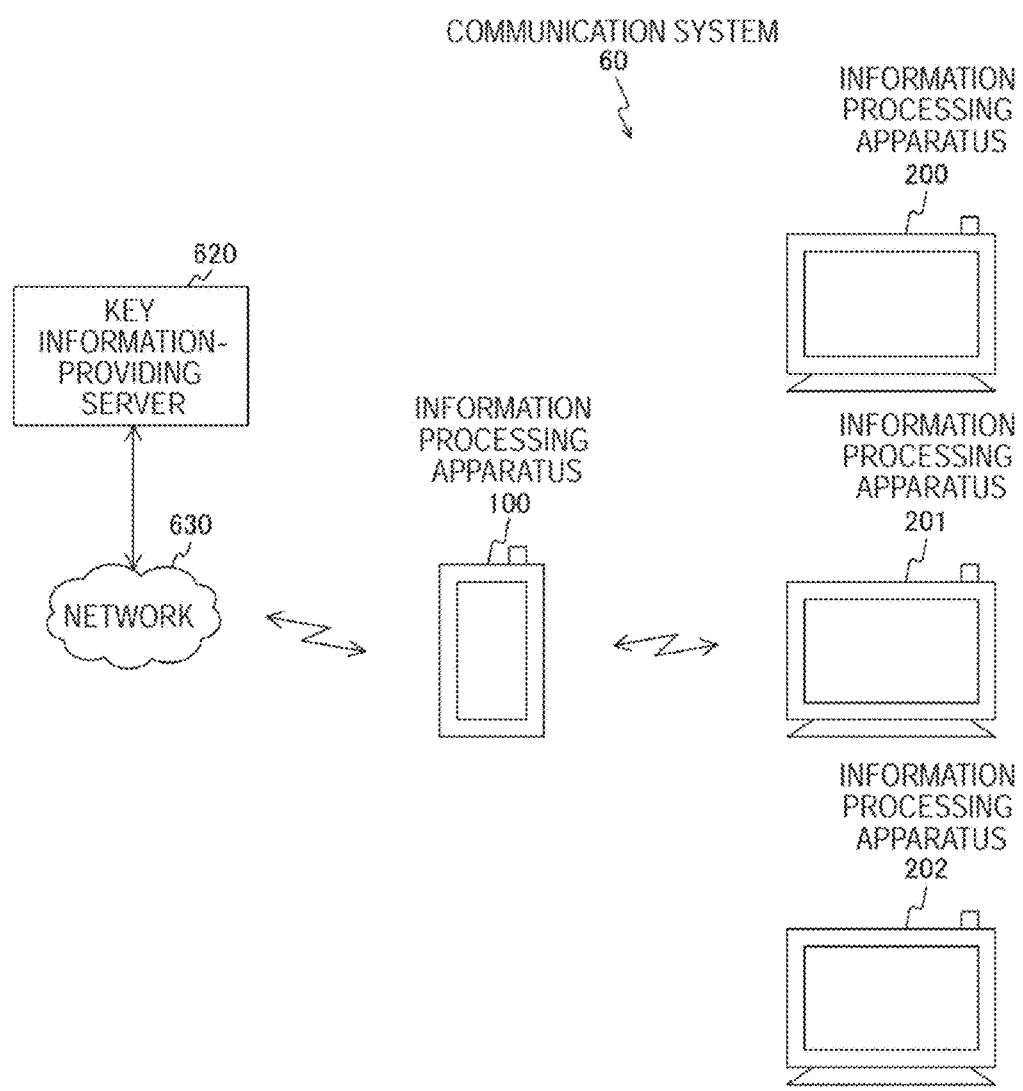
FIG. 23 is a diagram that illustrates an exemplary configuration of a communication system 60 according to a fourth embodiment of the present technology.

FIG. 23 is a diagram illustrating an exemplary configuration of a communication system 60 according to a fourth embodiment of the present technology.

The communication system 60 is equipped with an information processing apparatus 100, information processing apparatuses 200 to 202, a key information-providing server 620, and a network 630.

Note that the information processing apparatus 100 is approximately the same as the information processing apparatus 100 illustrated in FIG. 1. However, the information processing apparatus 100 differs from the information processing apparatus 100 by being connected to the key information-providing server 620 via the network 630, and exchanging various key-related information with the key information-providing server 620. Also, the information processing apparatuses 200 to 202 correspond to the information processing apparatus 200 illustrated in FIG. 1.

Note that the communication system 60 is a modification of the communication system 50 illustrated in FIG. 22, and differs from the communication system 50 in that the key information-providing server 620 and the network 630 are provided instead of the key information-providing server 600 and the network 610.

Note that FIG. 23 illustrates an example in which the source device (information processing apparatus 100) has two types of wireless connections, namely, a wireless connection with a sink device, and a wireless connection with the network 630 (for example, the Internet or a local area network). However, the above is similarly applicable to a case in which these wireless connections are the same wireless connection. In other words, when the information processing apparatus 100 connects to the network 630, the wireless communication function used to connect to the information processing apparatuses 200 to 202 may be used, or another wireless communication function may be used. For example, the information processing apparatus 100 may be equipped with a wireless communication function such as 3G or LTE, and connect to the network 630 using this wireless communication function.

In addition, the key information-providing server 620 may be installed on the Internet, or installed on a local area network (LAN). Note that a key information management server/application or the like is anticipated as the key information-providing server 620, for example.

The network 630 is a public network such as a telephone network or the Internet. Also, when the information processing apparatus 100 connects to the network 630 using a communication function such as 3G or LTE, the information processing apparatus 100 and the network 630 are connected via a communication control apparatus (not illustrated).

The key information-providing server 620 is an information processing apparatus that provides key-related information in response to a key information request from the information processing apparatus 100. The exchange of information between the key information-providing server 620 and the information processing apparatus 100 will be described in detail with reference to FIGS. 24 and 25.

Note that although FIG. 23 illustrates an example of a communication system 60 equipped with multiple sink devices and the key information-providing server 620, the above is similarly applicable to a communication system equipped with one sink device and one key information-providing server. Additionally, the key information-providing server 620 may also be omitted, and a function similar to the key information-providing server 620 may be provided in at least one of the multiple sink devices (information processing apparatuses 200 to 202). In this case, the sink device provided with a function similar to the key information-providing server 620 provides key-related information to the information processing apparatus 100 on the source side. Additionally, the key information-providing server 620 may also be omitted, and a function similar to the key information-providing server 620 may be provided in at least one of multiple source devices. In this case, the source device provided with a function similar to the key information-providing server 620 provides key-related information to the information processing apparatus 100 on the source side.

[Communication Example in Case of Key Information-Providing Server Generating Key Only]

Figure 24:
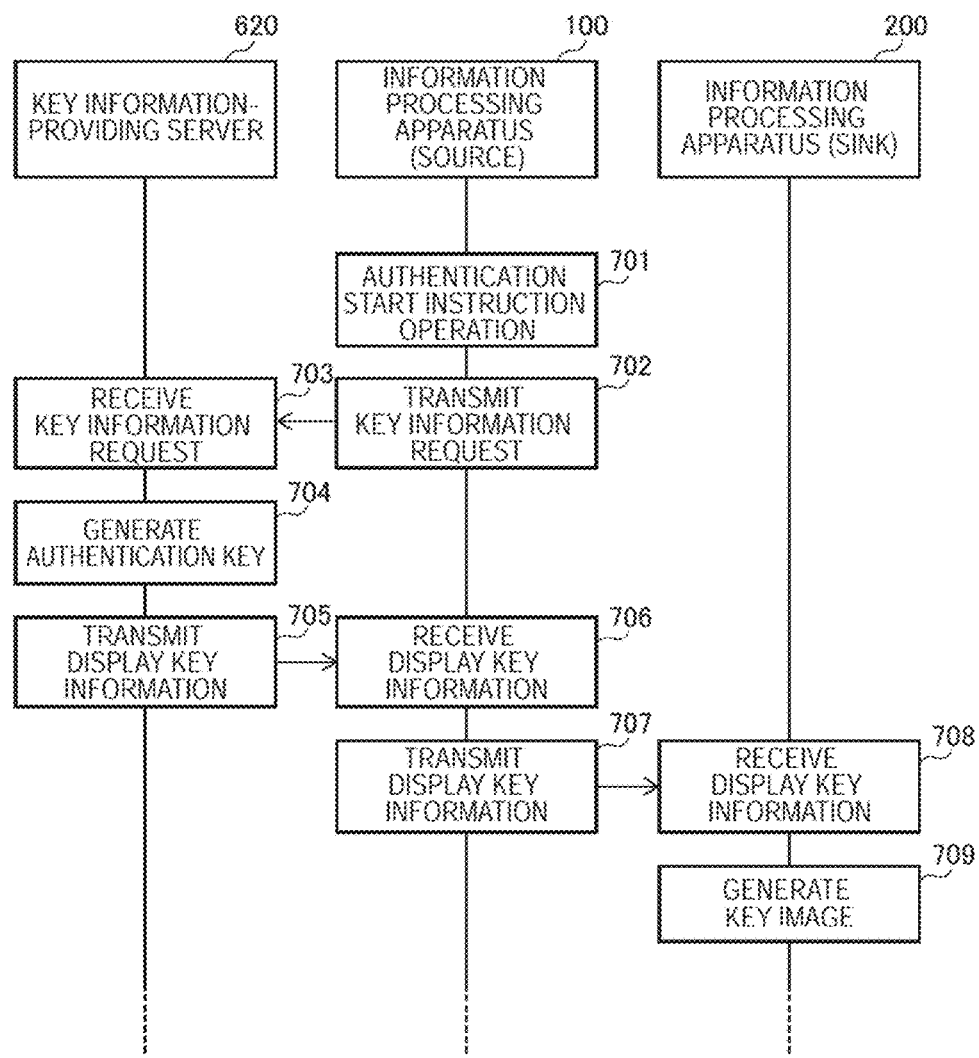
FIG. 24 is a sequence flowchart illustrating an exemplary communication process among apparatuses constituting a communication system 60 according to a fourth embodiment of the present technology.

FIG. 24 is a sequence flowchart illustrating an exemplary communication process among apparatuses constituting a communication system 60 according to a fourth embodiment of the present technology. Note that FIG. 24 illustrates an exemplary communication process in the case of a user using the information processing apparatus 100 to perform an authentication start instruction operation in the state illustrated in FIG. 23. Also, FIG. 24 illustrates an exemplary communication process for a case of the key information-providing server 620 generating and providing an authentication key only in response to a key information request from the source device (information processing apparatus 100).

First, the user 11 performs an authentication start instruction operation using the operation receiving unit 152 of the information processing apparatus 100 on the source side (701). In this way, when an authentication start instruction operation is performed (701), the control unit 120 of the information processing apparatus 100 on the source side transmits a key information request to the key information-providing server 620 (702, 703). In this case, the key information request 315 is stored in the information element identifier 303 (illustrated in FIG. 4) and information related to a key information request is stored in the data 304 (illustrated in FIG. 4) included in the information to be transmitted.

After receiving the key information request (703), the key information-providing server 620 generates an authentication key to use when conducting the authentication process (704). Next, the key information-providing server 620 transmits display key information for converting the generated authentication key into image information to the information processing apparatus 100 that transmitted the key information request (705, 706).

After receiving the key (706), the control unit 120 of the information processing apparatus 100 on the source side transmits the received display key information to the information processing apparatus 200 on the sink side (707, 708). Next, the control unit 220 of the information processing apparatus 200 on the sink side converts the received display key information into image information to generate a key image (709).

Note that since the processes thereafter are similar to the processes illustrated in the first to third embodiments of the present technology, illustration and description thereof herein will be omitted.

[Communication Example in Case of Key Information-Providing Server Generating Key Image]

Figure 25:
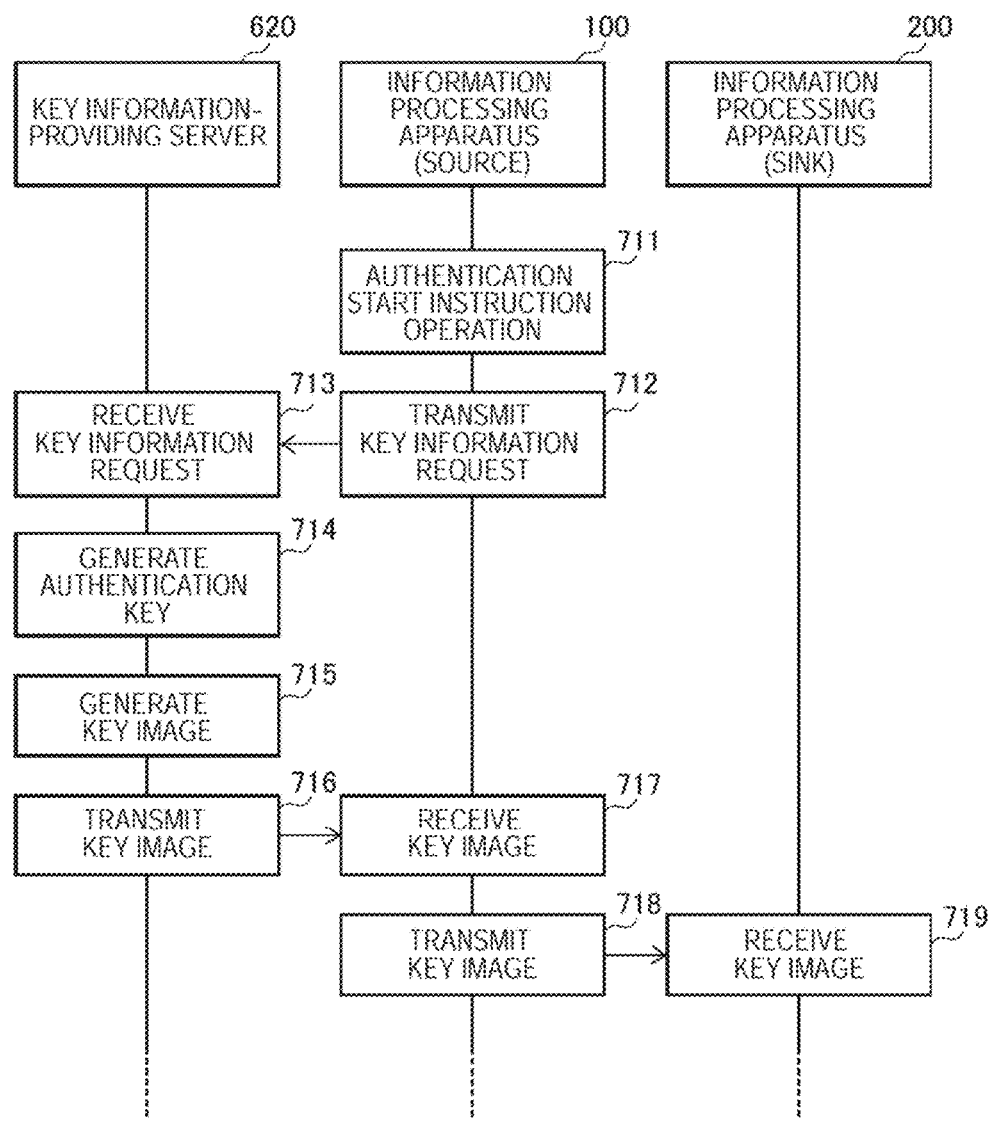
FIG. 25 is a sequence flowchart illustrating an exemplary communication process among apparatuses constituting a communication system 60 according to a fourth embodiment of the present technology.

FIG. 25 is a sequence flowchart illustrating an exemplary communication process among apparatuses constituting a communication system 60 according to a fourth embodiment of the present technology. Note that FIG. 25 is a modification of FIG. 24, and differs from FIG. 24 in that the key information-providing server 620 generates and provides a key image in response to a key information request from the source device (information processing apparatus 100). For this reason, these different points in FIG. 25 will be described primarily.

Note that since the processes (711 to 714) up to generating an authentication key are the same as the processes (701 to 704) illustrated in FIG. 24, description thereof will be omitted herein.

The key information-providing server 620 converts the generated authentication key into image information to generate a key image (715). Next, the key information-providing server 620 transmits the generated key image to the information processing apparatus 100 that transmitted the key information request (716, 717).

After receiving the key image (717), the control unit 120 of the information processing apparatus 100 on the source side transmits the received key image to the information processing apparatus 200 on the sink side (718, 719).

Note that since the processes thereafter are similar to the processes illustrated in the first to third embodiments of the present technology, illustration and description thereof herein will be omitted.

[Communication Example in Case of Server Conducting Key Image Generation and Key Agreement Confirmation]

The foregoing illustrates an example of a server generating and providing key-related information (an authentication key or a key image) to an information processing apparatus. At this point, the server may also conduct the key image generation and the key agreement confirmation. Accordingly, the following illustrates an example of the server conducting the key image generation and the key agreement confirmation.

[Example Configuration of Communication System]

FIG. 26 is a diagram illustrating an exemplary configuration of a communication system 70 according to a fourth embodiment of the present technology.

The communication system 70 is equipped with an information processing apparatus 100, information processing apparatuses 200 to 202, a server 650, a network 660, and an access point 670.

Note that the communication system 70 is a modification of the communication system 50 illustrated in FIG. 22, and differs from the communication system 50 in that the server 650, the network 660, and the access point 670 are provided instead of the key information-providing server 600 and the network 610.

In addition, FIG. 26 illustrates a communication system to which the first to third embodiments of the present technology may be applied, even when each sink device is not equipped with a wireless communication function. For example, the first to the third embodiments of the present technology may be applied even to environments other than a hotel or the like, such as a typical home environment. For example, the first to third embodiments of the present technology may be applied even to an environment in which a sink device not equipped with a wireless communication function connects to the information processing apparatus 100 on the source side via the server 650 and the access point 670.

The access point 670 is an access point used to conduct communication between the information processing apparatus 100 and the server 650 (for example, a Wi-Fi access point). In other words, in the example illustrated in FIG. 26, the source device (information processing apparatus 100) communicates with the server 650 via the access point 670, without communicating directly with the sink devices (information processing apparatuses 200 to 202). In addition, the server 650 transmits information (for example, content) received from the source device (information processing apparatus 100) via the access point 670 to the sink devices (information processing apparatuses 200 to 202) via the network 660.

The server 650 is a server that communicates with the source device (information processing apparatus 100) via the access point 670. In addition, a control unit 651 of the server 650 conducts key image generation and key agreement confirmation. In addition, the control unit 651 of the server 650 provides image information (a key image or content) to the sink devices (information processing apparatuses 200 to 202) via the network 660.

[Communication Example]

FIG. 27 is a sequence flowchart illustrating an exemplary communication process among apparatuses constituting a communication system 70 according to a fourth embodiment of the present technology. Note that FIG. 27 illustrates an exemplary communication process in the case of a user using the information processing apparatus 100 to perform an authentication start instruction operation in the state illustrated in FIG. 26.

In the example illustrated in FIG. 27, except for the transmission of image information (723 to 727, 736 to 739), information exchange is conducted between the information processing apparatus 100 on the source side and the server 650 via the access point 670. In other words, the processes (721 to 740) illustrated in FIG. 27 are similar to the processes (421 to 415) illustrated in FIG. 7, except for the transmission of image information (723 to 727, 736 to 739). For this reason, illustration and description thereof is omitted herein.

In this way, the control unit 651 of the server 650 transmits authentication key information (for example, a key image) to the information processing apparatus 200 on the sink side via the network 660 for output (such as the display of a key image) from the information processing apparatus 200 on the sink side (726 to 728). In addition, the control unit 651 of the server 650 decides whether or not to allow the information processing apparatus 100 on the source side to make a wireless connection on the basis of authentication key information input into the information processing apparatus 100 on the source side and authentication key information output from the information processing apparatus 200 on the sink side (733 to 735). In addition, after deciding to allow the wireless connection, the control unit 651 of the server 650 causes data transmitted from the information processing apparatus 100 on the source side to be transmitted to from the information processing apparatus 200 on the sink side via the network 660, and output (736 to 739).

In this way, by generating and providing key-related information with a server, processing on the source device and the sink device may be simplified, and the processing on the source device and the sink device may be reduced.

Note that for the source device, another information processing apparatus equipped with a wireless communication function (for example, a PC, game console, digital still camera, or digital video camera (such as a camcorder)) may be used, for example. Also, for the sink device, another information processing apparatus equipped with a wireless communication function (for example, a projector or personal computer) or a portable information processing apparatus (for example, a smartphone or tablet) may also be used, for example.

Also, the above-described embodiment illustrates one example for realizing the present technology, and matters in the embodiment and technology specifying matters in the scope of claims have correspondence relation respectively. Similarly, the technology specifying matters in the scope of claims and the matters in the embodiment of the present technology, to which the same names are attached, have the correspondence relation respectively. However, the present technology is not limited to the embodiment and can be realized by variously modifying the embodiment without departing from the spirit of the technology.

Also, the processing procedures described in the above embodiment may be recognized as a method having a series of the procedures, or may be recognized as a program for making a computer execute a series of the procedures or a non-transitory computer-readable recording medium having the program recorded thereon. As the recording medium, for instance, a computer disc (CD), a minidisc (MD), a digital versatile disc (DVD), a memory card, and a Blu-ray (R) disc or the like are usable.

Additionally, the present technology may also be configured as below.

(1)

An information processing apparatus including:

a control unit configured to cause a second information processing apparatus to output authentication key information for allowing a first information processing apparatus to make a wireless connection with the second information processing apparatus in order to conduct data transmission from the first information processing apparatus to the second information processing apparatus using wireless communication, and decide whether or not to allow the first information processing apparatus to make the wireless connection on the basis of authentication key information input into the first information processing apparatus and the output authentication key information.

(2)

The information processing apparatus according to (1), wherein the information processing apparatus is the second information processing apparatus, the information processing apparatus further includes an output unit configured to output data transmitted from the first information processing apparatus, and the control unit causes the authentication key information to be output from the output unit, and after a decision is made to allow the first information processing apparatus to make the wireless connection, causes the data transmitted from the first information processing apparatus to be output from the output unit.

(3)

The information processing apparatus according to (2), wherein the output unit is a display unit configured to display an image based on image data transmitted from the first information processing apparatus, and the control unit causes the display unit to display the authentication key information, and after a decision is made to allow the first information processing apparatus to make the wireless connection, causes the display unit to display the image based on the image data transmitted from the first information processing apparatus.

(4)

The information processing apparatus according to any one of (1) to (3), wherein the first information processing apparatus transmits, to the information processing apparatus, authentication key information input from an input unit for inputting authentication key information output from the second information processing apparatus, and the control unit makes the decision on the basis of the authentication key information transmitted from the first information processing apparatus and the output authentication key information.

(5)

The information processing apparatus according to (4), wherein the input unit is at least one of an image capture unit configured to capture an image of authentication key information output from the second information processing apparatus, and an operation receiving unit configured to receive a user operation for inputting authentication key information output from the second information processing apparatus.

(6)

The information processing apparatus according to any one of (1) to (5), wherein the control unit decides to allow the first information processing apparatus to make the wireless connection in a case of determining that the authentication key information input into the first information processing apparatus and the output authentication key information are in agreement.

(7)

The information processing apparatus according to any one of (1) to (6), wherein the control unit causes authentication key information for allowing the first information processing apparatus to make a wireless connection with a second information processing apparatus selected by a user operation from among a plurality of the second information processing apparatus to be output from the selected second information processing apparatus.

(8)

The information processing apparatus according to any one of (1) to (6), wherein the first information processing apparatus causes information related to the plurality of the second information processing apparatus to be displayed, and transmits, to the information processing apparatus, information related to a second information processing apparatus selected by a user operation from among the plurality of the second information processing apparatus being displayed, and the control unit causes authentication key information for allowing the first information processing apparatus to make a wireless connection with the second information processing apparatus on the basis of the transmitted information related to the second information processing apparatus to be output from the second information processing apparatus.

(9)

The information processing apparatus according to any one of (1) to (6), wherein in a case in which a decision is made to allow the first information processing apparatus to make the wireless connection, and the first information processing apparatus and the second information processing apparatus are in a connected state, when a request for causing the authentication key information to be output from the second information processing apparatus is received from another information processing apparatus, the control unit refuses the request.

(10)

The information processing apparatus according to (9), wherein when the request is received from the another information processing apparatus after the connected state is released, the control unit causes the authentication key information to be output from the second information processing apparatus in response to the request.

(11)

The information processing apparatus according to (9), wherein in a case of receiving the request from the another information processing apparatus while in the connected state, the control unit releases the connected state without refusing the request when a priority level of the another information processing apparatus is higher than a priority level of the first information processing apparatus.

(12)

The information processing apparatus according to any one of (1) to (6), wherein in a case in which the authentication key information is made to be output from the second information processing apparatus in response to a request from the first information processing apparatus, and a user operation for refusing the wireless connection is received, the control unit decides not to allow the first information processing apparatus to make the wireless connection.

(13)

The information processing apparatus according to any one of (1) to (6), wherein when there exists a plurality of the first information processing apparatus that conducts data transmission to the second information processing apparatus, the control unit causes authentication key information for every first information processing apparatus for allowing each of the plurality of the first information processing apparatus to make the wireless connection on the basis of a designated rule to be output successively from the second information processing apparatus.

(14)

The information processing apparatus according to (13), wherein the control unit decides a connection time for conducting data transmission to the second information processing apparatus on the basis of the number of the first information processing apparatus, and causes authentication key information for every first information processing apparatus to be output successively from the second information processing apparatus in a designated order to each of the plurality of the first information processing apparatus on the basis of the connection time.

(15)

The information processing apparatus according to (1), wherein the information processing apparatus is the first information processing apparatus, the information processing apparatus further includes an input unit for inputting authentication key information output from the second information processing apparatus, and the control unit transmits the authentication key information to the second information processing apparatus using wireless communication, causes the authentication key information to be output from the second information processing apparatus, decides whether or not to allow the wireless connection on the basis of the authentication key information input into the input unit and the output authentication key information, and transmits a result of the decision to the second information processing apparatus using wireless communication.

(16)

The information processing apparatus according to (1), wherein the information processing apparatus is a server connected to the second information processing apparatus via a network, and the control unit transmits the authentication key information to the second information processing apparatus via the network, causes the authentication key information to be output from the second information processing apparatus, and after a decision is made to allow the first information processing apparatus to make the wireless connection, transmits data transmitted from the first information processing apparatus to the second information processing apparatus via the network, and causes the data to be output from the second information processing apparatus.

(17)

A communication system including:

a first information processing apparatus configured to conduct data transmission to a second information processing apparatus using wireless communication; and a second information processing apparatus configured to receive and output data from the first information processing apparatus, wherein authentication key information for allowing the first information processing apparatus to make a wireless connection with the second information processing apparatus in order to conduct the data transmission is output from the second information processing apparatus, and whether or not to allow the first information processing apparatus to make the wireless connection is decided on the basis of authentication key information input into the first information processing apparatus and the output authentication key information.

(18)

An information processing method including:

a first step of causing a second information processing apparatus to output authentication key information for allowing a first information processing apparatus to make a wireless connection with the second information processing apparatus in order to conduct data transmission from the first information processing apparatus to the second information processing apparatus using wireless communication; and a second step of deciding whether or not to allow the first information processing apparatus to make the wireless connection on the basis of authentication key information input into the first information processing apparatus and the output authentication key information.

(19)

A program causing a computer to execute:

a first step of causing a second information processing apparatus to output authentication key information for allowing a first information processing apparatus to make a wireless connection with the second information processing apparatus in order to conduct data transmission from the first information processing apparatus to the second information processing apparatus using wireless communication; and a second step of deciding whether or not to allow the first information processing apparatus to make the wireless connection on the basis of authentication key information input into the first information processing apparatus and the output authentication key information.

REFERENCE SIGNS LIST

10, 20, 30, 40, 50, 60, 70 communication system
100, 101, 103 information processing apparatus
102 display unit
111, 211 antenna
112, 212 communication unit
120, 220, 651 control unit
130, 230 memory
141, 241 display information input/output unit
142, 242 display unit
151, 251 operating information input/output unit
152, 252 operation receiving unit
161 image capture information input/output unit
162 image capture unit
171, 271 audio information input/output unit
172 audio input unit
173, 272 audio output unit
180, 280 bus
200 to 202 information processing apparatus
261 remote control information input/output unit
262 remote control
600, 620 key information-providing server
610, 630, 660 network
650 server
670 access point

The invention claimed is:

1. An information processing apparatus, comprising:
a memory configured to store instructions; and
one or more processors coupled with the memory,
wherein the one or more processors are configured to:
detect a plurality of first information processing apparatuses that are configured to conduct data transmission, wherein a first information processing apparatus of the plurality of first information processing apparatuses transmits data to a second information processing apparatus;

control the second information processing apparatus to
output first authentication key information,
wherein the first authentication key information
enables the first information processing apparatus to
connect wirelessly with the second information processing apparatus;
set a time interval to transmit the data from the first
information processing apparatus to the second
information processing apparatus,
wherein the time interval is set based on the detection
of the plurality of first information processing apparatuses;
enable, at a start time, the first information processing
apparatus to connect wirelessly with the second
information processing apparatus based on second
authentication key information and the first authentication key information, wherein the second authentication key information is input to the first information processing apparatus; and
enable a third information processing apparatus of the
plurality of first information processing apparatuses
to connect with the second information processing
apparatus after a lapse of the set time interval from
the start time of the connection of the first information processing apparatus with the second information processing apparatus.

2. The information processing apparatus according to claim 1, wherein the information processing apparatus is the second information processing apparatus, and
wherein the one or more processors are further configured to:
output the data transmitted from the first information processing apparatus; and
display the data transmitted from the first information processing apparatus on the second information processing apparatus based on the connection of the first information processing apparatus and the second information processing apparatus.

3. The information processing apparatus according to claim 2, wherein the one or more processors are further configured to:
display an image on the second information processing apparatus based on the data transmitted from the first information processing apparatus, wherein the data includes at least one of an image data, audio data, or video data; and
display the first authentication key information on the second information processing apparatus; and
wherein the image is displayed based on the connection of the first information processing apparatus and the second information processing apparatus.

4. The information processing apparatus according to claim 1, wherein
the first information processing apparatus transmits, to the information processing apparatus, the second authentication key information, and
the one or more processors are further configured to enable the first information processing apparatus to connect wirelessly with the second information processing apparatus based on the second authentication key information transmitted from the first information processing apparatus and the first authentication key information.

5. The information processing apparatus according to claim 4, wherein
the second authentication key information is input in the first information processing apparatus via an image sensor, wherein the image sensor is configured to capture an image of the first authentication key information that is output from the second information processing apparatus, and
wherein the one or more processors are further configured to receive a user operation to input the first authentication key information.

6. The information processing apparatus according to claim 1, wherein
the one or more processors are further configured to enable the first information processing apparatus to connect wirelessly with the second information processing apparatus based on a consistency between the second authentication key information and the first authentication key information.

7. The information processing apparatus according to claim 1, wherein the one or more processors are further configured to select, by a user operation, the second information processing apparatus from a plurality of the second information processing apparatuses.

8. The information processing apparatus according to claim 1, wherein
the first information processing apparatus displays first information related to the plurality of the second information processing apparatuses, and the first information processing apparatus transmits, to the information processing apparatus, second information related to the second information processing apparatus selected by a user operation,
wherein the second information processing apparatus is selected from a plurality of the second information processing apparatus, and
the first authentication key information enables the first information processing apparatus to connect wirelessly with the second information processing apparatus based on the transmitted second information related to the second information processing apparatus.

9. The information processing apparatus according to claim 1, wherein
the one or more processors are further configured to refuse a request to output the first authentication key information from the second information processing apparatus based on the connection of the first information processing apparatus and the second information processing apparatus,
wherein the request is received from a fourth information processing apparatus different from the first information processing apparatus and the second information processing apparatus.

10. The information processing apparatus according to claim 9, wherein
wherein the first authentication key information is output based on the request received from the fourth information processing apparatus, and
wherein the first authentication key information is output after the connection between the first information processing apparatus and the second information processing apparatus is released.

11. The information processing apparatus according to claim 1, wherein the one or more processors are further configured to:
receive, from a fourth information processing apparatus, a request to output the first authentication key information from the second information processing apparatus while the first information processing apparatus and the second information processing apparatus are in a connected state; and release the connected state based on a first priority level of the fourth information processing apparatus, wherein the first priority level of the fourth information processing apparatus is higher than a second priority level of the first information processing apparatus.

12. The information processing apparatus according to claim 1, wherein the first information processing apparatus is prevented to connect wirelessly with the second information processing apparatus based on:
a case in which the first authentication key information is outputted from the second information processing apparatus based on a request from the first information processing apparatus, and
a user operation to refuse wireless connection between the first information processing apparatus and the second information processing apparatus is received.

13. The information processing apparatus according to claim 1, wherein
the one or more processors are further configured to:
output the first authentication key information for each of the plurality of first information processing apparatuses successively based on the detection of the plurality of the first information processing apparatuses, wherein the plurality of the first information processing apparatuses transmits the data to the second information processing apparatus,
wherein the first authentication key information for each of the plurality of the first information processing apparatuses is output by the second information processing apparatus based on a designated rule.

14. The information processing apparatus according to claim 13, wherein the one or more processors are further configured to:
determine a connection time to transmit the data from one of the plurality of first information processing apparatuses to the second information processing apparatus, wherein the connection time is determined based on a number of the plurality of the first information processing apparatuses,
wherein the first authentication key information for each of the plurality of first information processing apparatuses is outputted successively from the second information processing apparatus in a designated order to each of the plurality of first information processing apparatuses based on the connection time.

15. The information processing apparatus according to claim 1, wherein the information processing apparatus is the first information processing apparatus,
the one or more processors are further configured to:
input the first authentication key information that is output from the second information processing apparatus;
transmit the second authentication key information to the second information processing apparatus via wireless communication;
enable a wireless connection between the first information processing apparatus and the second information processing apparatus based on the second authentication key information input into the first information processing apparatus and the first authentication key information; and
transmit a result to the second information processing apparatus via wireless communication.

16. The information processing apparatus according to claim 1, wherein the information processing apparatus is a server connected to the second information processing apparatus via a network, and
the one or more processors are further configured to:
transmit the second authentication key information to the second information processing apparatus via the network;
transmit the data from the first information processing apparatus to the second information processing apparatus based on the wireless connection enabled between the first information processing apparatus and the second information processing apparatus; and
output the data transmitted from the second information processing apparatus.

17. A communication system, comprising:
a first information processing apparatus configured to conduct data transmission to a second information processing apparatus via wireless communication; and
the second information processing apparatus configured to receive and output data from the first information processing apparatus,
wherein first authentication key information enables the first information processing apparatus to connect wirelessly with the second information processing apparatus, wherein the first authentication key information is output from the second information processing apparatus, and
wherein the second information processing apparatus comprises:
one or more processors configured to:
detect a plurality of first information processing apparatuses that are configured to conduct the data transmission;
set a time interval to transmit the data from the first information processing apparatus to the second information processing apparatus,
wherein the time interval is set based on the detection of the plurality of first information processing apparatuses;
enable, at a start time, the first information processing apparatus to connect wirelessly with the second information processing apparatus based on second authentication key information and the first authentication key information, wherein the second authentication key information is input to the first information processing apparatus; and
enable a third information processing apparatus of the plurality of first information processing apparatuses to connect with the second information processing apparatus after a lapse of the set time interval from the start time of the connection of the first information processing apparatus with the second information processing apparatus.

18. An information processing method, comprising:
detecting a plurality of first information processing apparatuses that are configured to conduct data transmission, wherein a first information processing apparatus of the plurality of first information processing apparatuses transmits data to a second information processing apparatus;
controlling the second information processing apparatus to output first authentication key information for enabling the first information processing apparatus to connect wirelessly with the second information processing apparatus;
setting a time interval to transmit the data from the first information processing apparatus to the second information processing apparatus, wherein the time interval is set based on the detection of the plurality of first information processing apparatuses;

enabling, at a start time, the first information processing apparatus to connect wirelessly with the second information processing apparatus based on second authentication key information and the first authentication key information, wherein the second authentication key information is input to the first information processing apparatus; and enabling a third information processing apparatus of the plurality of first information processing apparatuses to connect with the second information processing apparatus after a lapse of the set time interval from the start time of the connection of the first information processing apparatus with the second information processing apparatus.

19. A non-transitory computer-readable medium having stored thereon, computer-executable instructions which when executed by an information processing device, cause the information processing device to execute operations, the operations comprising:

detecting a plurality of first information processing apparatuses that are configured to conduct data transmission, wherein a first information processing apparatus of the plurality of first information processing apparatuses transmits data to a second information processing apparatus;

controlling the second information processing apparatus to output first authentication key information for enabling the first information processing apparatus to connect wirelessly with the second information processing apparatus;

setting a time interval to transmit the data from the first information processing apparatus to the second information processing apparatus, wherein the time interval is set based on the detection of the plurality of first information processing apparatuses;

enabling, at a start time, the first information processing apparatus to connect wirelessly with the second information processing apparatus based on second authentication key information and the first authentication key information, wherein the second authentication key information is input to the first information processing apparatus; and enabling a third information processing apparatus of the plurality of first information processing apparatuses to connect with the second information processing apparatus after a lapse of the set time interval from the start time of the connection of the first information processing apparatus with the second information processing apparatus.

20. An information processing apparatus, comprising:
a memory configured to store instructions; and
one or more processors coupled with the memory,
wherein the one or more processors are configured to:

control a second information processing apparatus to output first authentication key information, wherein the first authentication key information enables a first information processing apparatus to connect wirelessly with the second information processing apparatus for transmission of data from the first information processing apparatus to the second information processing apparatus;

enable the first information processing apparatus to connect wirelessly with the second information processing apparatus based on second authentication key information and the first authentication key information, wherein the second authentication key information is input to the first information processing apparatus;

output the first authentication key information for each of a plurality of first information processing apparatuses successively based on a plurality of the first information processing apparatuses, wherein the plurality of the first information processing apparatuses transmits the data to the second information processing apparatus, wherein the first authentication key information for each of the plurality of the first information processing apparatuses is output by the second information processing apparatus based on a designated rule;

determine a connection time to transmit the data from one of the plurality of first information processing apparatuses to the second information processing apparatus, wherein the connection time is determined based on a number of the plurality of the first information processing apparatuses, wherein the first authentication key information for each of the plurality of first information processing apparatuses is outputted successively from the second information processing apparatus in a designated order to each of the plurality of first information processing apparatuses, and wherein the first authentication key information is outputted successively based on the connection time.

* * * * *